US011230091B2

(12) United States Patent
Whittemore

(10) Patent No.: US 11,230,091 B2
(45) Date of Patent: Jan. 25, 2022

(54) PARTITION MOUNTING SYSTEMS, PARTITION ASSEMBLY KITS, DOUBLE-SIDED ADHESIVE TAPE AND METHODS OF INSTALLATION AND APPLICATION

(71) Applicant: Zipwall, LLC, Arlington, MA (US)

(72) Inventor: Jeffrey P. Whittemore, Arlington, MA (US)

(73) Assignee: Zipwall, LLC, Arlington, MA (US)

( * ) Notice: Subject to any disclaimer, the term of this patent is extended or adjusted under 35 U.S.C. 154(b) by 474 days.

(21) Appl. No.: 15/992,745

(22) Filed: May 30, 2018

(65) Prior Publication Data

US 2018/0291675 A1 Oct. 11, 2018

Related U.S. Application Data

(60) Division of application No. 13/433,715, filed on Mar. 29, 2012, now abandoned, and a continuation-in-part of application No. 13/073,425, filed on Mar. 28, 2011, now abandoned, which is a continuation of application No. 12/889,968, filed on Sep. 24, 2010, now Pat. No. 9,115,539.

(60) Provisional application No. 61/470,724, filed on Apr. 1, 2011, provisional application No. 61/245,443, filed on Sep. 24, 2009, provisional application No.
(Continued)

(51) Int. Cl.

| | |
|---|---|
| ***B32B 37/12*** | (2006.01) |
| ***E04G 21/24*** | (2006.01) |
| ***E06B 9/06*** | (2006.01) |
| *E06B 3/80* | (2006.01) |
| *E06B 5/02* | (2006.01) |

(52) U.S. Cl.
CPC ........ *B32B 37/1284* (2013.01); *E04G 21/241* (2013.01); *E04G 21/243* (2013.01); *E06B 9/0692* (2013.01); *E06B 3/80* (2013.01); *E06B 5/025* (2013.01); *Y10T 24/318* (2015.01)

(58) Field of Classification Search
CPC . B32B 37/1284; E04G 21/241; E04G 21/243; E06B 9/0692; E06B 3/80; E06B 5/025; Y10T 24/318
USPC .......................................................... 160/398
See application file for complete search history.

(56) References Cited

U.S. PATENT DOCUMENTS 1,747,893 A 2/1930 Fisher
1,900,560 A 3/1933 Janer
(Continued)

FOREIGN PATENT DOCUMENTS

EP 2065549 6/2009
GB 2360452 9/2001
(Continued)

OTHER PUBLICATIONS

"Reusable Zipper for Dust Barrier Installation and Method of Installing the Same" Specification, Drawings, Claims and Prosecution History, of U.S. Appl. No. 13/240,080, filed Sep. 22, 2011, by Jeffrey Whittemore.
(Continued)

*Primary Examiner* — Christopher T Schatz
(74) *Attorney, Agent, or Firm* — Onello & Mello, LLP

(57) ABSTRACT

A partition assembly kit, includes a receptacle, a first strap, and a first zipper having a length greater than 50% a height of a standard-sized entry way. The strap and the first zipper are provided within the receptacle.

14 Claims, 50 Drawing Sheets

Related U.S. Application Data

61/334,291, filed on May 13, 2010, provisional application No. 61/386,061, filed on Sep. 24, 2010.

(56) References Cited

U.S. PATENT DOCUMENTS 1,924,864 A 8/1933 Koehler
2,245,999 A 6/1941 Plotkin
2,247,867 A 7/1941 Baumann
2,278,912 A 4/1942 Busse
2,320,067 A 5/1943 Caughren
2,464,206 A 3/1949 Becker
2,719,374 A 10/1955 Paione
2,943,581 A 7/1960 Bendik
2,986,786 A 6/1961 Hill
3,251,399 A 5/1966 Grossman
3,285,482 A 11/1966 Bedsaul, Sr.
3,456,305 A 7/1969 Voit
3,470,923 A 10/1969 Besthorne
3,518,991 A 7/1970 Goss
3,547,136 A 12/1970 Prinz
3,579,746 A 5/1971 Marik
3,685,103 A 8/1972 Severino
3,785,014 A 1/1974 Canepa
3,970,227 A 7/1976 Hardy
3,981,471 A 9/1976 Currier
4,187,591 A 2/1980 Akashi
4,415,400 A 11/1983 Rammelmeyr
4,472,879 A 9/1984 Sizemore, Jr.
4,549,334 A * 10/1985 Miller .................... B44C 7/022 160/398
4,582,737 A 4/1986 Torgerson et al.
4,633,691 A 1/1987 Hardy
4,691,373 A 9/1987 Ausnit
4,911,964 A 3/1990 Corbo et al.
5,067,207 A 11/1991 Semons
D331,892 S 12/1992 Semons
5,311,648 A 5/1994 Semons
5,314,331 A 5/1994 Brosius et al.
D349,447 S 8/1994 Daniller
5,468,538 A 11/1995 Nameche
5,622,761 A 4/1997 Cole
5,819,474 A 10/1998 Strom
5,924,469 A 7/1999 Whittemore
5,937,596 A 8/1999 Leeuwenburgh et al.
5,940,941 A 8/1999 Dishner et al.
D416,675 S 11/1999 MacDonald
5,979,851 A 11/1999 Purdy
6,001,471 A 12/1999 Bries et al.
6,141,921 A 11/2000 Leeuwenburgh et al.
6,192,965 B1 2/2001 Hinds
6,279,797 B1 8/2001 Snyder
6,325,577 B1 12/2001 Anderson
6,394,168 B1 5/2002 Zoboski
6,427,569 B2 8/2002 MacDonald
D464,560 S 10/2002 Kalat
D464,869 S 10/2002 Kalat
6,513,249 B2 2/2003 Linton et al.
6,612,529 B2 9/2003 Snyder
D480,555 S 10/2003 Bledsoe
6,641,955 B1 11/2003 Matsubara et al.
6,733,546 B2 5/2004 Matsubara et al.
D491,447 S 6/2004 Diss
6,848,490 B2 2/2005 Ho
6,962,188 B2 11/2005 Coenraets
6,994,238 B2 2/2006 Estabaya
7,028,736 B1 4/2006 Miller
7,073,758 B2 7/2006 Whittemore et al.
7,108,040 B2 9/2006 Whittemore
7,111,732 B1 9/2006 Houtler et al.
7,197,772 B2 4/2007 Crye et al.
7,263,747 B1 9/2007 Semons
7,275,727 B2 10/2007 Granston et al.
D570,486 S 6/2008 White
7,533,595 B2 5/2009 Domenico
7,533,712 B2 5/2009 Whittemore et al.
7,610,727 B2 11/2009 Toledo
7,658,219 B2 2/2010 Whittemore
7,717,382 B2 5/2010 Whittemore et al.
7,743,512 B1 6/2010 Whittemore
7,762,303 B2 7/2010 Chen
D647,164 S 10/2011 Nook
D668,529 S 10/2012 Harris
2003/0019085 A1 1/2003 Loglisci
2003/0207177 A1 11/2003 Matsubara et al.
2004/0200585 A1 10/2004 Whittemore
2005/0087662 A1 4/2005 Jacobs
2005/0282696 A1 12/2005 Schmalholz
2006/0278793 A1 12/2006 Granston et al.
2006/0283134 A1 12/2006 Shah
2006/0283562 A1 12/2006 Hickey
2006/0283768 A1 12/2006 Schriner
2007/0169318 A1 7/2007 Semons
2008/0017332 A1 1/2008 Daly
2008/0226904 A1 9/2008 Killey
2010/0108210 A1 5/2010 Salas Garcia

FOREIGN PATENT DOCUMENTS

GB 2412137 9/2005
JP 60134588 9/1985
JP 62123884 8/1987
JP 9226772 9/1997
JP 09226772 9/1997
JP H09226772 9/1997
JP 3103356 10/2000
JP 2001081971 3/2001
JP 2002025871 1/2002
JP 2004024953 1/2004
JP 2005288634 10/2005
JP 2007303160 11/2007
JP 2008088271 4/2008
KR 200198209 10/2000
KR 1020000065654 11/2000

OTHER PUBLICATIONS

Website printout of International Tape Company's Polyethylene Tape, Paper Tape and Cloth Tape, pp. 1 and 2, dated Oct. 30, 2008, http://www.itctapes.com/double_coated_tape/polyethylene-paper-cloth.html.
Website printout of International Tape Company's High Tack and Low Tack Tape—Double Coated Film Tapes, pp. 1-3, dated Oct. 30, 2008, http://www.itctapes.com/tack_tape/.
Website printout of EZ-ier Products' EZ-ier Tape, pp. 1 and 2, dated Dec. 17, 2009, http://www.ez-ier.com/content/tape_01.
International Tape Company, http://www.itctapes.com/.
EZ-ier Products, http://www.ez-ier.com.
International Search Report issued in related International Application No. PCT/US2010/050180.
"Partition Mounting Systems, Partition Assembly Kits, Double-Sided Adhesive Tape and Methods of Installation and Application" Specification, Drawings, Claims and Prosecution History, U.S. Appl. No. 12/889,968, filed Sep. 24, 2010, by Jeffrey Whittemore.
"Partition Mounting Systems, Partition Assembly Kits, Double-Sided Adhesive Tape and Methods of Installation and Application" Specification, Drawings, Claims and Prosecution History, of U.S. Appl. No. 13/073,425, filed Mar. 28, 2011, by Jeffrey Whittemore.
Office Action dated Sep. 9, 2014 issued in corresponding Japanese Patent Application No. 2012-531066.
Examination Report dated Oct. 27, 2014 issued in corresponding Australian Patent Application No. 2010298126.
Extended European Search Report dated Jul. 23, 2018, issued in corresponding European Application No. 18161520.4.
"Partition Mounting Systems, Partition Assembly Kits, Double-Sided Adhesive Tape and Methods of Installation and Application" Specification, Drawings and Prosecution History of U.S. Appl. No. 13/433,715, filed Mar. 29, 2012 by Jeffrey Whittemore.
Chinese Office Action dated Aug. 22, 2014, issued in corresponding Chinese Application No. 201080051399.6.

(56) References Cited

OTHER PUBLICATIONS

Extended European Search Report dated Sep. 6, 2016 issued in corresponding European Application No. 10819524.9.
European Office Action dated Sep. 30, 2020 issued in corresponding European Application No. 181615204.
European Office Action dated Mar. 22, 2021 issued in corresponding European Application No. 18161520.4.
European Office Action dated Sep. 27, 2021 issued in corresponding European Application No. 18161520.4.

* cited by examiner

| TEST PROPERTY | TEST METHOD | TECHNICAL DATA |
|---|---|---|
| DOUBLE-SIDED TAPE THICKNESS (mm) | GB/T7125-1999 | 0.23±0.1 |
| HIGH-TACK ADHESIVE MATERIAL PEEL ADHESION (N/in) | GB/T2792-1998 | ≥30 |
| LOW-TACK ADHESIVE MATERIAL PEEL ADHESION (N/in) | GB/T2792-1998 | ≥6 |
| BALL TACK (NO.#7) | GB/T4852-2002 | ≤10 |
| TENSILE STRENGTH (N/in) | GB7753-1987 | ≥65 |
| ELONGATION(%) | GB7753-1987 | ≥13 |

FIG. 7

PARTITION MOUNTING SYSTEMS, PARTITION ASSEMBLY KITS, DOUBLE-SIDED ADHESIVE TAPE AND METHODS OF INSTALLATION AND APPLICATION

RELATED APPLICATIONS

This application is a divisional application of U.S. patent application Ser. No. 13/433,715, filed on Mar. 29, 2012, which claims the benefit of U.S. Provisional Application No. 61/470,724, filed Apr. 1, 2011 which is a continuation-in-part application of U.S. patent application Ser. No. 13/073,425, filed on Mar. 28, 2011, which is a continuation application of U.S. patent application Ser. No. 12/889,968, filed on Sep. 24, 2010, which claims the benefit of U.S. Provisional Application No. 61/245,443, filed Sep. 24, 2009, U.S. Provisional Application No. 61/334,291, filed May 13, 2010 and U.S. Provisional Application No. 61/386,061, filed Sep. 24, 2010, the contents of each being herein incorporated by reference in their entirety.

BACKGROUND

Partition mounting systems are employed to isolate portions of a building or room, by serving as a barrier to dust, noise, light, odors, and the like. Workers at construction sites often use rudimentary techniques for constructing and installing partitions. Some simply nail, screw, or staple a curtain or plastic sheet of material to a floor, ceiling, or abutting walls of a room, resulting in damage to their surfaces. Others tape or adhere, using masking tape (e.g., 3M Painters Tape, 3M Corporate Headquarters, 3M Center, St. Paul, Minn. 55144), a curtain or plastic sheet to walls or ceilings of a room. However, the masking tape usually fails to adhere to the curtain or plastic sheet due to its weight. On the other hand, some secure a curtain or plastic sheet to walls or ceilings of a room using duct tape (e.g., Duck Tape, Henkel Consumer Adhesives, Inc., 32150 Just Imagine Drive, Avon, Ohio 44011). As a result, paint can pull off of surfaces with the removal of the tape, or adhesive residue is left behind when the tape is removed.

SUMMARY

Embodiments of the present inventive concepts are directed to partition mounting systems, partition assembly kits and methods of installation and application. In one aspect, embodiments of the present inventive concepts include partition assembly kits comprising various components and tools that can be used to assemble partition mounting systems. In one embodiment, components and tools are provided in a partition assembly kit that can be used to create a temporary door or sealed entryway, which can provide for rapid ingress and egress from a partitioned area. In one embodiment, the various components and tools of a partition assembly kit are provided in a common receptacle, such as, a cardboard box, paper box, plastic case, plastic bag or canvas bag. Embodiments of the present inventive concepts are applicable to door and window frames, as well as other types of entry ways and openings. In one aspect, a partition assembly kit, comprises: a receptacle; a sheet of material of a sufficient size to cover a standard-sized entry way; a roll of double-sided tape comprising a carrier material having a high-tack adhesive material on a first side of the carrier material and a low-tack adhesive material on a second side of the carrier material, wherein the first side of the carrier material has a peel adhesion greater than the second side of the carrier material; and at least one zipper having a length greater than 50% the height of the standard-sized entry way.

In one embodiment, the receptacle comprises a container for storing the sheet of material, the roll of double-sided tape and the at least one zipper.

In another embodiment, the container comprises one selected from the group consisting of a cardboard box, a paper box, a plastic container, a canvas bag and a cloth bag.

In another embodiment, the container is compartmentalized, such that each of the sheet of material, the roll of double-sided tape and the at least one zipper can be separated within the container.

In another embodiment, the sheet of material comprises at least one of a mono-film sheet material, a poly-film sheet material, a plastic or synthetic sheet material, a cloth material, a canvas material and a reinforced plastic tarp material.

In another embodiment, the standard-sized entry way comprises a door having dimensions selected from the group consisting of: 2'0"×6'8", 2'2"×6'8", 2'4"×6'8", 2'6"×6'8", 2'8"×6'8", 2'10"×6'8" and 3'0"×6'8".

In another embodiment, the standard-sized entry way comprises a width ranging between about 2' feet to about 8' feet and a height ranging between about 5' feet to about 12' feet.

In another embodiment, the first side of the carrier material has a peel adhesion about equal to masking tape.

In another embodiment, the second side of the carrier material has a peel adhesion about equal to duct tape.

In another embodiment, the first side of the carrier material has a peel adhesion greater than or equal to 20 N/in.

In another embodiment, the second side of the carrier material has a peel adhesion less then or equal to 15 N/in.

In another embodiment, the roll of double-sided tape has a differential adhesive ratio that ranges between about 4:3 to about 6:1, the differential adhesive ratio being a ratio of the peel adhesion of the first side of the carrier material to the peel adhesion of the second side of the carrier material.

In another embodiment, the second side of the carrier material comprises a UV protectant.

In another embodiment, the roll of double-sided tape further comprises a tape liner positioned on the first side of the carrier material having the high-tack adhesive material thereon.

In another embodiment, the tape liner comprises a red-colored release liner.

In another embodiment, the at least one zipper comprises first and second flanges each having first and second teeth portions that can be meshed together or separated via a zipper pull.

In another embodiment, a pre-applied adhesive material is disposed on each of the first and second flanges of the at least one zipper.

In another embodiment, the at least one zipper further comprises a protective liner adhered to the pre-applied adhesive material disposed on each of the first and second flanges.

In another embodiment, the at least one zipper comprises a first zipper and a second zipper, the first and second zippers each comprising first and second flanges each having first and second teeth portions that can be meshed together or separated via a zipper pull.

In another embodiment, a pre-applied adhesive material is disposed on each of the first and second flanges of the first and second zippers.

In another embodiment, the partition assembly kit further comprises a cutter.

In another embodiment, the cutter comprises: a handle; first and second puncture fingers extending from the handle, the puncture fingers having piercing ends that are constructed and arranged to pierce the sheet of material to be cut at first and second piercing locations; and first and second blades between the piercing ends of the puncture fingers and the handle that are constructed and arranged to cut the sheet of material starting at the first and second piercing locations and extending in a direction of applied cutting force for cutting two parallel incisions in the sheet of material.

In another embodiment, the length of the at least one zipper is greater than 75% the height of the standard-sized entry way.

In another embodiment, the at least one zipper is at least 4 feet long.

In another embodiment, the at least one zipper is at least 5 feet long.

In another embodiment, the at least one zipper is at least 6 feet long.

In another embodiment, the at least one zipper is at least 7 feet long.

In another embodiment, the at least one zipper is at least 8 feet long.

In another embodiment, the at least one zipper is at least 9 feet long.

In another embodiment, the at least one zipper is at least 10 feet long.

In another embodiment, the sheet of material is of a sufficient size to cover a standard-sized entry way having dimensions selected from the group consisting of: 2'0"×6'8", 2'2"×6'8", 2'4"×6'8", 2'6"×6'8", 2'8"×6'8", 2'10"×6'8" and 3'0"×6'8".

In another aspect, a partition assembly kit, comprises: a receptacle; a sheet of material of a sufficient size to cover a standard-sized entry way; a roll of double-sided tape comprising a carrier material having a high-tack adhesive material on a first side of the carrier material and a low-tack adhesive material on a second side of the carrier material, wherein the first side of the carrier material has a peel adhesion greater than the second side of the carrier material; and at least one zipper having a length greater than 75% the height of the standard-sized entry way, wherein the receptacle comprises a container for storing the sheet of material, the roll of double-sided tape and the at least one zipper, wherein the container comprises one selected from the group consisting of a cardboard box, a paper box, a plastic container, a canvas bag and a cloth bag, wherein the sheet of material comprises at least one of a mono-film sheet material, a poly-film sheet material, a plastic or synthetic sheet material, a cloth material, a canvas material and a reinforced plastic tarp material, wherein the roll of double-sided tape has a differential adhesive ratio that ranges between about 4:3 to about 6:1, the differential adhesive ratio being a ratio of the peel adhesion of the first side of the carrier material to the peel adhesion of the second side of the carrier material, wherein the roll of double-sided tape further comprises a tape liner positioned on the first side of the carrier material having the high-tack adhesive material thereon, wherein the at least one zipper comprises first and second flanges each having first and second teeth portions that can be meshed together or separated via a zipper pull, and wherein a pre-applied adhesive material is disposed on each of the first and second flanges of the at least one zipper.

In another aspect, a method of assembling a partition mounting system, comprises: providing a receptacle having a sheet of material, a roll of double-sided tape and at least one zipper stored therein, wherein the roll of double-sided tape comprises a carrier material having a high-tack adhesive material of a first side of the carrier material and a low-tack adhesive material on a second side of the carrier material, wherein the first side of the carrier material has a peel adhesion greater than the second side of the carrier material; removing the roll of double-sided tape from the receptacle; affixing a portion of double-sided tape of the roll of double-sided tape to an entry way by placing the second side of the carrier material having the low-tack adhesive material thereon against the entryway; removing the sheet of material from the receptacle; affixing the sheet of material to the first side of the carrier material having the high-tack adhesive material thereon; removing the at least one zipper from the receptacle; and affixing the at least one zipper to the sheet of material, wherein a bottom portion of the zipper is aligned with a bottom portion of the sheet of material.

In one embodiment, the method further comprises removing a tape liner positioned on the first side of the carrier material, thus exposing the high-tack adhesive material prior to affixing the sheet of material to the first side of the carrier material.

In another embodiment, the method further comprises: providing a cutter stored in receptacle; removing the cutter from the receptacle; positioning the cutter at a top portion of an exposed portion of the sheet of material between first and second flanges of the at least one zipper; puncturing the sheet of material by applying a pressure to the cutter such that sharp tips of the cutter initially penetrate the exposed portion of the sheet of material; pulling the cutter in a downward cutting direction toward the bottom portion of the sheet of material, thereby cutting a swath of material from the sheet of material; and detaching the swatch of material from the sheet of material.

In another aspect, a roll of double-sided tape comprises: a carrier material having a high-tack adhesive material of a first side of the carrier material and a low-tack adhesive material on a second side of the carrier material, wherein the first side of the carrier material has a peel adhesion greater than the second side of the carrier material; and a tape liner positioned on the first side of the carrier material having the high-tack adhesive material thereon.

In one embodiment, the first side of the carrier material has a peel adhesion equal to masking tape.

In another embodiment, the second side of the carrier material has a peel adhesion equal to duct tape.

In another embodiment, the first side of the carrier material has a peel adhesion greater than or equal to 20 N/in.

In another embodiment, the second side of the carrier material has a peel adhesion less then or equal to 15 N/in.

In another embodiment, the roll of double-sided tape has a differential adhesive ratio that ranges between about 4:3 to about 6:1, the differential adhesive ratio being a ratio of the peel adhesion of the first side of the carrier material to the peel adhesion of the second side of the carrier material.

In another embodiment, the second side of the carrier material comprises a UV protectant.

In another embodiment, the tape liner comprises a red colored release liner.

In another embodiment, the first side of the carrier material has a peel adhesion greater than or equal to 30 N/in, the second side of the carrier material has a peel adhesion greater than or equal to 6 N/in and the first side of the carrier material has a peel adhesion greater than the second side of the carrier material.

In another aspect, a partition assembly kit, comprises: a receptacle; a sheet of material of a sufficient size to cover a standard-sized entry way; a roll of double-sided tape comprising a carrier material having a high-tack adhesive material on a first side of the carrier material and a low-tack adhesive material on a second side of the carrier material, wherein the first side of the carrier material has a peel adhesion greater than the second side of the carrier material; and at least one zipper having a length greater than 50% a height of the standard-sized entry way.

In some embodiments, the receptacle comprises a container for storing the sheet of material, the roll of double-sided tape and the at least one zipper.

In some embodiments, the receptacle comprises a resealable container.

In some embodiments, the receptacle comprises one selected from the group consisting of a cardboard box, a paper box, a plastic container, a canvas bag, a plastic bag and a cloth bag.

In some embodiments, the container is compartmentalized, such that each of the sheet of material, the roll of double-sided tape and the at least one zipper can be separated within the container.

In some embodiments, the sheet of material, the roll of double-sided tape and the at least one zipper are enclosed within the receptacle.

In some embodiments, the receptacle is compartmentalized, such that each of the sheet of material, the roll of double-sided tape and the at least one zipper can be separated within the receptacle.

In some embodiments, the receptacle comprises a first compartment, a second compartment and a third compartment.

In some embodiments, the sheet of material is stored within the first compartment.

In some embodiments, the roll of double-sided tape is stored within the second compartment.

In some embodiments, the at least one zipper is stored within the third compartment.

In some embodiments, the sheet of material comprises at least one of a mono-film sheet material, a poly-film sheet material, a plastic or synthetic sheet material, a cloth material, a canvas material and a reinforced plastic tarp material.

In some embodiments, the sheet of material is of a sufficient size to cover a standard-sized entry way comprising a door having dimensions selected from the group consisting of: 2'0"×6'8", 2'2"×6'8", 2'4"×6'8", 2'6"×6'8", 2'8"×6'8", 2'10"×6'8" and 3'0"×6'8".

In some embodiments, the standard-sized entry way comprises a width ranging between about 2' feet to about 8' feet and a height ranging between about 5' feet to about 12' feet.

In some embodiments, the first side of the carrier material has a peel adhesion about equal to that of masking tape.

In some embodiments, the first side of the carrier material has a peel adhesion about equal to that of painters tape.

In some embodiments, the second side of the carrier material has a peel adhesion about equal to that of duct tape.

In some embodiments, the first side of the carrier material has a peel adhesion greater than or equal to 20 N/in.

In some embodiments, the second side of the carrier material has a peel adhesion less then or equal to 15 N/in.

In some embodiments, the roll of double-sided tape has a differential adhesive ratio that ranges between about 4:3 to about 6:1, the differential adhesive ratio being a ratio of the peel adhesion of the first side of the carrier material to the peel adhesion of the second side of the carrier material.

In some embodiments, the second side of the carrier material comprises a UV protectant.

In some embodiments, the roll of double-sided tape further comprises a tape liner positioned on the first side of the carrier material having the high-tack adhesive material thereon.

In some embodiments, the tape liner comprises a red-colored release liner.

In some embodiments, the tape liner comprises a paper tape liner.

In some embodiments, the at least one zipper comprises first and second flanges each having first and second teeth portions that can be meshed together or separated via a zipper pull.

In some embodiments, a pre-applied adhesive material is disposed on each of the first and second flanges of the at least one zipper.

In some embodiments, the at least one zipper further comprises a protective liner adhered to the pre-applied adhesive material disposed on each of the first and second flanges.

In some embodiments, the at least one zipper comprises a first zipper and a second zipper, the first and second zippers each comprising first and second flanges each having first and second teeth portions that can be meshed together or separated via a zipper pull.

In some embodiments, a pre-applied adhesive material is disposed on each of the first and second flanges of the first and second zippers.

In some embodiments, the partition assembly kit further comprises a sheet cutter.

In some embodiments, the sheet cutter comprises: a handle; first and second puncture fingers extending from the handle, the puncture fingers having piercing ends that are constructed and arranged to pierce the sheet of material to be cut at first and second piercing locations; and first and second blades between the piercing ends of the puncture fingers and the handle that are constructed and arranged to cut the sheet of material starting at the first and second piercing locations and extending in a direction of applied cutting force for cutting two parallel incisions in the sheet of material.

In some embodiments, the length of the at least one zipper is greater than 75% the height of the standard-sized entry way.

In some embodiments, the carrier material of the roll of double-sided tape consists of a single carrier material.

In some embodiments, the carrier material comprises a paper carrier material.

In some embodiments, the at least one zipper is pre-attached to the sheet of material.

In some embodiments, the at least one zipper comprises first and second zippers.

In another aspect, a partition assembly kit, comprises: a receptacle; a sheet of material of a sufficient size to cover a standard-sized entry way; a roll of double-sided tape comprising a carrier material having a high-tack adhesive material on a first side of the carrier material and a low-tack adhesive material on a second side of the carrier material, wherein the first side of the carrier material has a peel adhesion greater than the second side of the carrier material; and at least one zipper having a length greater than 75% the height of the standard-sized entry way, wherein the sheet of material, the roll of double-sided tape and the at least one zipper are enclosed within the receptacle, wherein the receptacle comprises one selected from the group consisting of a cardboard box, a paper box, a plastic container, a canvas bag, a plastic bag and a cloth bag, wherein the sheet of material comprises at least one of a mono-film sheet material, a poly-film sheet material, a plastic or synthetic sheet material, a cloth material, a canvas material and a reinforced plastic tarp material, wherein the roll of double-sided tape has a differential adhesive ratio that ranges between about 4:3 to about 6:1, the differential adhesive ratio being a ratio of the peel adhesion of the first side of the carrier material to the peel adhesion of the second side of the carrier material, wherein the roll of double-sided tape further comprises a tape liner positioned on the first side of the carrier material having the high-tack adhesive material thereon, wherein the at least one zipper comprises first and second flanges each having first and second teeth portions that can be meshed together or separated via a zipper pull.

In another aspect, a method of assembling a partition mounting system, comprises: providing a receptacle having a sheet of material, a roll of double-sided tape and at least one zipper stored therein, wherein the roll of double-sided tape comprises a carrier material having a high-tack adhesive material of a first side of the carrier material and a low-tack adhesive material on a second side of the carrier material, wherein the first side of the carrier material has a peel adhesion greater than the second side of the carrier material; removing the roll of double-sided tape from the receptacle; affixing portions of the roll of double-sided tape to an entry way by placing the second side of the carrier material having the low-tack adhesive material thereon against the entryway; removing the sheet of material from the receptacle; and affixing the sheet of material to the first side of the carrier material having the high-tack adhesive material thereon.

In some embodiments, the method further comprises: removing the at least one zipper from the receptacle; and affixing the at least one zipper to the sheet of material.

In some embodiments, a bottom portion of the zipper is aligned with a bottom portion of the sheet of material.

In some embodiments, the method further comprises removing a tape liner positioned on the first side of the carrier material, thus exposing the high-tack adhesive material prior to affixing the sheet of material to the first side of the carrier material.

In some embodiments, the method further comprises: providing a cutter stored in the receptacle; removing the cutter from the receptacle; positioning the cutter at a top portion of an exposed portion of the sheet of material between first and second flanges of the at least one zipper; puncturing the sheet of material by applying a pressure to the cutter such that sharp tips of the cutter initially penetrate the exposed portion of the sheet of material; pulling the cutter in a downward cutting direction toward the bottom portion of the sheet of material, thereby cutting a swath of material from the sheet of material; and detaching the swatch of material from the sheet of material.

In another aspect, a roll of double-sided tape comprises: a carrier material having a high-tack adhesive material of a first side of the carrier material and a low-tack adhesive material on a second side of the carrier material, wherein the first side of the carrier material has a peel adhesion greater than the second side of the carrier material; and a tape liner positioned on the first side of the carrier material having the high-tack adhesive material thereon.

In some embodiments, the first side of the carrier material has a peel adhesion equal to that of masking tape.

In some embodiments, the first side of the carrier material has a peel adhesion equal to that of painters tape.

In some embodiments, the second side of the carrier material has a peel adhesion equal to that of duct tape.

In some embodiments, the first side of the carrier material has a peel adhesion greater than or equal to 20 N/in.

In some embodiments, the second side of the carrier material has a peel adhesion less then or equal to 15 N/in.

In some embodiments, the roll of double-sided tape has a differential adhesive ratio that ranges between about 4:3 to about 6:1, the differential adhesive ratio being a ratio of the peel adhesion of the first side of the carrier material to the peel adhesion of the second side of the carrier material.

In some embodiments, the second side of the carrier material comprises a UV protectant.

In some embodiments, the carrier material consists of a single carrier material.

In some embodiments, the carrier material is a paper carrier material.

In some embodiments, the carrier material is a paper carrier material.

In some embodiments, the tape liner comprises a red-colored release liner.

In some embodiments, the tape liner comprises a paper tape liner.

In some embodiments, the first side of the carrier material has a peel adhesion greater than or equal to 30 N/in, the second side of the carrier material has a peel adhesion greater than or equal to 6 N/in and the first side of the carrier material has a peel adhesion greater than the second side of the carrier material.

In another aspect, a sheet of material of a sufficient size to cover a standard-sized entry way, comprises: at least one of a mono-film sheet material, a poly-film sheet material, a plastic or synthetic sheet material, a cloth material, a canvas material and a reinforced plastic tarp material; and at least one zipper having a length greater than 50% the height of the standard-sized entry way, the at least one zipper being pre-attached to the sheet of material, wherein the sheet of material is of a sufficient size to cover a standard-sized entry way having a width ranging between about 2' feet to about 8' feet and a height ranging between about 5' feet to about 12' feet.

In some embodiments, the sheet of material is of a sufficient size to cover a standard-sized entry way having a door having dimensions selected from the group consisting of: 2'0"×6'8", 2'2"×6'8", 2'4"×6'8", 2'6"×6'8", 2'8"×6'8", 2'10"×6'8" and 3'0"×6'8".

In some embodiments, the length of the at least one zipper is greater than 75% the height of the standard-sized entry way.

In some embodiments, the at least one zipper comprises first and second flanges each having first and second teeth portions that can be meshed together or separated via a zipper pull.

In some embodiments, the at least one zipper comprises a first zipper and a second zipper, the first and second zippers each comprising first and second flanges each having first and second teeth portions that can be meshed together or separated via a zipper pull.

In some embodiments, the at least one zipper is pre-attached to the sheet of material by glue.

In some embodiments, the at least one zipper is sewn to the sheet of material.

In some embodiments, the at least one zipper is hot-melted to the sheet of material.

In some embodiments, the at least one zipper comprises first and second flanges, and wherein the sheet of material comprises a pre-cut opening between the first and second flanges.

In another aspect, a partition assembly kit, comprises: a receptacle; a sheet of material of a sufficient size to cover a standard-sized entry way; a roll of tape; and at least one zipper having a length greater than 50% a height of the standard-sized entry way, wherein the sheet of material, the roll of tape and the at least one zipper are provided within the receptacle.

In some embodiments, the roll of tape includes a roll of double-sided tape comprising a carrier material having a high-tack adhesive material on a first side of the carrier material and a low-tack adhesive material on a second side of the carrier material, and wherein the first side of the carrier material has a peel adhesion greater than the second side of the carrier material.

In some embodiments, the carrier material consists of a single-layer carrier material.

In some embodiments, the roll of tape includes a roll of single-sided tape comprises a single-layer carrier material having an adhesive material on a first side of the carrier material.

In some embodiments, the first side of the carrier material has a peel adhesion about equal to that of masking tape.

In some embodiments, the first side of the carrier material has a peel adhesion about equal to that of painters tape.

In some embodiments, a second side of the carrier material is exclusive of an adhesive material.

In some embodiments, the receptacle comprises a container for storing the sheet of material, the roll of double-sided tape and the at least one zipper.

In some embodiments, the receptacle comprises a resealable container.

In some embodiments, the receptacle comprises one selected from the group consisting of a cardboard box, a paper box, a plastic container, a canvas bag, a plastic bag and a cloth bag.

In some embodiments, the container is compartmentalized, such that each of the sheet of material, the roll of tape and the at least one zipper can be separated within the container.

In some embodiments, the sheet of material, the roll of tape and the at least one zipper are enclosed within the receptacle.

In some embodiments, the receptacle is compartmentalized, such that each of the sheet of material, the roll of tape and the at least one zipper can be separated within the receptacle.

In some embodiments, the receptacle comprises a first compartment, a second compartment and a third compartment.

In some embodiments, the sheet of material is stored within the first compartment.

In some embodiments, the roll tape is stored within the second compartment.

In some embodiments, the at least one zipper is stored within the third compartment.

In some embodiments, the sheet of material comprises at least one of a mono-film sheet material, a poly-film sheet material, a plastic or synthetic sheet material, a cloth material, a canvas material and a reinforced plastic tarp material.

In some embodiments, the sheet of material is of a sufficient size to cover a standard-sized entry way comprising a door having dimensions selected from the group consisting of: 2'0"×6'8", 2'2"×6'8", 2'4"×6'8", 2'6"×6'8", 2'8"×6'8", 2'10"×6'8" and 3'0"×6'8".

In some embodiments, wherein the standard-sized entry way comprises a width ranging between about 2' feet to about 8' feet and a height ranging between about 5' feet to about 12' feet.

In some embodiments, the first side of the carrier material has a peel adhesion about equal to that of masking tape.

In some embodiments, the first side of the carrier material has a peel adhesion about equal to that of painters tape.

In some embodiments, the second side of the carrier material has a peel adhesion about equal to that of duct tape.

In some embodiments, the first side of the carrier material has a peel adhesion greater than or equal to 20 N/in.

In some embodiments, the second side of the carrier material has a peel adhesion less then or equal to 15 N/in.

In some embodiments, the roll of double-sided tape has a differential adhesive ratio that ranges between about 4:3 to about 6:1, the differential adhesive ratio being a ratio of the peel adhesion of the first side of the carrier material to the peel adhesion of the second side of the carrier material.

In some embodiments, the second side of the carrier material comprises a UV protectant.

In some embodiments, the roll of double-sided tape further comprises a tape liner positioned on the first side of the carrier material having the high-tack adhesive material thereon.

In some embodiments, the tape liner comprises a red-colored release liner.

In some embodiments, the tape liner comprises a paper tape liner.

In some embodiments, the at least one zipper comprises first and second flanges each having first and second teeth portions that can be meshed together or separated via a zipper pull.

In some embodiments, a pre-applied adhesive material is disposed on each of the first and second flanges of the at least one zipper.

In some embodiments, the at least one zipper further comprises a protective liner adhered to the pre-applied adhesive material disposed on each of the first and second flanges.

In some embodiments, the at least one zipper comprises a first zipper and a second zipper, the first and second zippers each comprising first and second flanges each having first and second teeth portions that can be meshed together or separated via a zipper pull.

In some embodiments, a pre-applied adhesive material is disposed on each of the first and second flanges of the first and second zippers.

In some embodiments, the partition assembly kit further comprises a sheet cutter.

In some embodiments, the sheet cutter comprises: a handle; first and second puncture fingers extending from the handle, the puncture fingers having piercing ends that are constructed and arranged to pierce the sheet of material to be cut at first and second piercing locations; and first and second blades between the piercing ends of the puncture fingers and the handle that are constructed and arranged to cut the sheet of material starting at the first and second piercing locations and extending in a direction of applied cutting force for cutting two parallel incisions in the sheet of material.

In some embodiments, the length of the at least one zipper is greater than 75% the height of the standard-sized entry way.

In some embodiments, the carrier material of the roll of double-sided tape consists of a single carrier material.

In some embodiments, the carrier material comprises a paper carrier material.

In some embodiments, the at least one zipper is pre-attached to the sheet of material.

In some embodiments, the at least one zipper comprises first and second zippers.

In some embodiments, the at least one zipper is at least 4 feet in length.

In some embodiments, the at least one zipper is at least 5 feet in length.

In some embodiments, the at least one zipper is at least 6 feet in length.

In some embodiments, the at least one zipper is at least 7 feet in length.

In some embodiments, the at least one zipper is at least 8 feet in length.

In some embodiments, the sheet of material is of a sufficient size to cover a standard-sized entry way having dimensions selected from the group consisting of: 2'0"×6'8", 2'2"×6'8", 2'4"×6'8", 2'6"×6'8", 2'8"×6'8", 2'10"×6'8" and 3'0"×6'8".

In some embodiments, the partition assembly kit further comprises a strap.

In some embodiments, the strap includes a velcro strap.

In some embodiments, the strap includes a string.

In some embodiments, the strap includes one or more sheet hooks.

In some embodiments, the strap includes a pair of sheet hooks.

In some embodiments, the strap includes a plurality of sheet hooks.

In some embodiments, the strap is a solid, continuous wire.

In some embodiments, the wire is a metal wire.

In some embodiments, the metal wire includes a material selected from the group consisting of: steel, aluminum, iron and an alloy.

In some embodiments, the metal wire is coated with a coating.

In some embodiments, the coating comprises an anti-rust coating.

In some embodiments, the coating is colored.

In some embodiments, the strap is a solid molded strap.

In some embodiments, the strap is molded of a plastic material.

In another aspect, a partition strap, comprises: a first hook portion constructed to support a rolled up portion of a sheet of material; and a second hook portion connected to the first hook portion by an intermediate portion of the strap, the second hook portion constructed to engage the sheet of material.

In some embodiments, the second hook portion in constructed to pierce the sheet of material.

In some embodiments, concave portions of the first and second hook portions face one another.

In some embodiments, the first hook portion has a first radius of curvature and the second hook portion has a second radius of curvature. In one embodiment, the first radius of curvature is greater than the second radius of curvature.

In some embodiments, the second radius of curvature ranges between $\frac{1}{16}$ of an inch and $\frac{5}{8}$ of an inch.

In some embodiments, the first radius of curvature ranges between $1\frac{1}{2}$ inches and $3\frac{1}{4}$ inches.

In some embodiments, a first end portion of the strap curves outward from the first hook portion.

In some embodiments, the first end portion of the strap has a third radius of curvature greater than a first radius of curvature of the first hook portion and a second radius of curvature of the second hook portion.

In some embodiments, the third radius of curvature ranges between $3\frac{1}{2}$ inches and 6 inches.

In some embodiments, the partition strap further comprises a cap secured to a second end portion of the strap.

In some embodiments, the cap includes a material selected from the group consisting of: rubber and plastic.

In some embodiments, the partition strap further comprises a sleeve secured to a second end portion of the strap.

In some embodiments, the sleeve includes a material selected from the group consisting of: rubber and plastic.

In some embodiments, the sleeve includes a shrink wrap sleeve.

In some embodiments, a distal end of the strap is formed to neighbor a tip portion of a second end of the strap.

In some embodiments, the distal end of the strap is formed to abut the tip portion.

In some embodiments, the second end of the strap is formed in an elliptical shape.

In another aspect, a method of assembling a partition mounting system, comprises: providing a receptacle having a sheet of material, a roll of tape, at least one strap and at least one zipper stored therein; removing the sheet of material, the roll of tape, the at least one strap and the at least one zipper from the receptacle; affixing the sheet of material to an entryway with the one or more strips of the roll of tape; securing the at least one strap to an upper portion of the sheet of material; and rolling up a portion of the sheet of material and placing the rolled up portion of the sheet of material within a hook portion of the at least one strap.

In some embodiments, securing the at least one strap to an upper portion of the sheet of material includes: positioning the at least one strap about an upper portion of the sheet of material, between first and second zippers of the at least one zipper coupled to the sheet of material; and puncturing the sheet of material with a first end of the at least one strap thereby forming an opening in the sheet of material while at the same time securing the at least one strap to the sheet of material.

In another aspect, a partition assembly kit, comprises: a receptacle; a first strap; and a first zipper having a length greater than 50% a height of a standard-sized entry way, wherein the strap and the first zipper are provided within the receptacle.

In some embodiments, the partition assembly kit further comprises a second zipper having a length greater than 50% the height of the standard-sized entry way.

In some embodiments, the second zipper is provided within the receptacle.

In some embodiments, the partition assembly kit further comprises a sheet of material of a sufficient size to cover a standard-sized entry way.

In some embodiments, the sheet of material is provided within the receptacle.

In some embodiments, the partition assembly kit further comprises a roll of tape.

In some embodiments, the roll of tape is provided within the receptacle.

In some embodiments, the first strap is provided within the receptacle.

In some embodiments, the partition assembly kit further comprises a second strap.

In some embodiments, the second strap is provided within the receptacle.

In some embodiments, the first strap is the strap of claim 65.

In some embodiments, the first strap includes the strap of claim 65.

In some embodiments, the second strap is the strap of claim 65.

In some embodiments, the second strap includes the strap of claim 65.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIG. 7 is a table of technical data properties of double-sided tape in accordance with embodiments of the present inventive concepts.

DETAILED DESCRIPTION OF EMBODIMENTS

Figure 1A:
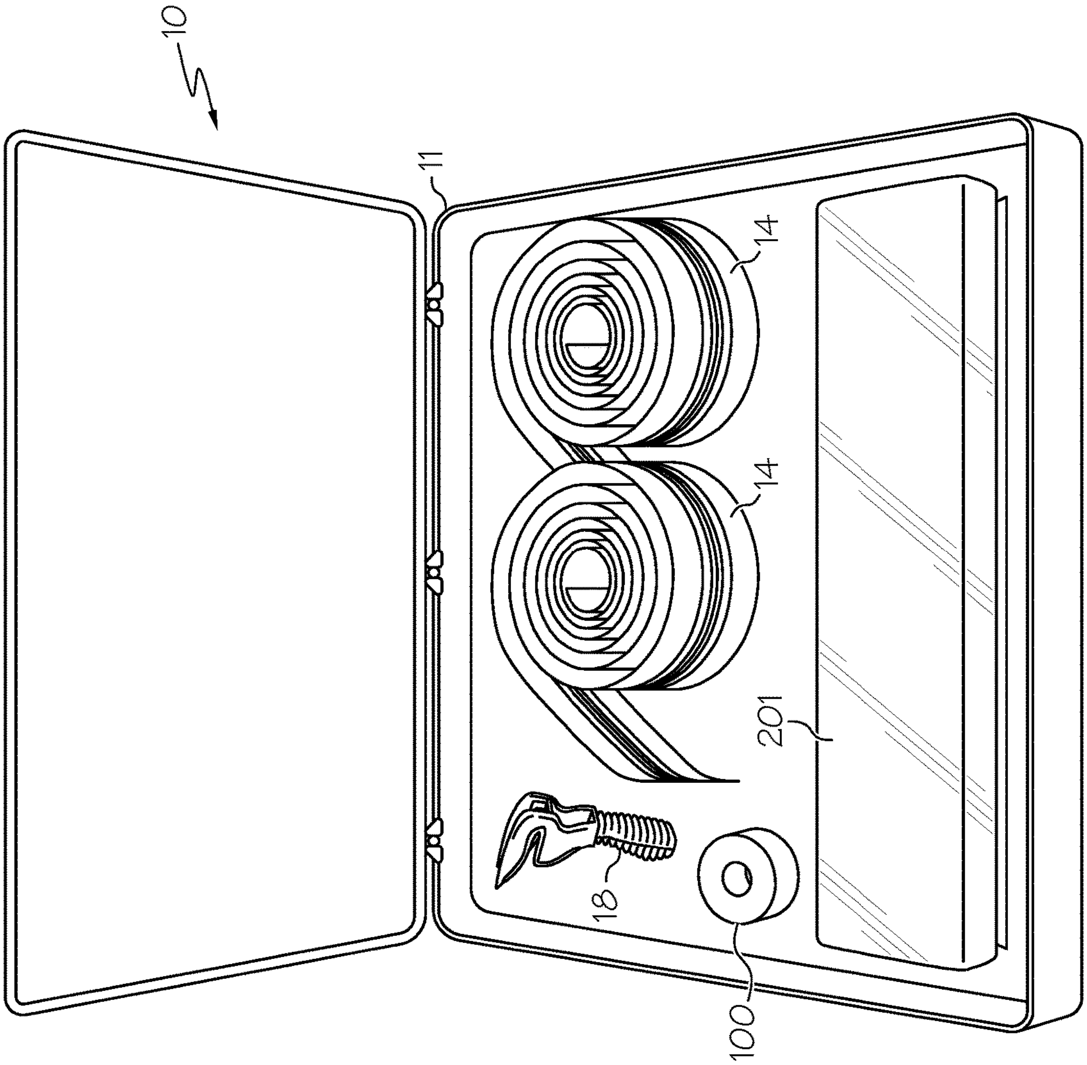
FIGS. 1A(A), 1A(B), 1B(A) and 1B(B) are perspective views of partition assembly kits including components and tools for assembling a partition mounting system in accordance with embodiments of the present inventive concepts.
Figure 1A:
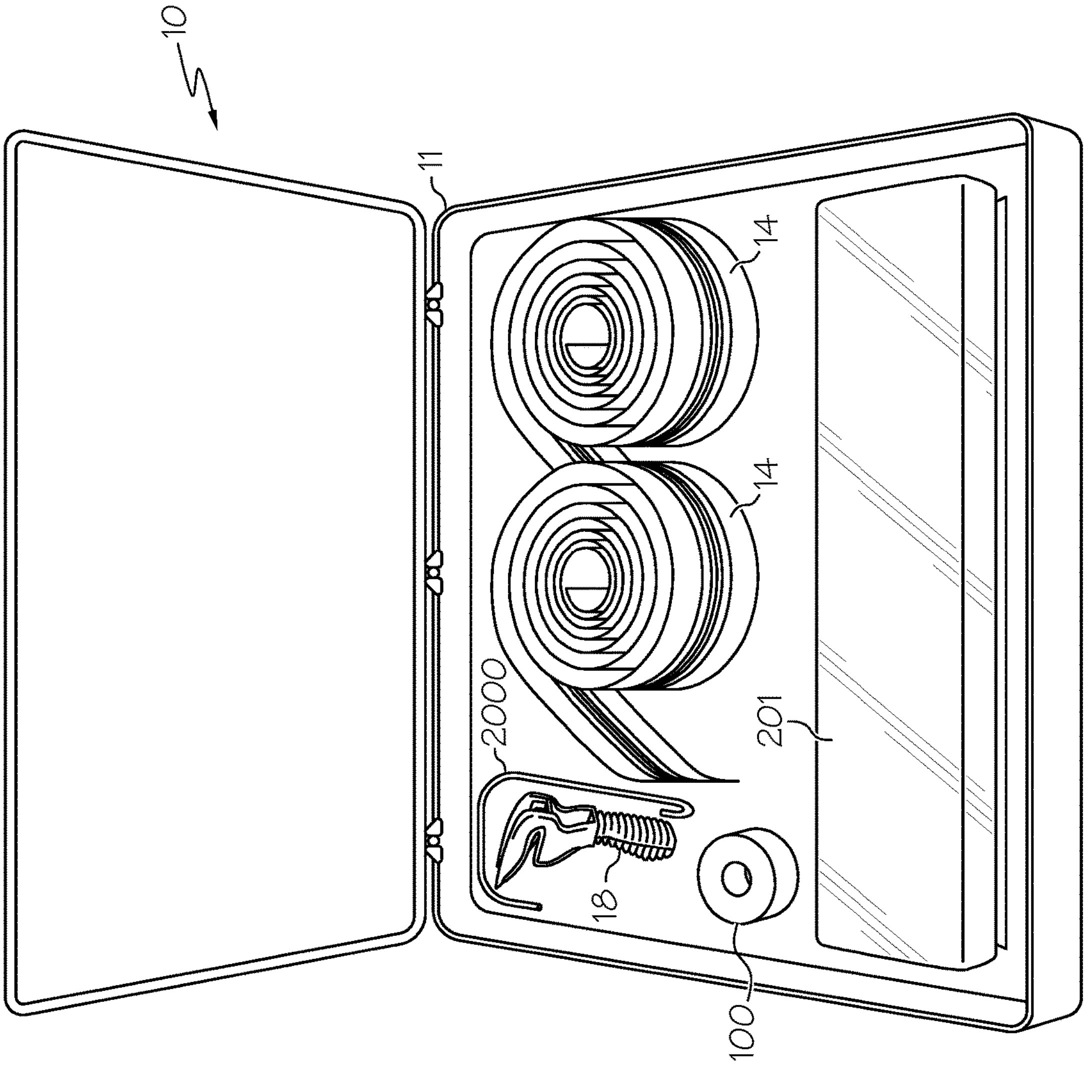

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Embodiments of the present inventive concepts provide a partition assembly kit having components and tools that can be used to assemble a partition mounting system. In one exemplary embodiment, the partition mounting system is assembled using the components and tools provided in a partition assembly kit, and can be assembled to provide for human ingress into, or egress from, a room of a building at an entry way. In various examples, the entry way can include a sheet-rocked and plastered threshold, a door frame having no door, a door frame having a door, a sliding doorway, a doorway, a door frame, or other type of entry way. In one embodiment, the partition assembly kit includes a receptacle that contains the components and tools that can be used to assemble a partition mounting system, which can substantially seal or otherwise separate, a first region of a building or room from a second region of a building or room, or a first region of a building or room from an environment external to the building or room, where the first and second regions are themselves joined at an entry way, a doorway, a door frame, a window frame or other framed threshold.

In one embodiment, the components and tools of the partition assembly kit are constructed and arranged so that the partition mounting system can be installed at an entry way of a standard-sized door of a building, for example an entry way having a standard-sized door selected from one of the following standard-sized door dimensions: 2'0"×6'8", 2'2"×6'8", 2'4"×6'8", 2'6"×6'8", 2'8"×6'8", 2'10"×6'8" and 3'0"×6'8". In another embodiment, the components and tools of the partition assembly kit are constructed and arranged so that the partition mounting system can be installed at an entry way having a width ranging between about 2' feet to about 8' feet and of a height ranging between about 5' feet to about 12' feet. In this manner, the environment of a first region of the building or room can be substantially sealed from the environment of a second region of the building or room, or external environment, while allowing ingress to and egress from the first region of the building or room via a zippered opening. In one embodiment, rapid ingress and egress by a human can be achieved by a zippered opening that is assembled using at least one zipper included in the partition assembly kit. In another embodiment, rapid ingress and egress by a human can be achieved by a zippered opening that is assembled using first and second zippers that are included in the partition assembly kit.

FIGS. 1A(A), 1A(B), 1B(A) and 1B(B) are perspective views of partition assembly kits including components and tools for assembling a partition mounting system in accordance with embodiments of the present inventive concepts. A partition assembly kit 10 can comprise a receptacle 11 that contains various components and tools for assembling a partition mounting system. In one embodiment, the receptacle 11 is a plastic container. In another embodiment, the receptacle 11 is a cardboard box, paper box, plastic bag or other type of container that can be used for storing and/or managing the partition assembly kit components and tools. The receptacle 11 can optionally include one or more clasps for securing the contents of the receptacle 11. For example, the claps can comprise elastic straps or hooks.

Referring to FIGS. 1A(A) and 1A(B), the components and tools included in the partition assembly kit 10 can include, in one embodiment, at least one sheet of material 201, at least one zipper 14, a roll of single-sided tape or a roll of double-sided tape 100 and a cutter 18. In this exemplary embodiment, the partition assembly kit 10 of FIGS. 1A(A) and 1A(B) comprises first and second zippers 14. However, the partition assembly kit 10 of FIGS. 1A(A) and 1A(B) may comprise a single zipper 14.

In addition, the partition assembly kit 10 can include an optional strap 2000 or pair of straps 2000, which is illustrated and described in greater detail with reference to FIGS. 8-12(D).

Figure 1B:
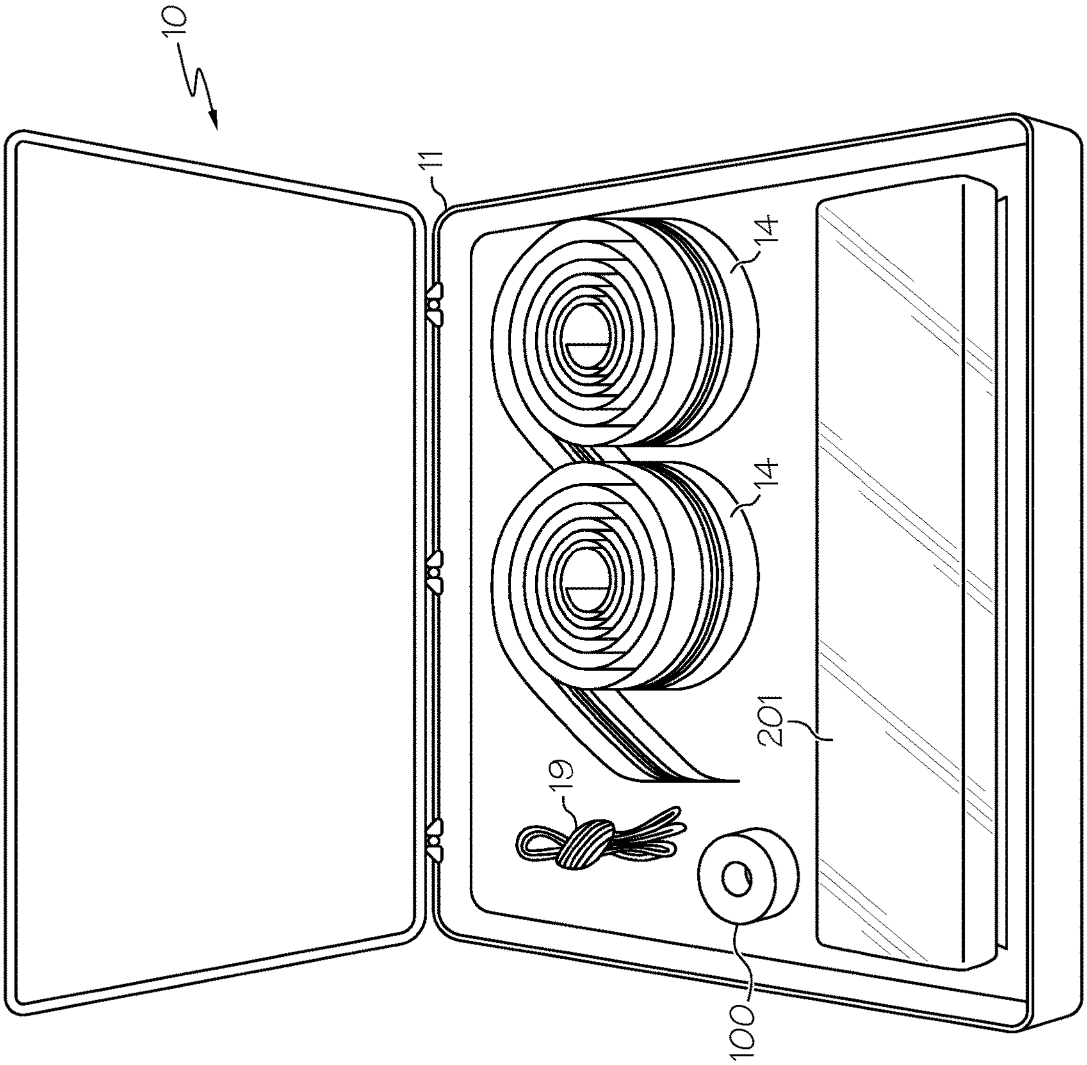
FIGS. 1C(A), 1C(B) and 1D are perspective views of partition assembly kits including components and tools for assembling a partition mounting system in accordance with other embodiments of the present inventive concepts.
Figure 1B:
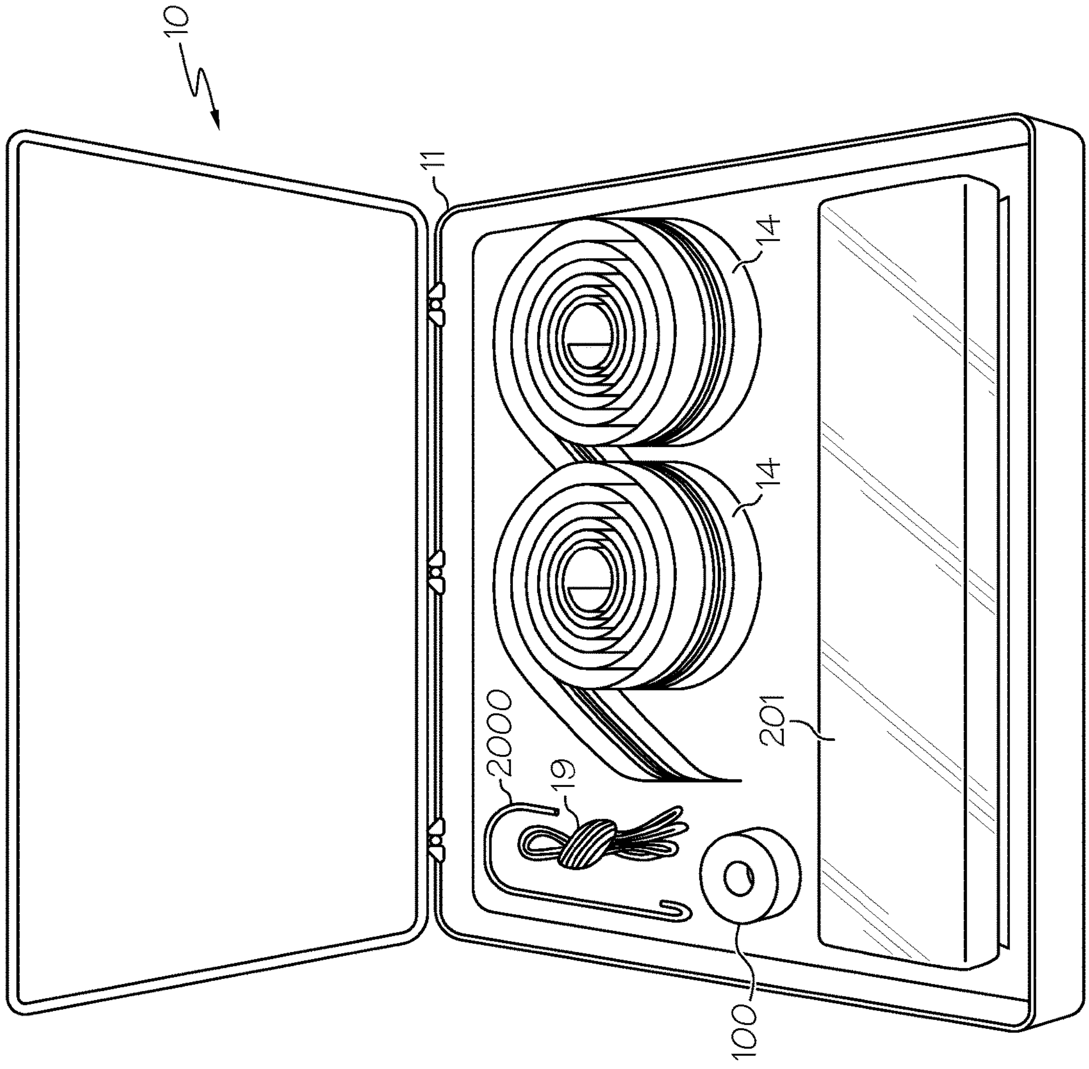

Referring to FIGS. 1B(A) and 1B(B), the components and tools included in the partition assembly kit 10 can include, in another embodiment, at least one sheet of material 201, at least one zipper 14 and a roll of single-sided tape or a roll of double-sided tape 100. In this exemplary embodiment, the partition assembly kit 10 of FIGS. 1B(A) and 1B(B) comprise first and second zippers 14. However, the partition assembly kit 10 of FIGS. 1B(A) and 1B(B) may optionally comprise a single zipper 14.

In addition, the partition assembly kit 10 can include an optional strap 2000 or pair of straps, which is illustrated and described in greater detail with reference to FIGS. 8-12(D).

The partition assembly kit 10 of any of the embodiments described herein can optionally include a strap 19, 2000, such as, a string, Velcro strap, sheet hook or other mechanism for securing a temporary opening formed in the sheet of materials 201, for example, in the manner described in further detail below in connection with FIGS. 6E(A) and 6E(B). Although not shown in each partition assembly kit, the strap 19, 2000 can be optionally included in any of the partition assembly kit embodiments described herein.

Referring to FIGS. 1A(A) through 1B(B), the sheet of material 201 can include, in various embodiments, a mono-film, poly-film, plastic or other synthetic sheet, a cloth or canvas sheet, or a reinforced plastic tarp. The sheet of material 201 is preferably of a width and height so that the sheet of material 201 is of a sufficient size to cover a standard-sized entry way or window frame. In one embodiment, the sheet of material 201 is dimensioned to sufficiently cover an entry way having a standard-sized door of the following dimensions: 2'0"×6'8", 2'2"×6'8", 2'4"×6'8", 2'6"×6'8", 2'8"×6'8", 2'10"×6'8" and 3'0"×6'8" (for example, 6'8" represents 6 feet, 8 inches). In another embodiment, the sheet of material 201 is dimensioned to sufficiently cover an entry way having a width ranging between about 2' feet to about 8' feet and of a height ranging between about 5' feet to about 12' feet. In another embodiment, the sheet of material 201 is of a dimension selected from the group of dimensions consisting of about: 3'×18', 4'×6', 5'×7', 5'×20', 6'×8', 6'×10', 6'×12', 6'×16', 6'×20', 6'×30', 6'×40', 7'×10', 7'×20', 7'×30', 7'×40', 8'×10', 8'×12', 8'×16', 8'×18', 8'×20', 9'×12', 10'×10', 10'×12', 10'×15', 10'×16', 10'×18', 10'×20', 10'×30', 10'×40', 10'×60', 12'×12', 12'×14', 12'×16', 12'×18', 12'×20', 12'×24', 12'×25', 12'×30', 12'×40', 12'×100', 14'×16', 14'×18', 14'×20', 14'×24', 14'×26', 15'×15', 15'×20', 15'×25', 15'×30', 15'×35', 15'×40', 16'×20', 16'×24', 16'×28', 16'×30', 16'×32', 18'×18', 18'×24', 18'×32', 18'×36', 18'×48', 20'×20', 20'×22', 20'×24', 20'×25', 20'×30', 20'×40', 20'×50', 20'×100', 22'×30', 22'×50', 24'×30', 24'×36', 24'×40', 24'×60', 25'×25', 25'×40', 25'×45', 25'×82', 26'×40', 26'×48', 30'×30', 30'×40', 30'×50', 30'×60', 30'×82', 40'×40', 40'×50', 40'×60', 40'×80', 40'×100', 50'×50', 50'×100', 60'×60', 60'×120', 100'×100' and 120'×120'.

Figure 1C:
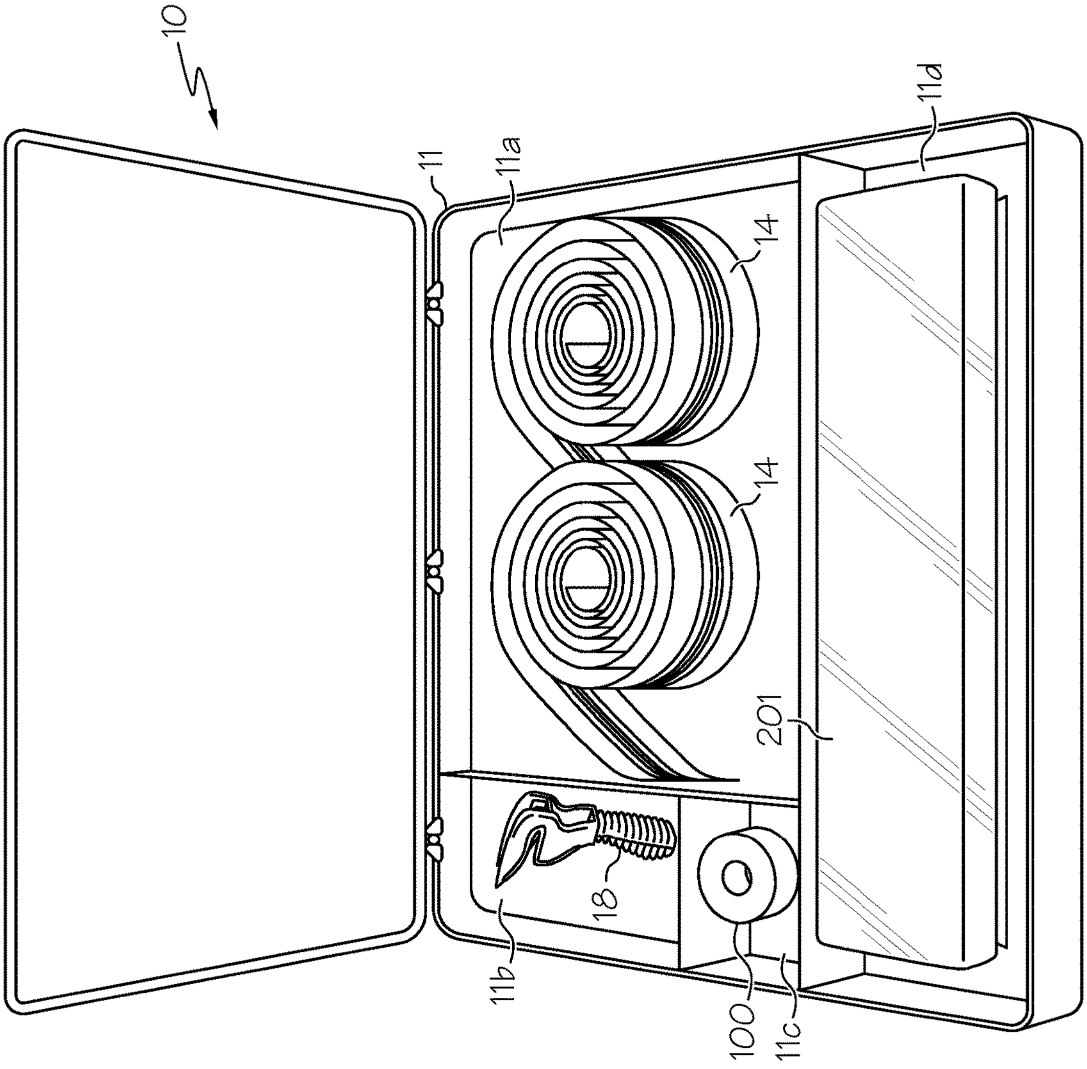
Figure 1C:
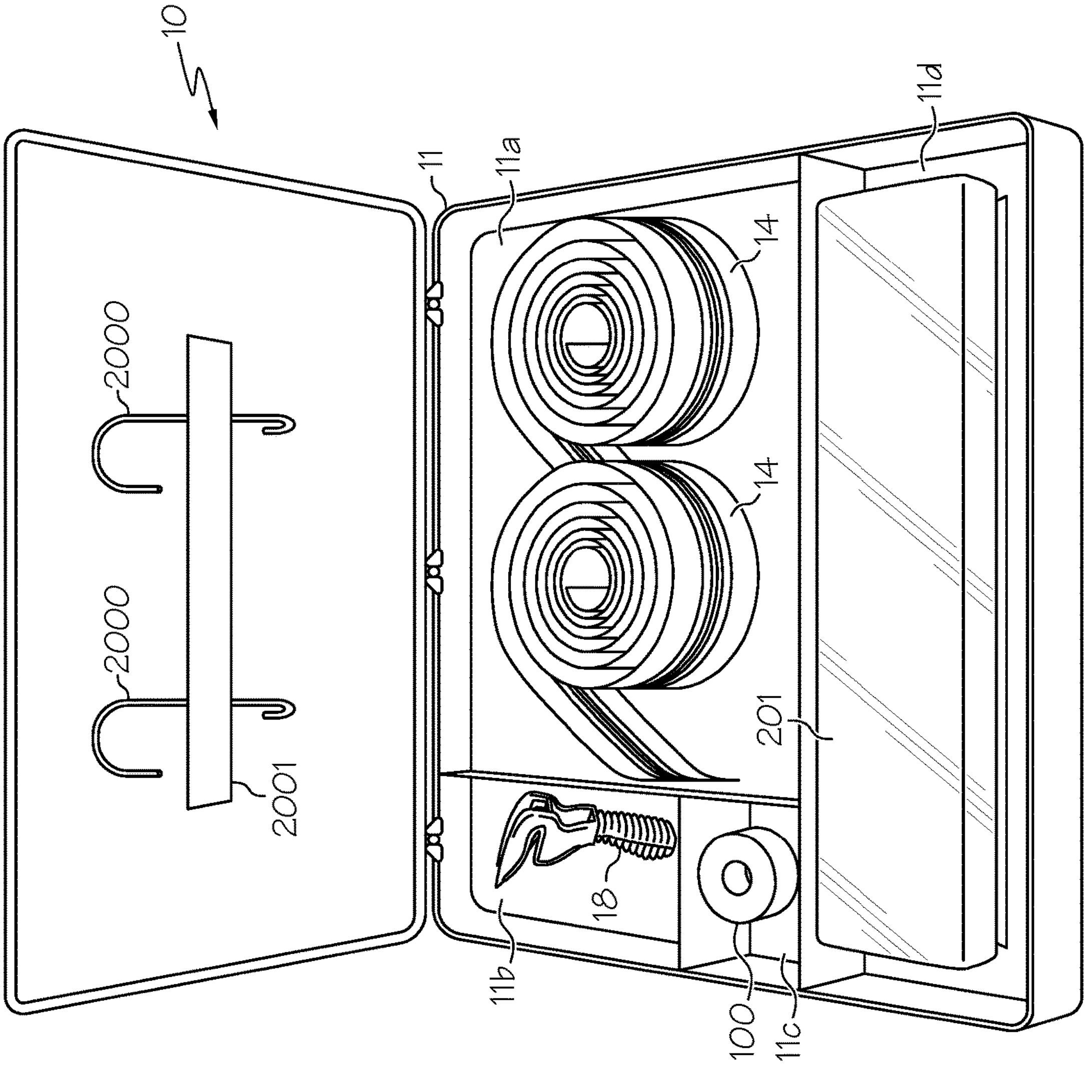

FIGS. 1C(A) through 1D are perspective views of partition assembly kits including components and tools for assembling a partition mounting system in accordance with other embodiments of the present inventive concepts. Elements having the same functions as those illustrated in FIGS. 1A(A) through 1B(B) are indicated by like reference identifiers, and thus their detailed description will be omitted.

Referring to FIGS. 1C(A) and 1C(B), the receptacle 11 is compartmentalized, such that each of the sheet of material 201, the roll of single-sided tape or the roll of double-sided tape 100, the first and second zippers 14 and the cutter 18 are separated within the receptacle 11. The receptacle 11 comprises a first compartment 11*a* for housing the first and second zippers 14, a second compartment 11*b* for housing the cutter 18, a third compartment 11*c* for housing the roll of double-sided tape 100 and a fourth compartment 11*d* for housing the sheet of material 201.

Referring to FIG. 1C(B), the receptacle 11 can optionally include one or more clasps 2001 for securing the contents of the receptacle 11. For example, as illustrated in FIG. 1C(B) the clasp 2001 can comprise an elastic strap, which can be constructed and arranged within the receptacle 11 to secure one or more straps 2000.

Figure 1D:
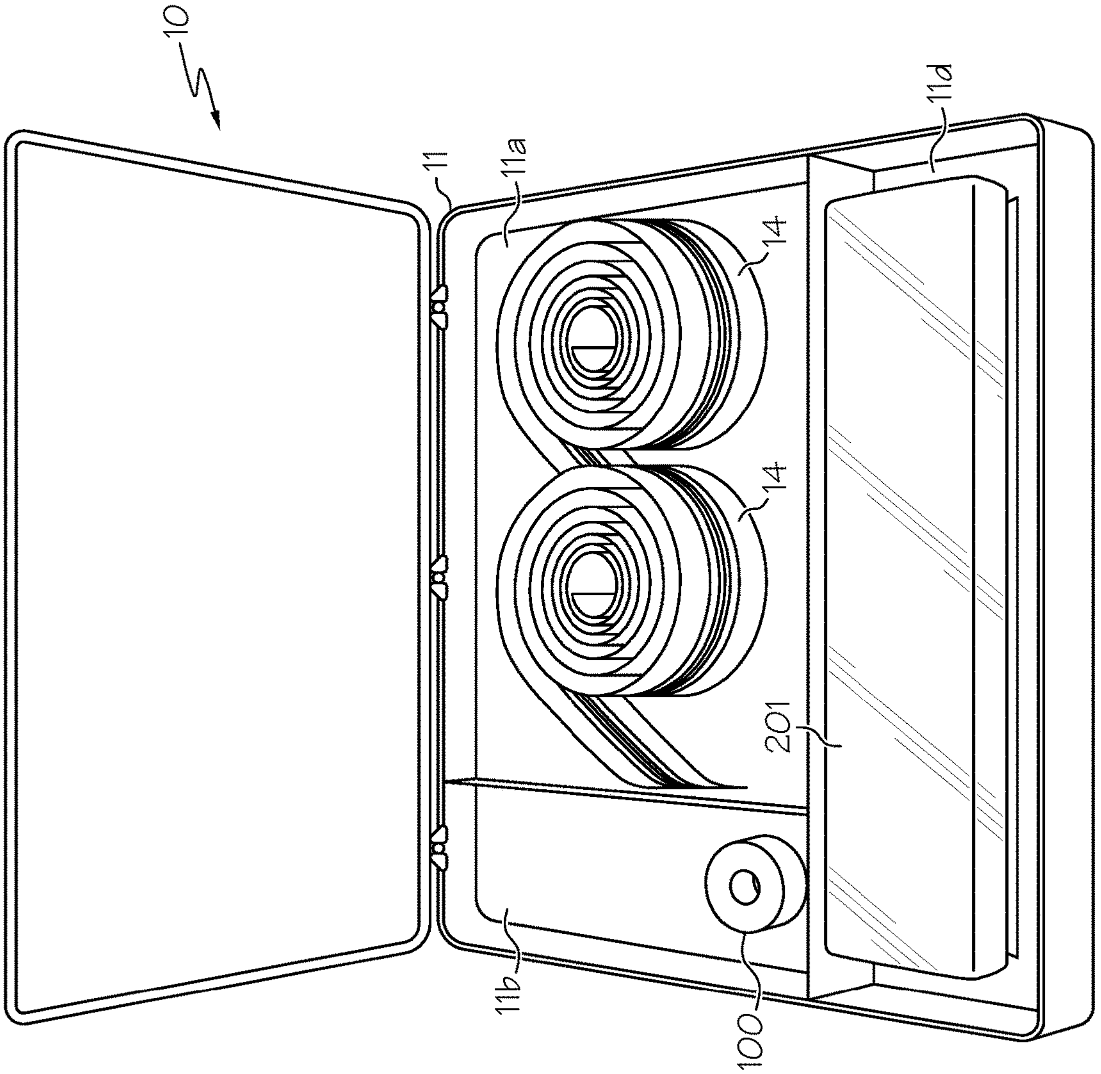

Referring to FIG. 1D, the receptacle 11 is compartmentalized, such that each of the sheet of material 201, the roll of single-sided tape or the roll of double-sided tape 100 and the first and second zippers 14 are separated within the receptacle 11. The receptacle 11 comprises a first compartment 11*a* for housing the first and second zippers 14, a second compartment 11*b* for housing the roll of double-sided tape 100 and a third compartment 11*d* for housing the sheet of material 201.

Figure 2A:
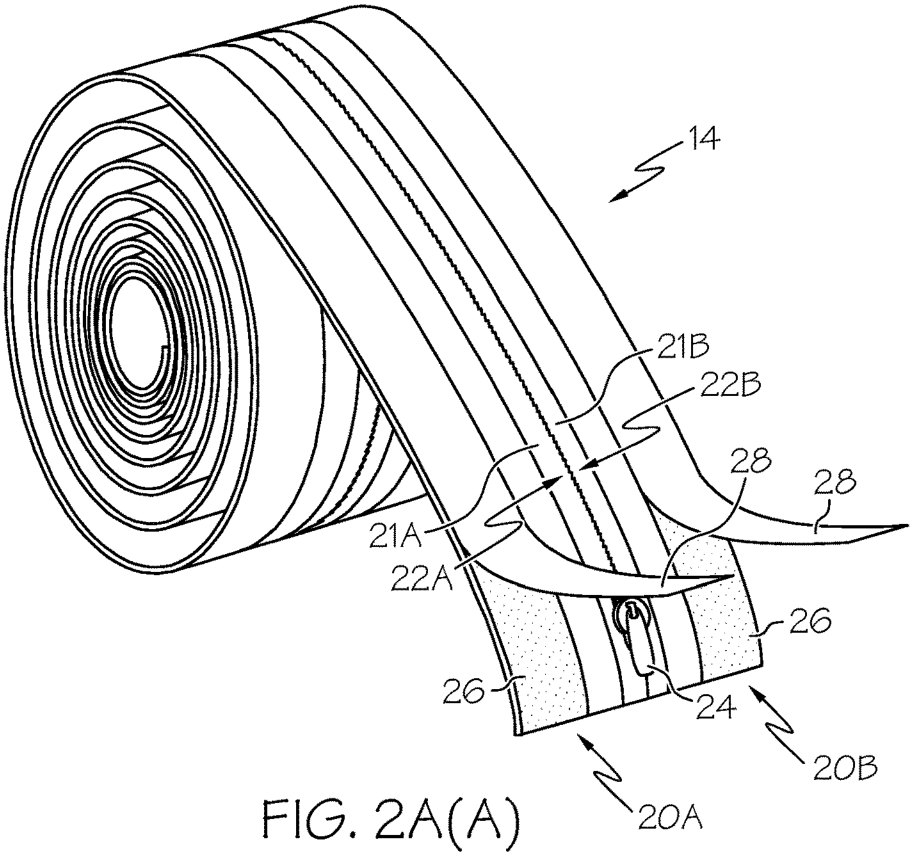
FIGS. 2A(A) and 2A(B) are perspective views of zippers of a type that can be included with the partition assembly kits of FIGS. 1A(A) through 1D, in accordance with embodiments of the present inventive concepts.
Figure 2A:
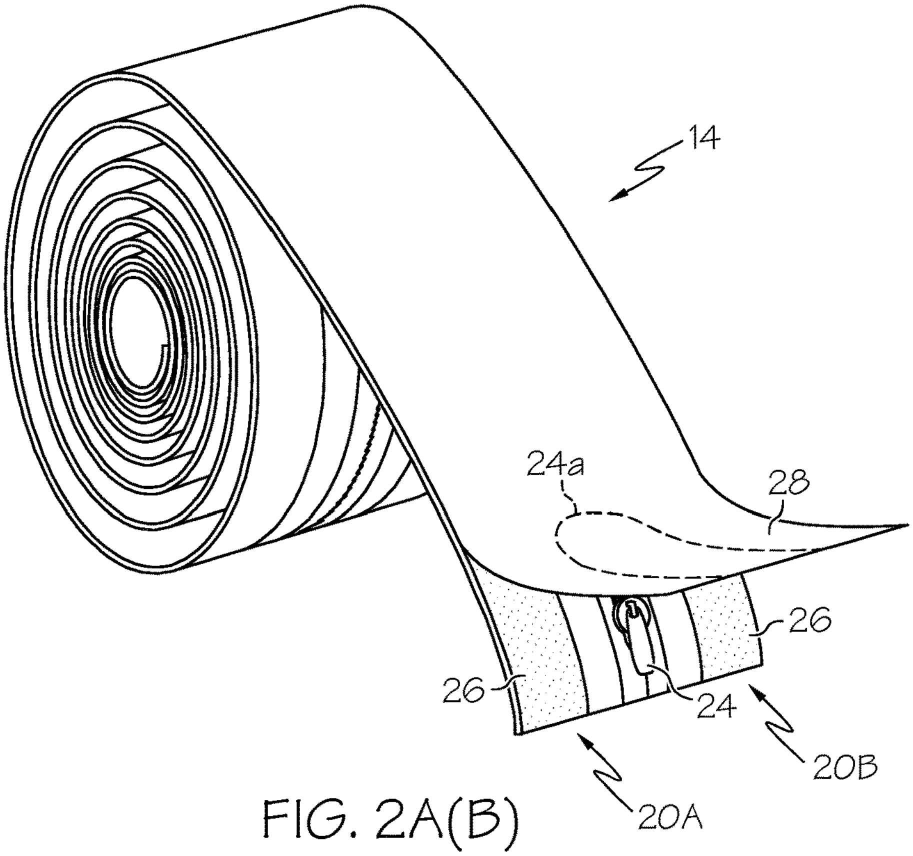

FIGS. 2A(A) and 2A(B) are perspective views of zippers of a type that can be included with the partition assembly kits of FIGS. 1A through 1D, in accordance with embodiments of the present inventive concepts. In these exemplary embodiments, a pre-applied adhesive material 26 is provided on the left and right flanges 20A, 20B of the zipper 14. The left and right flanges 20A, 20B may comprise a plurality of left and right teeth portions 22A, 22B.

The zipper 14 may include front and rear zipper pulls 24 that interlock and open the left and right teeth portions 22A, 22B of the zipper 14. In one embodiment, the left and right teeth portions 22A, 22B each comprise a plurality of individual nylon, polyester or metal teeth. In another embodiment, the left and right teeth portions 22A, 22B each comprise a continuous nylon or polyester coil. The zipper 14 can further include zipper pulls 24, which can be hand operated, and move along the left and right teeth portions 22A, 22B of the zipper 14 so that the left and right teeth portions 22A, 22B can be meshed together, or separated.

Referring to FIG. 2A(A), disposed on each flange 20A, 20B is a pre-applied adhesive material 26 having a protective paper strip 28 or tape liner adhered thereto. The protective paper strips 28 or tape liners protect the adhesive material 26 from dust, dirt and debris, until the zipper 14 is ready to be applied to a sheet of material 201.

In this embodiment, the flanges 20A, 20B can be attached to left and right zipper materials 21A, 21B, to which the left and right teeth portions 22A, 22B are attached, respectively. The zipper materials 21A, 21B can comprises cloth, fabric, reinforcement, nylon mesh, polyester mesh and the like. The flanges can comprise a cloth material, a fabric material, a reinforcement material, a nylon mesh material, a polyester mesh material and the like.

For example, the zipper 14 may be packaged in the partition assembly kits 10 of FIGS. 1A(A) through 1D having a pre-applied adhesive material 26 having a protective paper strip 28 or tape liner adhered thereto.

Referring to FIG. 2A(B), disposed on each flange 20A, 20B is a pre-applied adhesive material 26. A single protective paper strip 28 or tape liner may be placed over both left and right flanges 20A, 20B having the pre-applied adhesive material thereon. In this manner, the protective paper strip 28 or tape liner protects the adhesive material 26 from dust, dirt and debris, until the zipper 14 is ready to be applied to a sheet of material 201, and the single protective paper strip 28 or tape liner can be removed from the adhesive material 26 present on the left and right flanges 20A, 20B at the same time.

The protective paper strip 28 or tape liner can optionally include a cutout 24*a*. The cutout 24*a* can provide an opening for the zipper pull 24, while allowing the protective paper strip 28 or tape liner to protect the adhesive material 26 on the left and right flanges 20A, 20B.

In this embodiment, a plurality of left and right teeth portions 22A, 22B are attached directly to the left and right flanges 20A, 20B. The flanges can comprise a cloth material, a fabric material, a reinforcement material, a nylon mesh material, a polyester mesh material and the like.

For example, the zipper 14 may be packaged in the partition assembly kits 10 of FIGS. 1A(A) through 1D having a pre-applied adhesive material 26 having a protective paper strip 28 or tape liner adhered thereto.

Figure 2B:
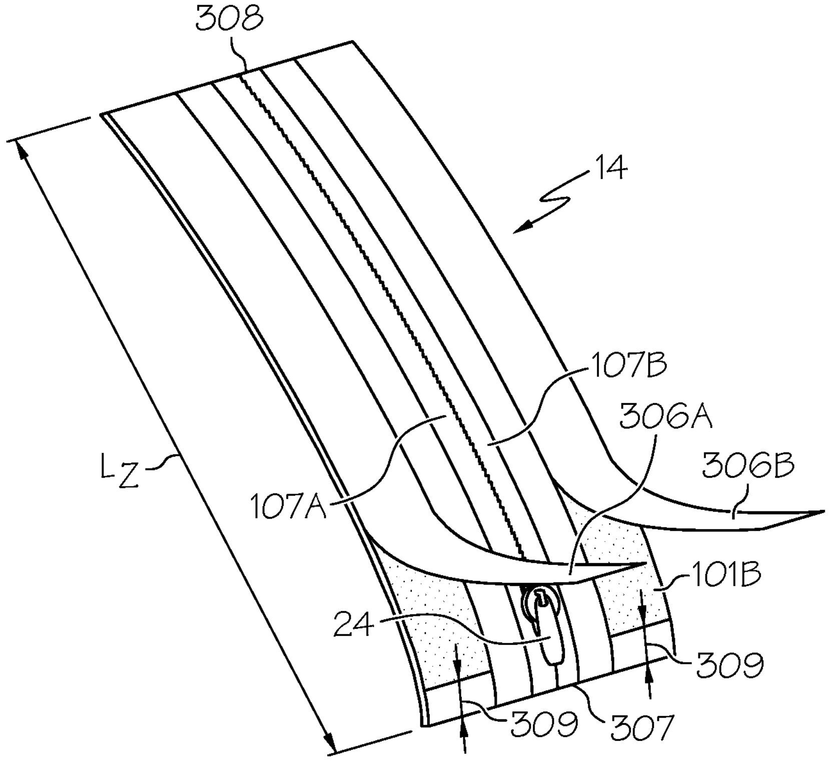
FIG. 2B is a perspective view of a zipper of a type that can be included with the partition assembly kits of FIGS. 1A(A) through 1D, in accordance with other embodiments of the present inventive concepts.

FIG. 2B is a perspective view of a zipper of a type that can be included with the partition assembly kits of FIGS. 1A(A) through 1D, in accordance with other embodiments of the present inventive concepts. In this exemplary embodiment, first and second tape strips 306A, 306B of the roll of double-side tape 100 included in the partition assembly kit 10 are sectioned and adhered to the left and right flanges 101A, 101B of the zipper 14, respectively, by an installer. The first and second tape strips 306A, 306B can be adhered along the entire length (i.e. from top 307 to bottom 308) of the left and right flanges 101A, 101B of the zipper 14. Further, the first and second tape strips 306A, 306B can be adhered from a distance 309 below the top 307 of the reusable zipper 14, and along the length of the reusable zipper 14, to the bottom 308 of the reusable zipper 14. As such, an installer, such as the installer 200 illustrated in FIGS. 3A-M(B), can apply the zipper 14, having the first and second tape strips 306A, 306B on the left and right flanges 101A, 101B, to a sheet of material 201 of a partially assembled partition mounting system (see for example FIG. 3D).

The distance 309 from the top 307 of the zipper 14 free from the first and second tape strips 306A, 306B can be utilized as pull tabs for eventual removal of the zipper 14 from the combination of the tape strips 306A, 306B and the sheet of material 201. Although not shown with reference to FIGS. 2A(A) and 2A(B), the pre-applied adhesive material 26 of the zippers 14 illustrate at FIGS. 2A(A) and 2A(B) can be setback a distance from the top of the zipper so that pull tabs can be provided for the eventual removal of the zipper 14 from the sheet of material 201.

The zipper 14 of the embodiments described herein can have a length LZ, which ranges, in some embodiments, between about 5 feet and about 12 feet in length. In other embodiments, the length LZ can be less than 5 feet or greater than 12 feet in length. In one embodiment, the length LZ of the zipper is greater than 50% the height of a standard-sized entry way. In another embodiment, the length LZ of the zipper is greater than 75% the height of a standard-sized entry way. In another embodiment, the length LZ of the zipper is at least 4 feet long. In another embodiment, the length LZ of the zipper is at least 5 feet long. In another embodiment, the length LZ of the zipper is at least 6 feet long. In another embodiment, the length LZ of the zipper is at least 7 feet long. In another embodiment, the length LZ of the zipper is at least 8 feet long. In another embodiment, the length LZ of the zipper is at least 9 feet long. In another embodiment, the length LZ of the zipper is at least 10 feet long.

Figure 2C:
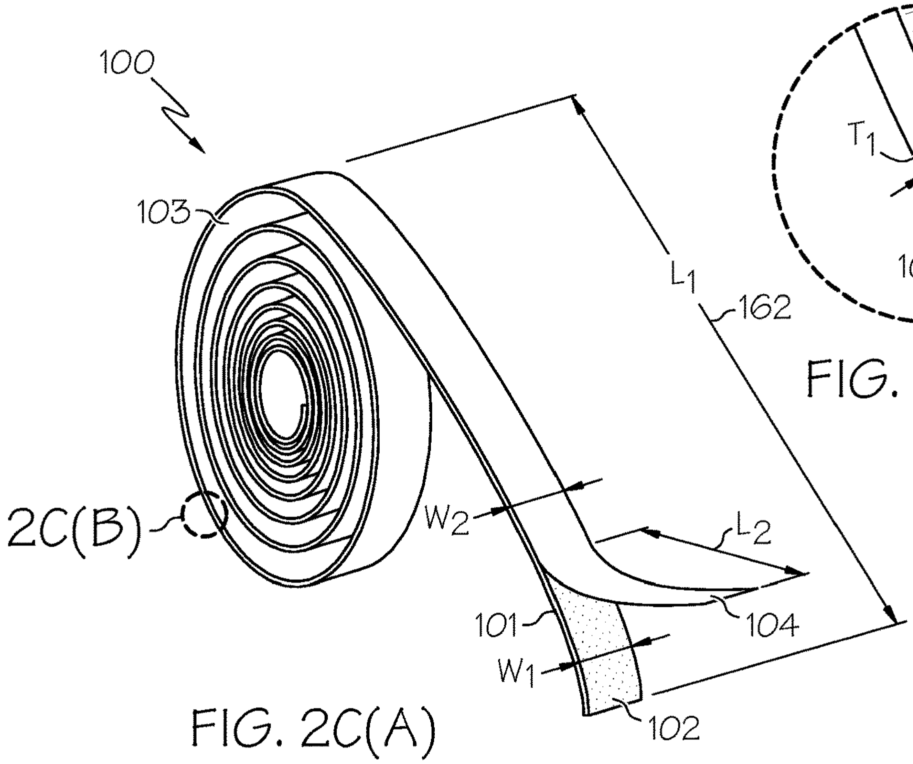
FIGS. 2C(A) and 2C(B) are exploded perspective views of a roll of double-sided tape of a type that can be included with the partition assembly kits of FIG. 1A(A) through 1D, in accordance with embodiments of the present inventive concepts.
Figure 2C:
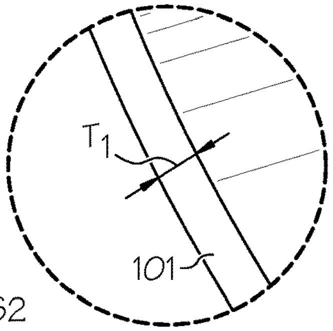
Figure 4A:
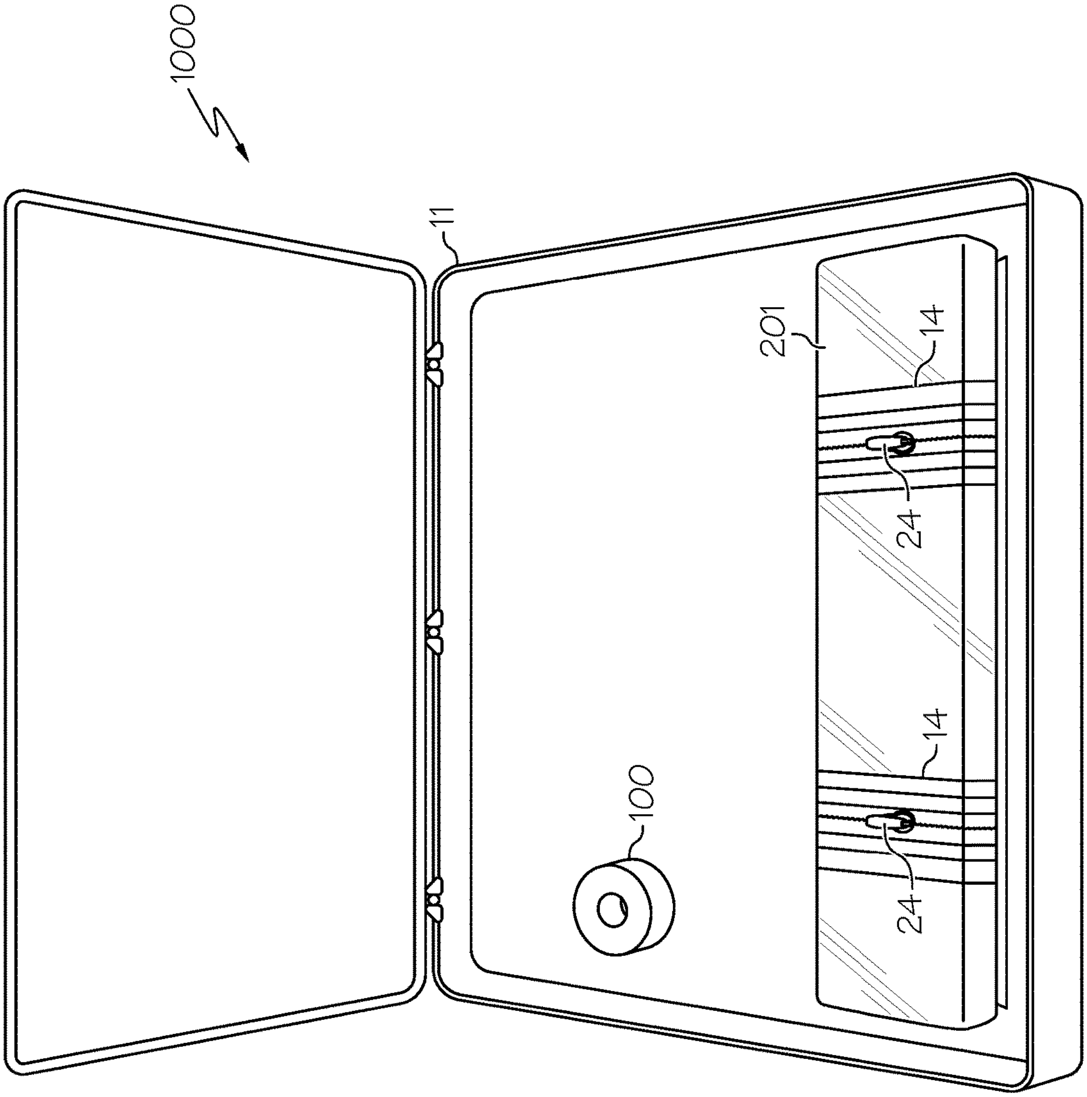
FIGS. 4A(A) and 4A(B) are perspective views of a partition assembly kit including components and tools for assembling a partition mounting system in accordance with another embodiment of the present inventive concepts.
Figure 4A:
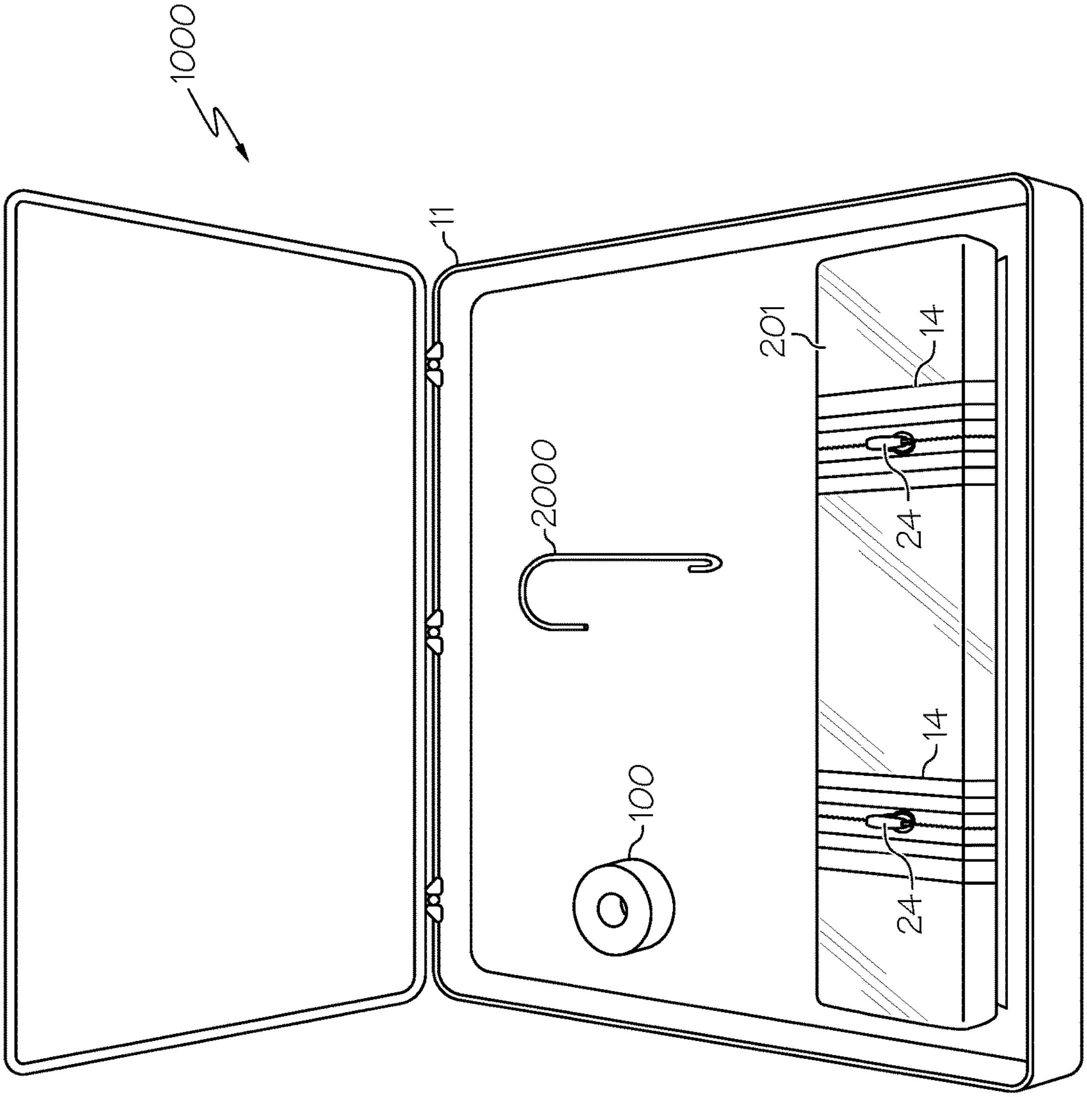

FIGS. 2C(A) and 2C(B) are exploded perspective view of a roll of double-sided tape 100 of a type that can be included with the partition assembly kits of FIGS. 1A(A) through 1D and FIGS. 4A(A) through 4F(B), in accordance with embodiments of the present inventive concepts. In other embodiments, the roll of double-sided tape 100 can be provided exclusive of the partition assembly kits disclosed herein, and provided on its own. The roll of double-sided tape 100 can comprise a carrier material 101 having a high-tack adhesive material 102 on a first side of the carrier material 101 and a low-tack adhesive material 103 on a second side of the carrier material 101. The carrier material 101 can comprise any of a number of carrier materials. In some embodiments, the carrier material 101 comprises paper, such as, crepe paper, calendared paper, rope paper, and the like. The carrier material 101 has a thickness T1, which ranges, in some embodiments, between about 0.1 mm to about 0.3 mm. In this manner, the resulting double-sided tape having a paper carrier material may be easily ripped or torn by hand.

In one embodiment, the roll of double-sided tape 100 comprises a single-layer carrier material 101 having a high-tack adhesive material 102 on a first side of the carrier material 101 and a low-tack adhesive material 103 on a second side of the carrier material 101. In other embodiments, the roll of double-sided tape 100 comprises a multi-layer carrier material 101 having a high-tack adhesive material 102 on a first side of a first carrier material 101 and a low-tack adhesive material 103 on a first side of a second carrier material 101. In this embodiment, the second sides of first and second carrier materials 101 can be affixed together by an adhesive material or other suitable substrate.

In other embodiments, the carrier material 101 can comprise a polyester film (e.g., Mylar or Melinex), a Polypropylene film, a Polyethylene film, a cloth material, a vinyl film or a combination of the above.

The roll of double-sided tape 100 can further comprise a tape liner 104 that covers the second side of the carrier material 101. The tape liner 104 is positioned on the high-tack adhesive material 102 so that the roll of double-sided tape 100 can be easily unrolled. The tape liner 104 may comprise, in some embodiments, a paper release liner, a plastic release liner, a colored release liner, and/or the like. In one embodiment, a colored release liner is provided such that the release liner is visibly distinguishable from the carrier material. In this manner, the colored release liner can be easily distinguished from the carrier material, allowing for easy removal by an installer. Assuming a paper carrier material and a paper tape liner are used in combination, the double-sided tape may be easily ripped or torn by hand.

The colored release liner can comprise: red-colored release liner, a yellow-colored release liner, a blue-colored release liner, a green-colored release liner, a black-colored release liner, or an orange-colored release liner. In some embodiments, the release liner comprises a color associated with the product seller's trade color.

The carrier material can comprise a white-colored carrier material, a tan-colored carrier material or a grey-colored carrier material. In some embodiments, the carrier material comprises a color associated with the product seller's trade color, and can be different from that of the color of the release liner.

The carrier material 101 and the tape liner 104 have widths W1, W2, respectively, which range, in some embodiments, between about ½ of an inch to about 4 inches in width. In other embodiments, the widths W1, W2 can be less than ½ of an inch or greater than 4 inches in width. Further, the width W1 of the carrier material 101 and the width W2 of the tape liner 104 can be substantially equal in width. The carrier material 101 and the tape liner 104 have lengths L1, L2, respectively, which range, in some embodiments, between about 10 feet and about 50 feet in length. In other embodiments, the lengths L1, L2 can be less than 10 feet or greater than 50 feet in length.

The high-tack adhesive material 102 and the low-tack adhesive material may comprise a rubber adhesive compound. However, the high-tack adhesive material 102 and the low-tack adhesive material may comprise other suitable adhesive compounds. The high-tack adhesive material 102 has a peel adhesion (N/in), which is, in some embodiments, greater than or equal to 20 N/in, preferably about 25 N/in. In other embodiments, the high-tack adhesive material 102 can optionally have a peel adhesion of less than 20 N/in. The low-tack adhesive material 103 has a peel adhesion, which is, in some embodiments, less than or equal to 15 N/in, preferably about 10 N/in. In other embodiments, the low-tack adhesive material 103 can optionally have a peel adhesion of greater than 15 N/in. As such, the low-tack adhesive material 103 allows for the double-sided tape 100 to be removed from an entry way, a window frame, a door frame, or other opening without removing paint or wallpaper thereon or leaving a residue behind.

The first side of the carrier material 101 having the high-tack adhesive material 102 can be adhered to a sheet of material 201, and can withstand a negative or positive pressure differential between partitioned areas. Negative pressure is often created in an enclosed area because an enclosed area with negative pressure will suck air into it when doors or windows are opened. This prevents dust or other debris from escaping through opened doors and windows.

The double-sided tape 100 has a differential adhesive ratio (ratio of peel adhesion of the high-tack adhesive material 102 to the peel adhesion of the low-tack adhesive material 103), which ranges, in some embodiments, between about 4:3 to about 6:1, preferably the differential adhesive ratio is about 5:2.

In some embodiments, the low-tack side of the double-sided tape comprises a UV protectant, which prevents adhesive residue from being left on glass, frame moldings and the like.

Figure 2D:
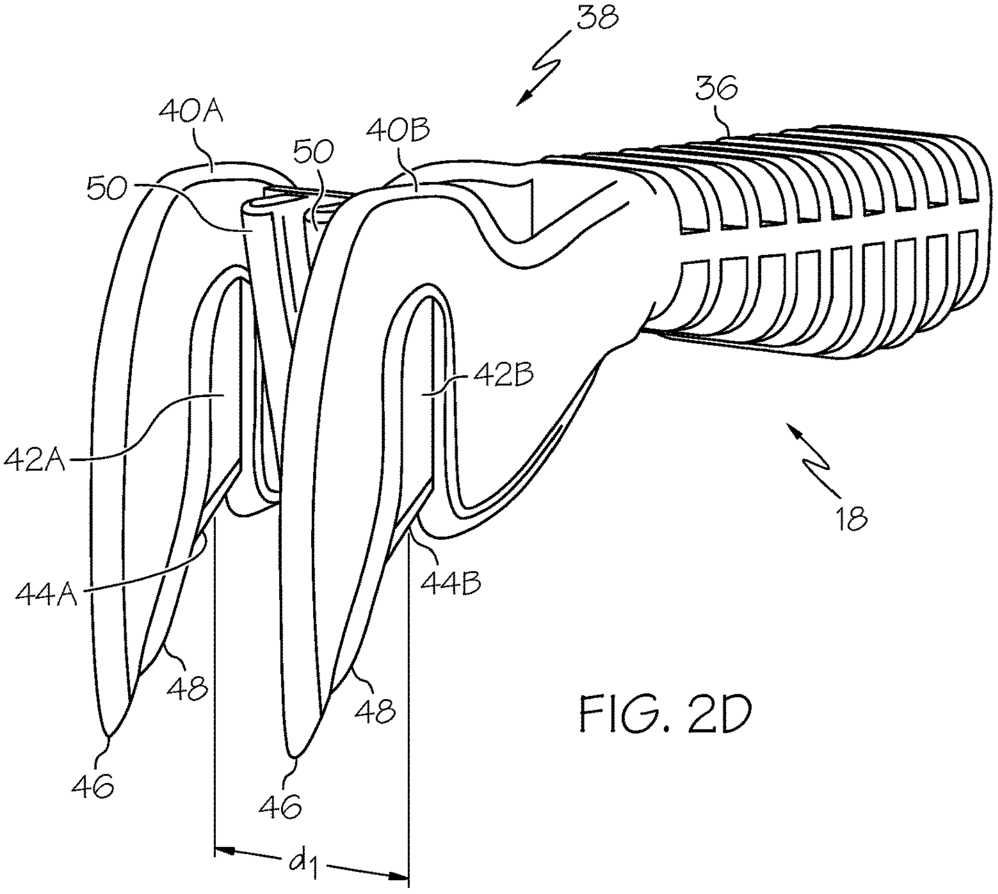
FIG. 2D is a perspective view of a cutter of a type that can be included with the partition assembly kits of FIGS. 1A(A), 1A(B), 1C(A) and 1C(B), in accordance with embodiments of the present inventive concepts.

FIG. 2D is a perspective view of a cutter of a type that can be included with the partition assembly kits of FIGS. 1A(A) through 1D, in accordance with embodiments of the present inventive concepts. The partition assembly kits 10 can optionally include cutter 18, for example, of the type described in U.S. Pat. No 7,743,512, issued Jun. 29, 2010, the contents of which are incorporated herein by reference in their entirety.

Figure 3A:
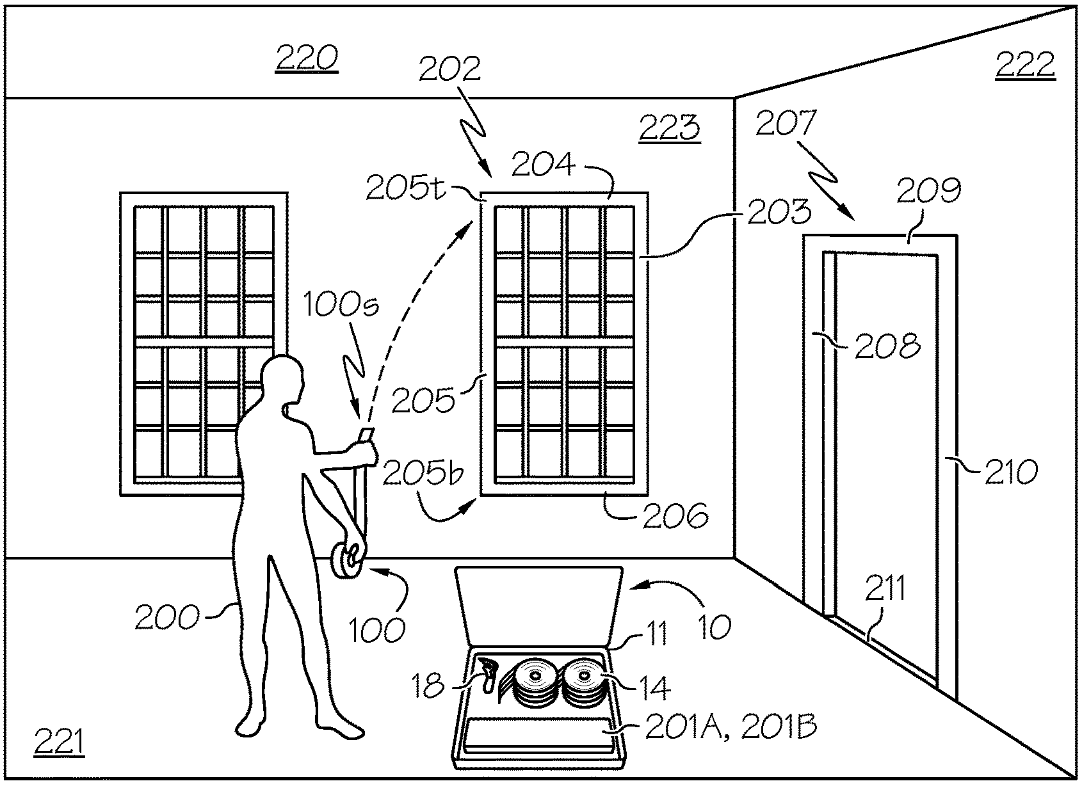
FIGS. 3A-3L, 3M(A), 3M(B), 3N(A), 3N(B) and 3O illustrate a method for assembling a partition mounting system using a partition assembly kit of the type described in connection with FIGS. 1A(A) through 1D, in accordance with embodiments of the present inventive concepts.
Figure 3B:
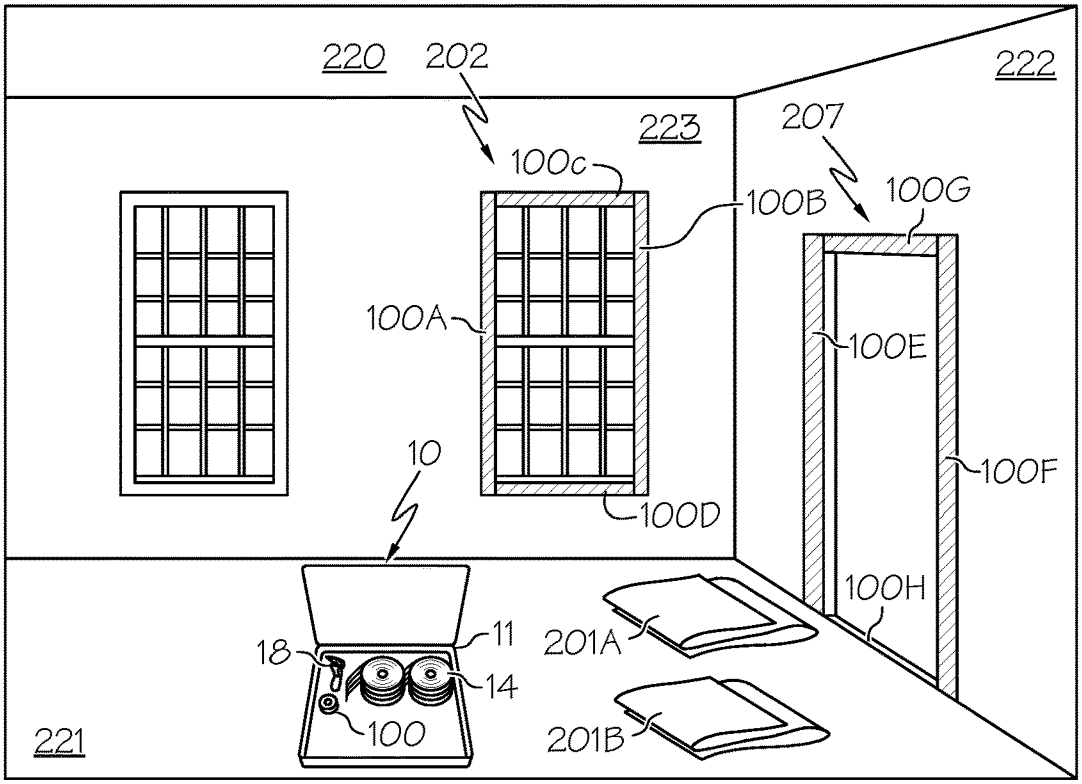
Figure 3C:
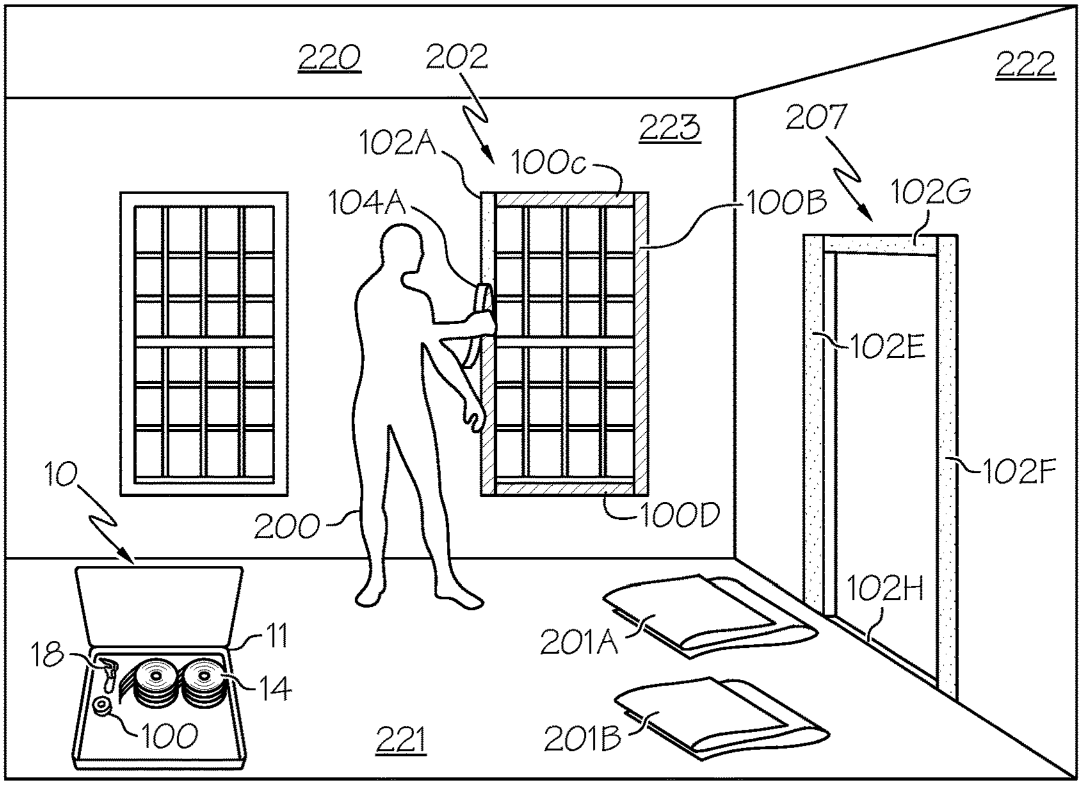
Figure 3D:
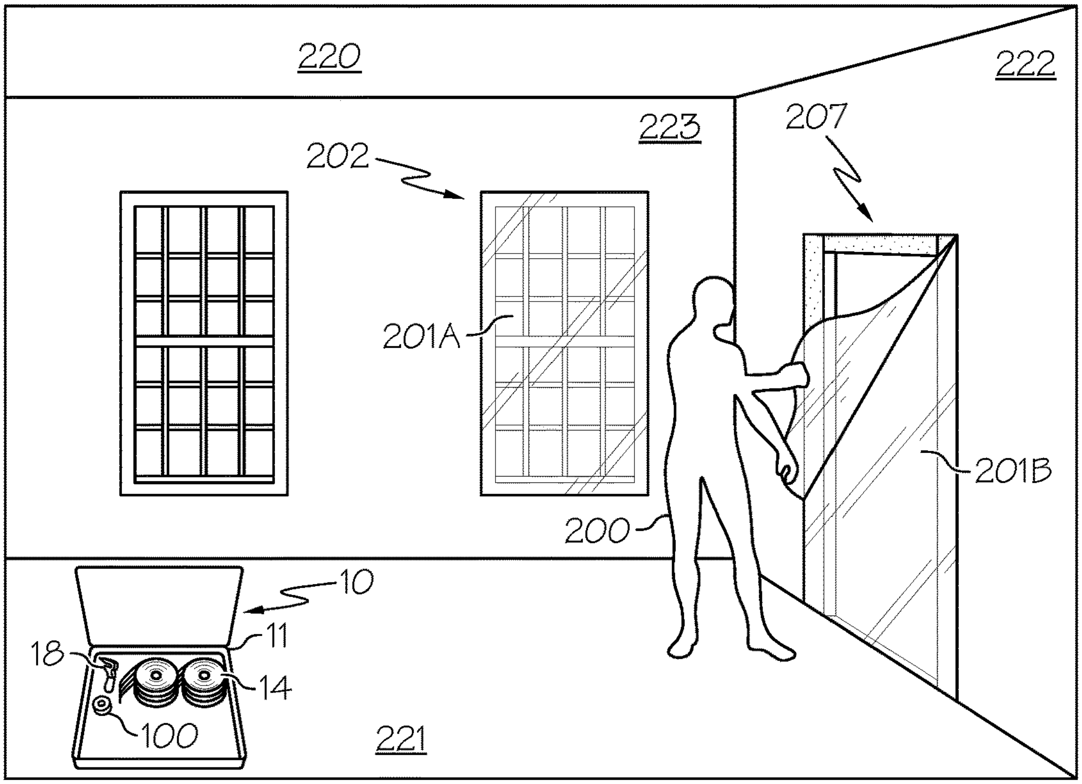
Figure 3E:
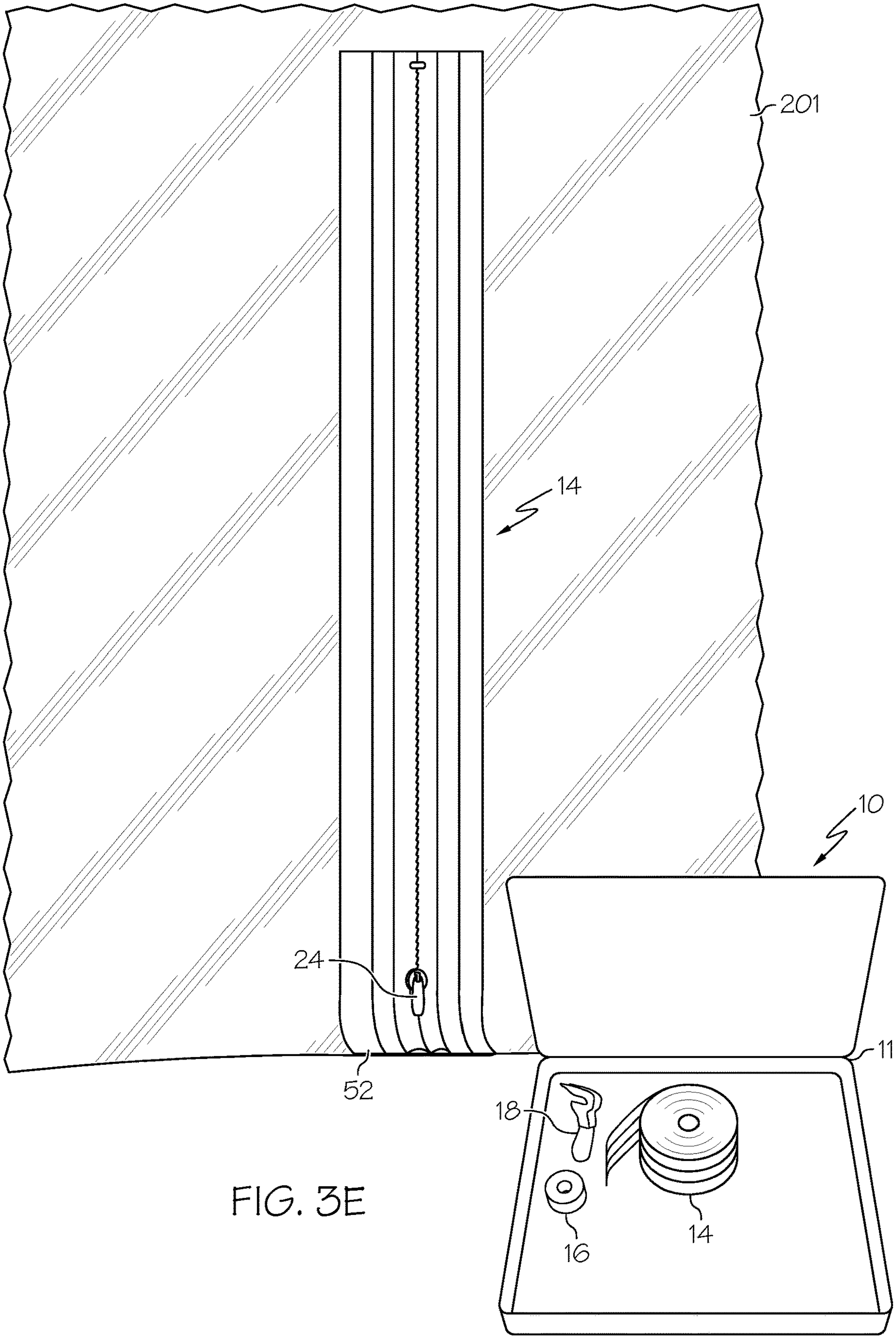
Figure 3F:
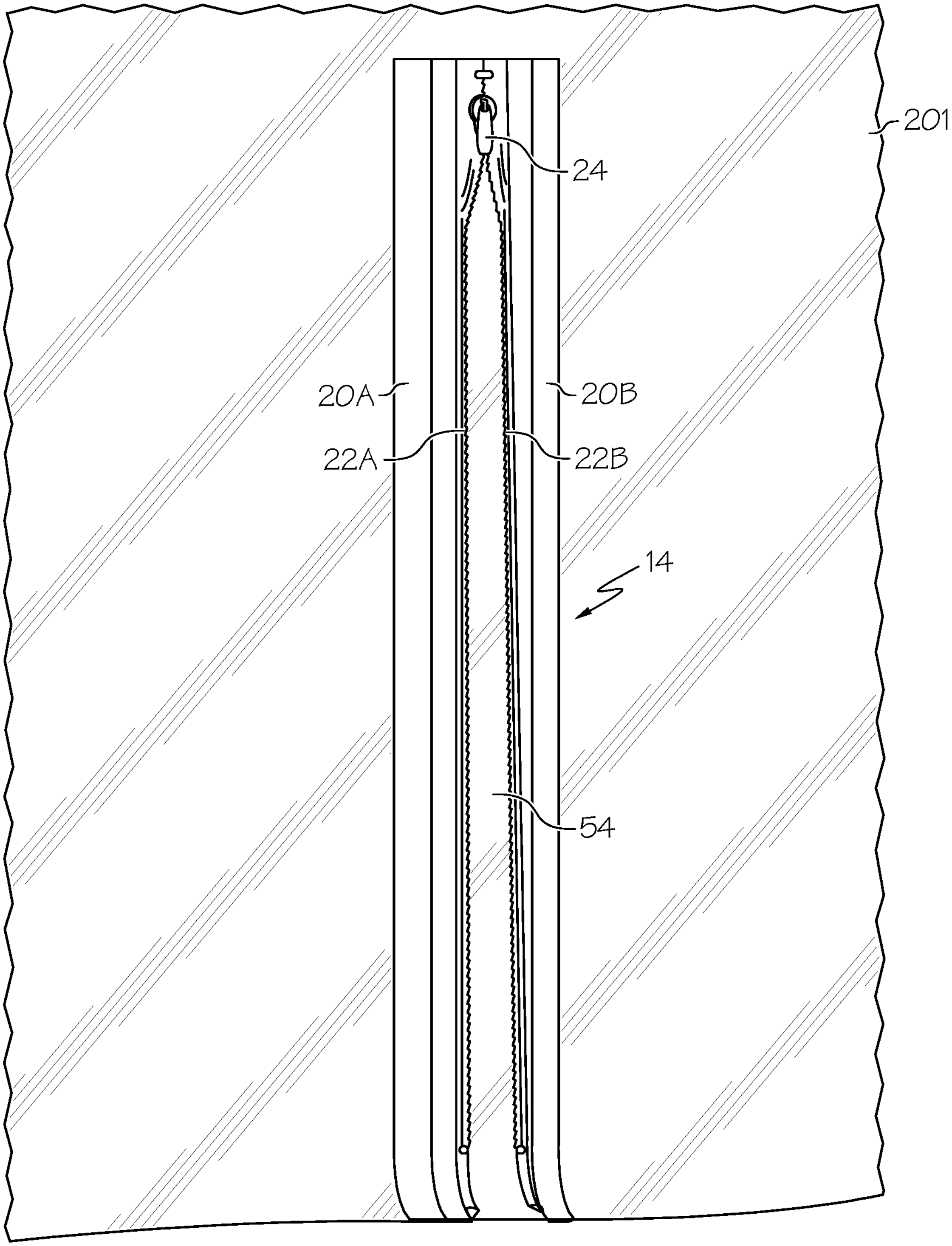
Figure 3G:
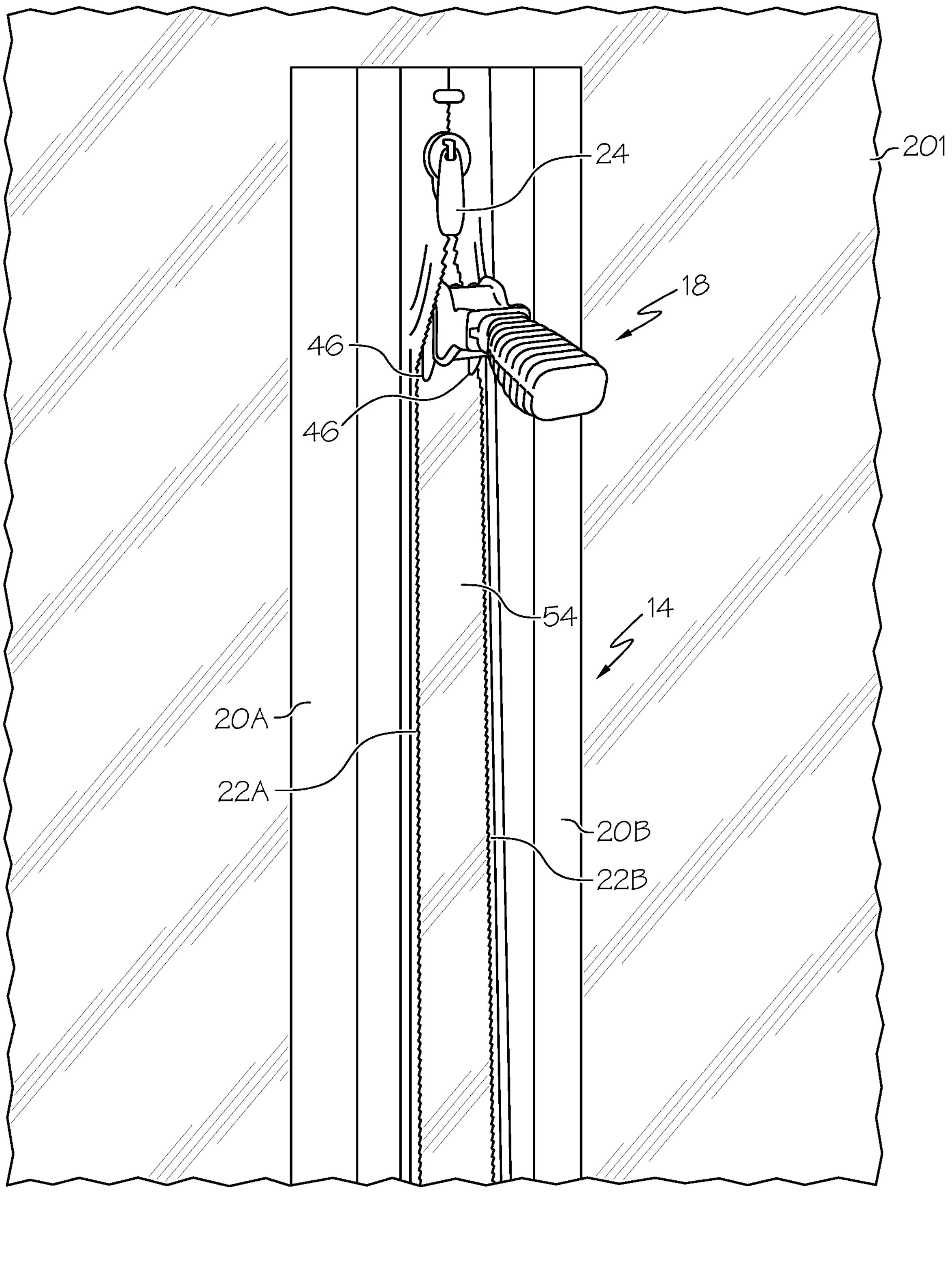

The cutter 18 is operative to pierce and cut a sheet of material 201 to which a zipper 14 has been applied (see for example FIG. 3G). The cutter 18 is constructed and arranged to cut an opening in a sheet of material 201 between left and right teeth portions 22A, 22B of a zipper 14. Once an opening has been formed between left and right teeth portions 22A, 22B of a zipper 14, access can be permitted through the barrier by unzipping the zipper 14 and can be re-sealed by re-zipping the zipper 14.

The cutter 18 includes a handle 36 that is ribbed to provide a gripping surface, to cut down on weight, and to provide for lateral rigidity of the unit. The handle 36 is coupled to a body portion 38 that is partitioned into left and right spaced-apart body sections 40A, 40B. The left and right body sections 40A, 40B each include a blade 42A, 42B that has an exposed edge 44A, 44B, as shown. The sharpness of the blade edges 44A, 44B are appropriate for readily slicing through a sheet of material 201, such as plastic sheeting or cloth sheeting. In one embodiment, the dual blades 42A, 42B comprise sharpened stainless steel, metal, or metal alloy. The exposed blade edges 44A, 44B are preferably oriented to be aligned with the direction of force that is applied to the cutter 18 when cutting the sheet of material 201.

The dual blades 42A, 42B are spaced apart by a distance $d_1$, for example, the distance $d_1$ can range between about 0.5 cm to about 3.0 cm. In one embodiment, the distance $d_1$ can be determined in accordance with the dimensions of the one or more zippers 14 that are included in the partition assembly kit 10. For example, the distance $d_1$ can be determined by the distance between the flanges 20A, 20B of the zipper 14 in order to remove a large swath of the sheet material 201 between the flanges 20A, 20B of the zipper 14, and to further avoid formation of a flap of sheet material 201 that would otherwise interfere with zipper's 14 operation. The dual blades 42A, 42B are preferably recessed in the body 38 of the cutter 18 as shown, allowing for safe operation and safe storage. In one embodiment, the blade edges 44A, 44B are oriented at an angle relative to the direction of cutting, to provide for more enhanced cutting action.

Extending from each of the left and right body sections 40A, 40B opposite the handle 36 are elongated puncture fingers 46 that have sharp tips. The puncture fingers 46 are constructed and arranged to make initial contact with the sheet of material 201 and pierce the sheet of material 201 until the dual blades 42A, 42B are in position to contact the sheet of material 201 for cutting. Initial puncture of the sheet of material 201, prior to cutting, provides for a cleaner and more precise cutting operation. The puncture fingers 46 further shield the dual blades 42A, 42B in a cutting recess region defined by the puncture fingers 46, so as to improve the safety of the cutter 18. The puncture fingers 46 include inner guide surfaces 48 that guide the punctured sheet of material 201 toward the cutting recess region, for further cutting of the punctured sheet of material 201.

An optional material deflector 50, or multiple material deflectors 50, is provided between the spaced-apart body sections 40A, 40B and blades 42A, 42B of the cutter 18. The material deflector 50 operates to pull the sheet of material inserted into the cutting recess region, as guided by the guide surfaces 48 of the puncture fingers 46, against the blade edges 44A, 44B of the dual blades 42A, 42B as the material is being cut.

FIGS. 3A through 3O illustrate a method for assembling and installing a partition mounting system using a partition assembly kit of the type described in connection with FIGS. 1A(A) through 1D, in accordance with embodiments of the present inventive concepts. In FIG. 3A, an installer 200 decides which portion of a room to install a partition mounting system. In this example, the installer 200 installs a partition mounting system using a partition assembly kit 10. The partition mounting system can be constructed to seal and/or isolate a window frame 202 or an entry way 207 of a room. The partition mounting system can further be constructed to seal and/or isolate various other openings, access areas, and the like.

The room comprises a ceiling 220, a floor 221 and sidewalls 222, 223. The window frame 202 comprises a top frame portion 204, side frame portions 203, 205, and a window sill 206. The entry way 207 comprises a top frame portion 209, side frame portions 208, 210, and a bottom frame portion 211.

In this example, the installer 200 affixes the double-sided tape 100 from the partition assembly kit 10 to the window frame 202 by placing the second side of the carrier material 101 having the low-tack adhesive material 103 thereon against the window frame 202. For example, the installer 200 places a starting portion 100*s* of the double-sided tape 100 at a top 205*t* of the side portion 205 of the window frame 202, and applies a uniform pressure with a hand to the backside (i.e., first side of the double-sided tape 100 having the tape liner 104 that covers the second side of the carrier material 101) of the double-sided tape 100 while applying a continuous strip of the double-sided tape 100 to the side portion 205 of the window frame 202 in a downward direction toward a bottom 205*b* of the side portion 205 of the window frame 202. The installer 200 can then tear by hand, or cut using a knight, cutter, scissors or blade, the double-sided tape 100. As a result, a first double-sided tape strip 100A is affixed to the side portion 205 of the window frame 202.

In other embodiments, the installer 200 can affix sheets of material 201, 201A, 201B to the window or door frames using strips of single-sided tape 100.

In FIG. 3B, the installer 200 likewise affixes the double-sided tape 100 to the remaining portions (i.e., side frame portion 203, top frame portion 204, and window sill 206) of the window frame 202. The installer 200 may further affix the double-sided tape 100 to the top frame portion 209, side frame portions 208, 210, and bottom frame portion 211 of the entry way 207. Tape strips 100A, 100B, 100C, 100D are shown affixed to the window frame 202 and tape strips 100E, 100F, 100G, 100H are shown affixed to the entry way 207.

In this example, the installer 200 removes first and second sheets of material 201A, 201B from the receptacle 11 of the partition assembly kit 10. In some embodiments, the installer 200 can remove a single sheet of material 201 from the receptacle 11 of the partition assembly kit 10, and can further cut the single sheet of material 201 to create first and second sheets of material 201A, 201B. In other embodiments, the installer 200 can remove a single sheet of material 201 from the receptacle 11 of the partition assembly kit 10, and use the single sheet of material 201 to cover the door frame 207 and not cover the window frame 202.

In FIG. 3C, the installer 200 removes the tape liner 104A from the double-sided tape strip 100A that covers the second side of the carrier material 101, thus exposing the high-tack adhesive material 102A. The installer 200 subsequently removes the tape liner from the tape strips 100A, 100B, 100C, 100D that are affixed to the window frame 202, and the tape strips 100E, 100F, 100G, 100H that are affixed to the entry way 207.

In FIG. 3D, the installer 200 affixes the second sheet of material 201B from the partition assembly kit 10 to the exposed high-tack adhesive material 102 of the tape strips 100A, 100B, 100 C, 100D of the window frame 202 and further affixes the first sheet of material 201A from the partition assembly kit 10 to the exposed high-tack adhesive material 102 of the tape strips 100E, 100F, 100G, 100H of the entry way 207.

The sheets of material 201A, 201B, which are affixed to the window and door frames 202, 207, can be opaque so that images cannot be seen through it and/or to prevent light transmission through the material. Further, the sheets of material 201A, 201B can be translucent, such that light can pass through the material, but objects on the other side cannot be clearly distinguished. Opaque and translucent sheets of materials 201 may be used to prevent outsiders from viewing the interior of a room. On the other hand, the sheets of material 201 can be transparent, allowing light to pass through the material so objects can be illuminated, or so that objects can be clearly seen through the material.

The double-sided tape and methods for installing various partition configurations using the double-sided tape described herein can be used in conjunction with other partition mounting systems, such as, those described in U.S. Pat. No. 5,924,469, filed Oct. 29, 1996, U.S. Pat. No. 7,658,219, filed May 10, 2005, U.S. Pat. No. 7,073,758, filed on Jun. 20, 2003, U.S. Pat. No. 7,533,712, filed on Jun. 20, 2003, and U.S. Pat. No. 7,743,512, issued on Jun. 29, 2010, the contents of each being incorporated herein by reference in their entirety.

In FIG. 3E, the installer 200 retrieves a zipper 14 from the partition assembly kit 10, and adheres the zipper 14 to a sheet of material 201. In this example, the zipper 14 is shown affixed to the second sheet of material 201B, which is affixed to the entry way 207.

In one embodiment, a zipper 14 having a pre-applied adhesive material 26, such as the zipper illustrated at FIGS. 2A(A) and 2A(B), is affixed to a sheet of material 201 by the installer 200. In this embodiment, the installer 200 removes the protective paper strips 28, or single strip 28, from the zipper 14 prior to affixing the zipper 14 to the sheet of material 201.

In another embodiment, a zipper 14 having first and second tape strips 306A, 306B adhered to the left and right flanges 101A, 101B of the zipper 14, such as the zipper illustrated at FIG. 2B, is affixed to a sheet of material by the installer 200. In this embodiment, the installer applies the first and second tape strips 306A, 306B to the left and right flanges 101A, 101B of the zipper 14 prior to affixing the zipper 14 to the sheet of material 201.

In another embodiment, the sheet of material 201 may comprise first and second pre-attached zippers 114, such as the sheets of material 201 illustrated at FIGS. 4A(A) through 4F(B).

Referring to FIGS. 3E and 3F, the bottom 52 of the zipper 14 is aligned with the bottom of the sheet of material 201, so that the zipper 14 can be opened using zipper pull 24 to expose a portion 54 of the sheet of material 201 between the zipper teeth portions 22A, 22B and between the left and right flanges 20A, 20B of the zipper 14.

In FIG. 3G, the installer 200 positions the cutter 18 at a top portion of the exposed sheet portion 54 between the left and right teeth portions 22A, 22B of the zipper 14. The installer 200 applies pressure to cutter 18 such that the sharp tips of the puncture fingers 46 initially penetrate the exposed sheet portion 54, at two spaced-apart piercing locations 62.

Figure 3H:
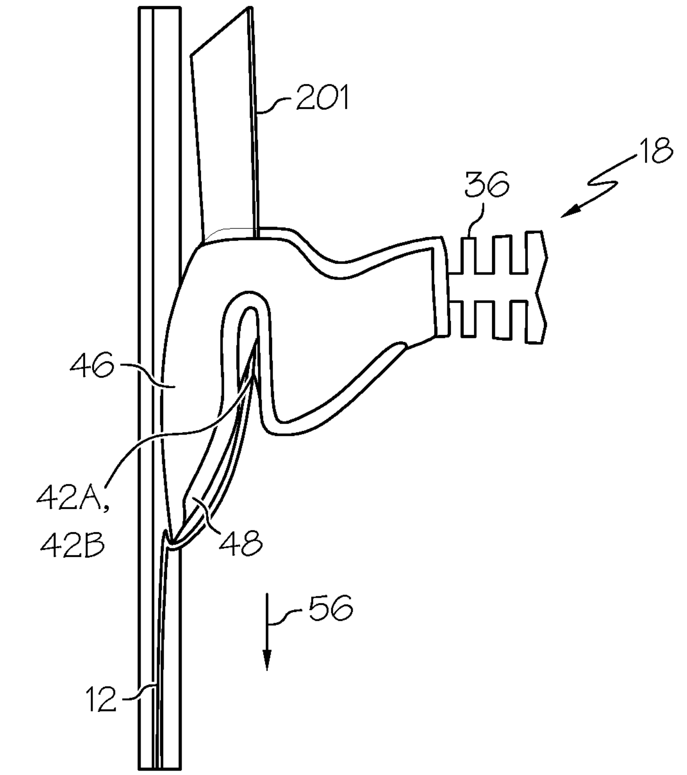

In FIG. 3H, the installer 200 begins to pull the cutter 18 in a downward cutting direction, as indicated by arrow 56, which moves the puncture fingers 46 further into the sheet of material 201. The guide surfaces 48 of the puncture fingers 46 deflect the sheet of material 201 toward the dual blades 42A, 42B of the cutter 18, while, at the same time, the material deflector 50 pulls the sheet of material 201 taut against the dual blades 42A, 42B.

Figure 3I:
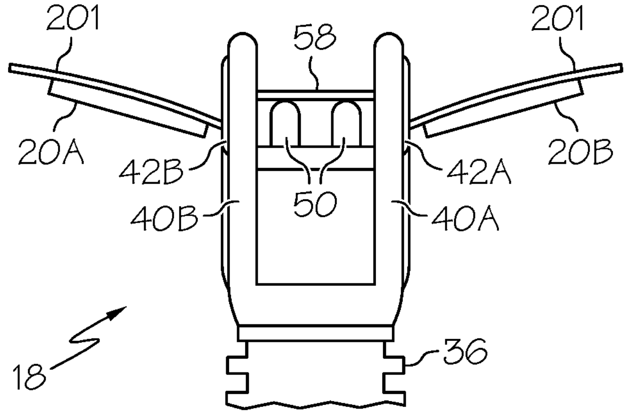

Referring to FIG. 3I, as cutting continues in the downward direction 56, two parallel cuts are made in the plastic sheet by the blades 42A, 42B of the cutter 18. The two parallel cuts define a swath of material 58 that is cut between the left and right flanges 20A, 20B of the zipper 14. The blades 42A, 42B are spaced apart by a suitable distance $d_1$ such that the cuts are made close to the flanges 20A, 20B, so that excess sheet material is not present between the left and right zipper teeth 22A, 22B. In this manner, any sheet material that remains between the left and right portions of the zipper 14 will not interfere with proper zipper operation.

Figure 3J:
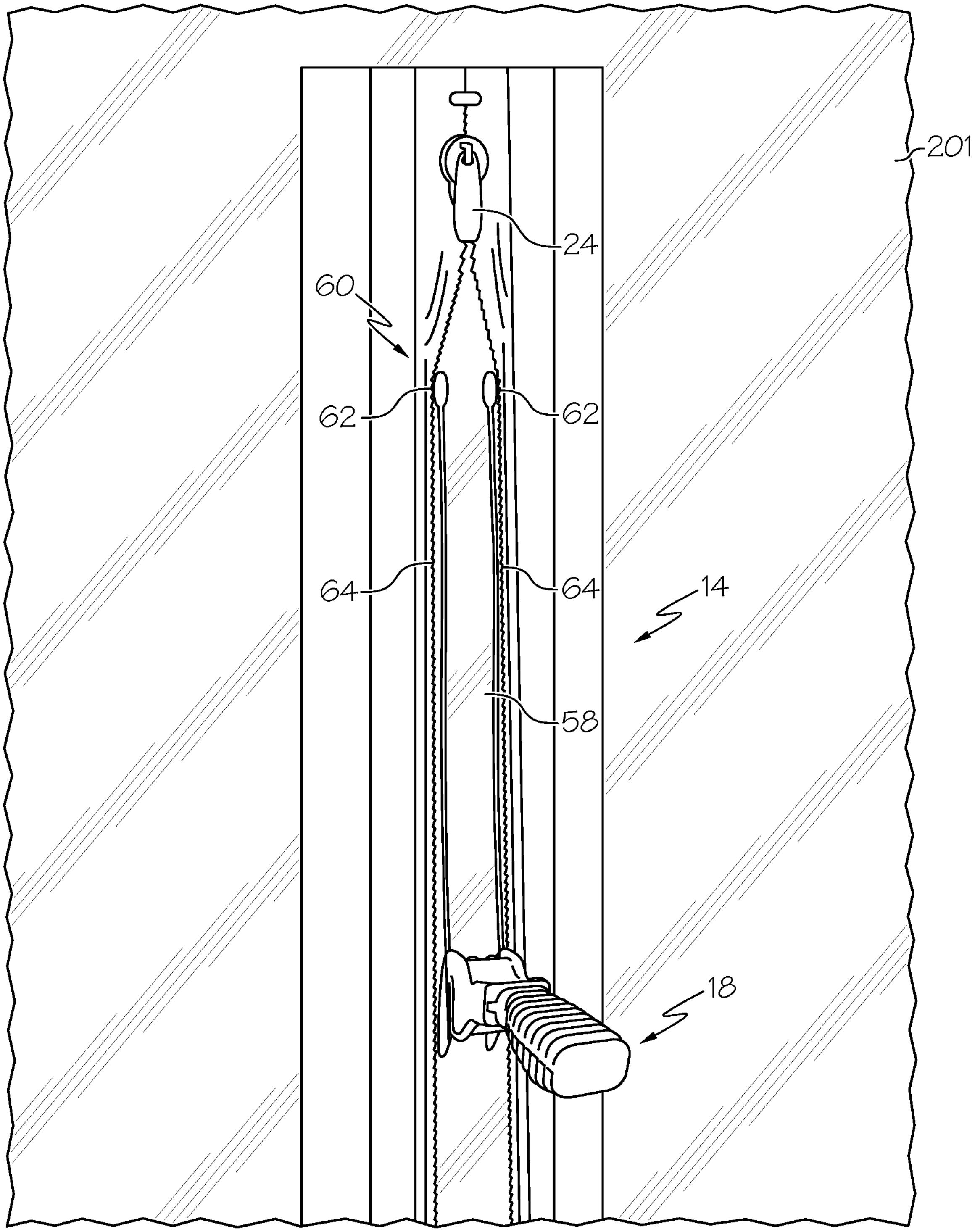
Figure 3K:
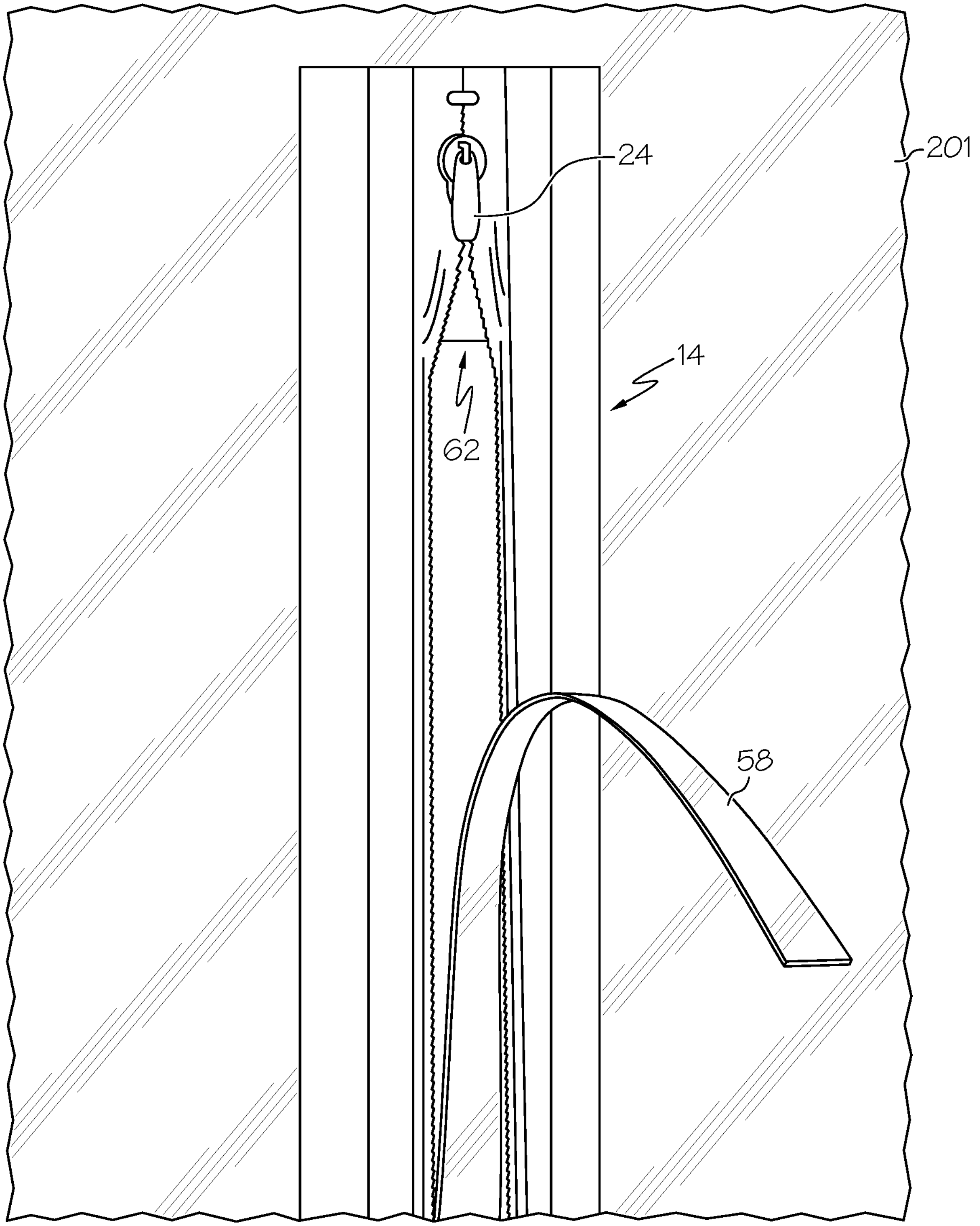

In FIG. 3J, the swath of material 58 cut between the left and right zipper portions can be seen. The swath of material 58 remains attached at the puncture region 60 where the cut was initiated at puncture holes 62. The dual parallel cuts 64 extend from the puncture holes 62 along the length of the zipper 14. Following completion of the cut, the swath of material can be torn or cut in the puncture region 60 at the top, bottom, or top and bottom portions of the zipper 14, and removed by the installer 200, as shown in FIG. 3K.

Figure 3L:
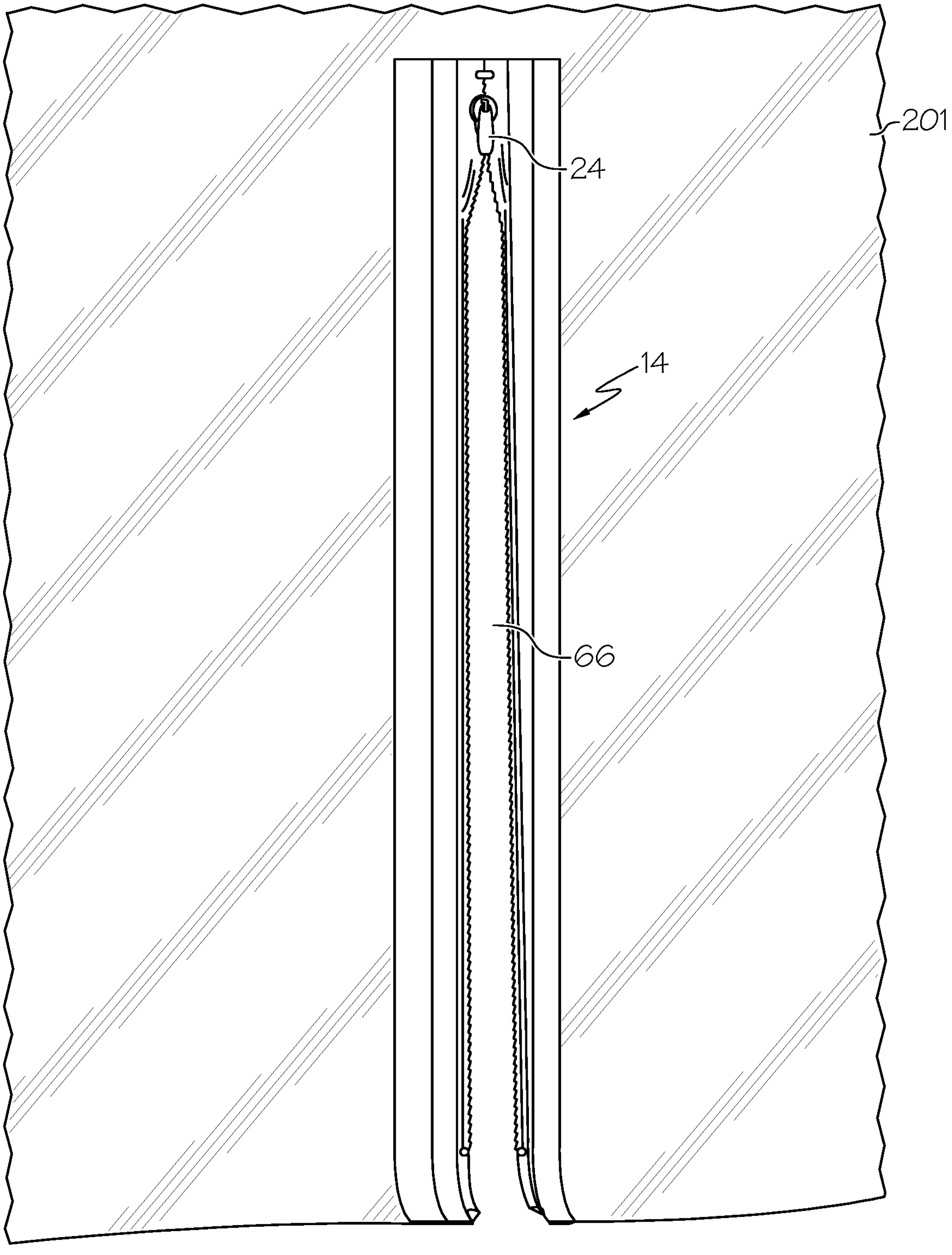

FIG. 3L is a perspective view of the opened zipper 14 after the swath of material 58 between the parallel cuts is removed. A temporary entryway 66 is provided in the opening of the zipper 14. The temporary entryway 66 can be opened and closed at will by engaging and releasing the zipper 14 with the zipper pull 24.

Figure 3M:
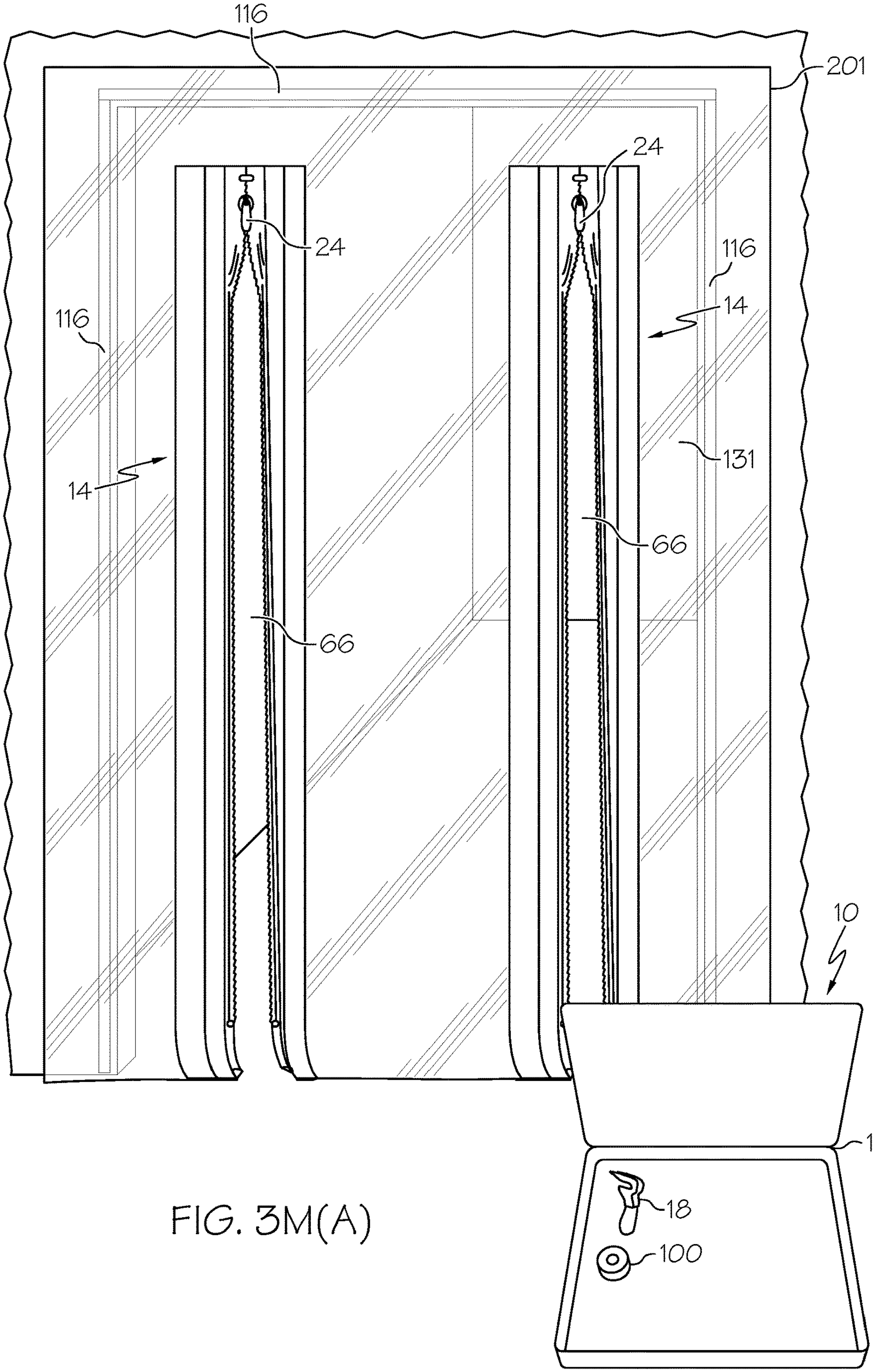
Figure 3M:
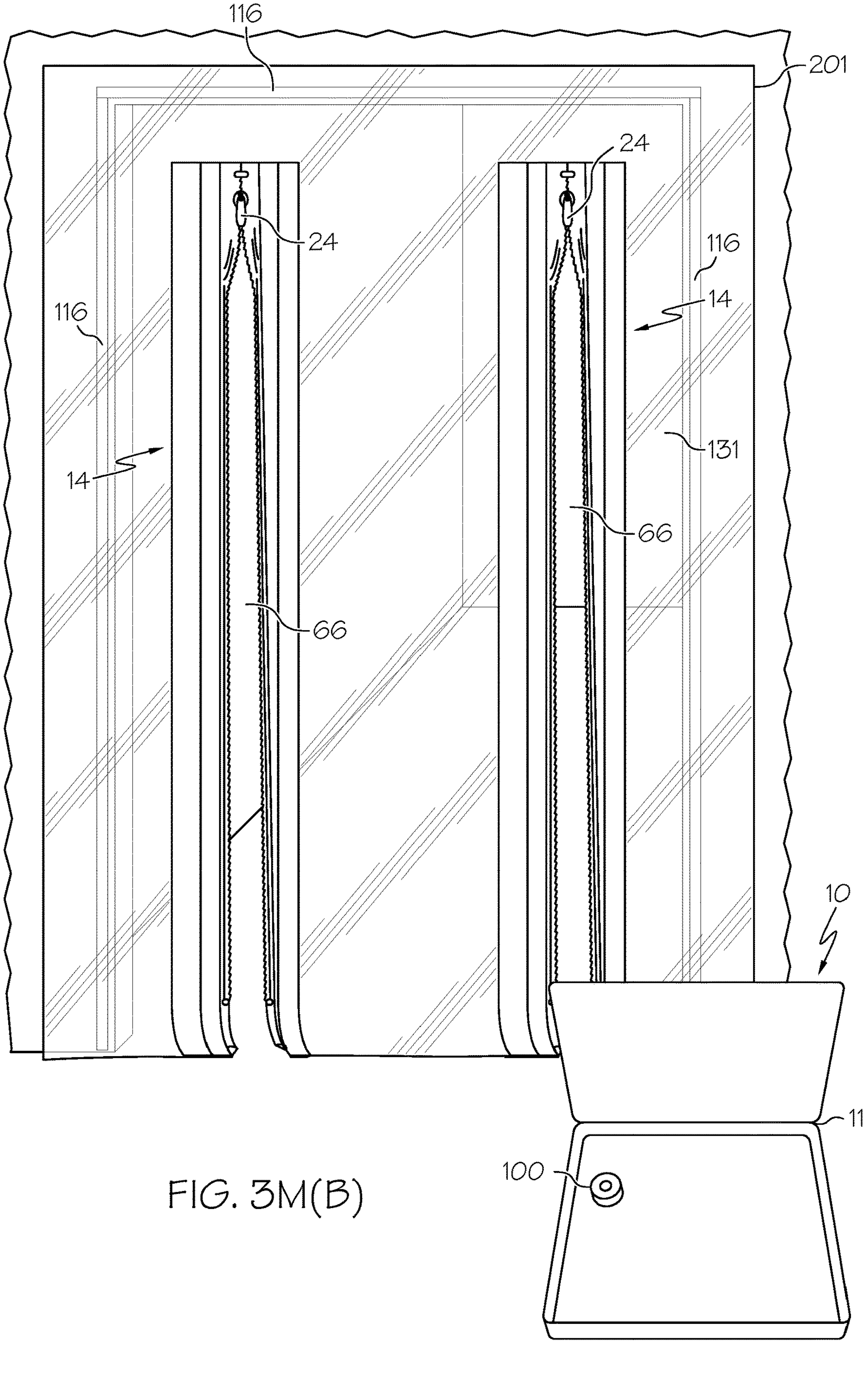

In another embodiment, as illustrated in FIGS. 3M(A) and 3M(B), an installer can affix a second zipper 14 to the sheet of material 201, adjacent and parallel to the first zipper 14. As such, the first and second zippers 14 can be opened and the sheet of material between the two zippers can be rolled up creating am enlarged temporary entryway 68.

Although the above embodiment depicts the installation of sheets of material 201A, 201B at a window frame 202 and an entryway 207, embodiments of the present inventive concepts are not thus limited. In other preferred embodiments, partition assembly kits, sheets of material, and methods of installation apply to installation of a sheet of material at only a window frame 202 or at only an entryway 207, or at only other regions of abutting environments.

Figure 3N:
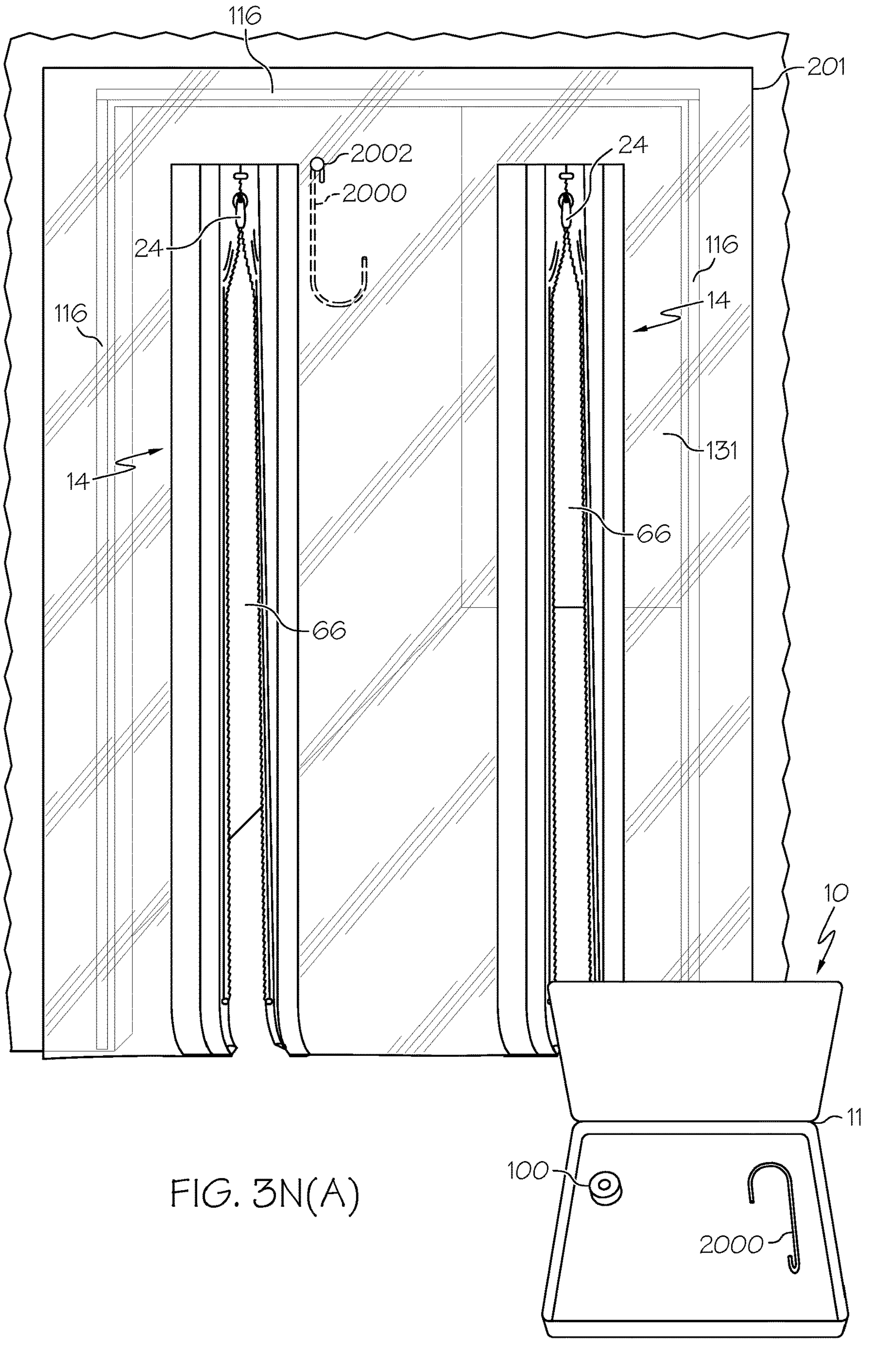
Figure 3N:
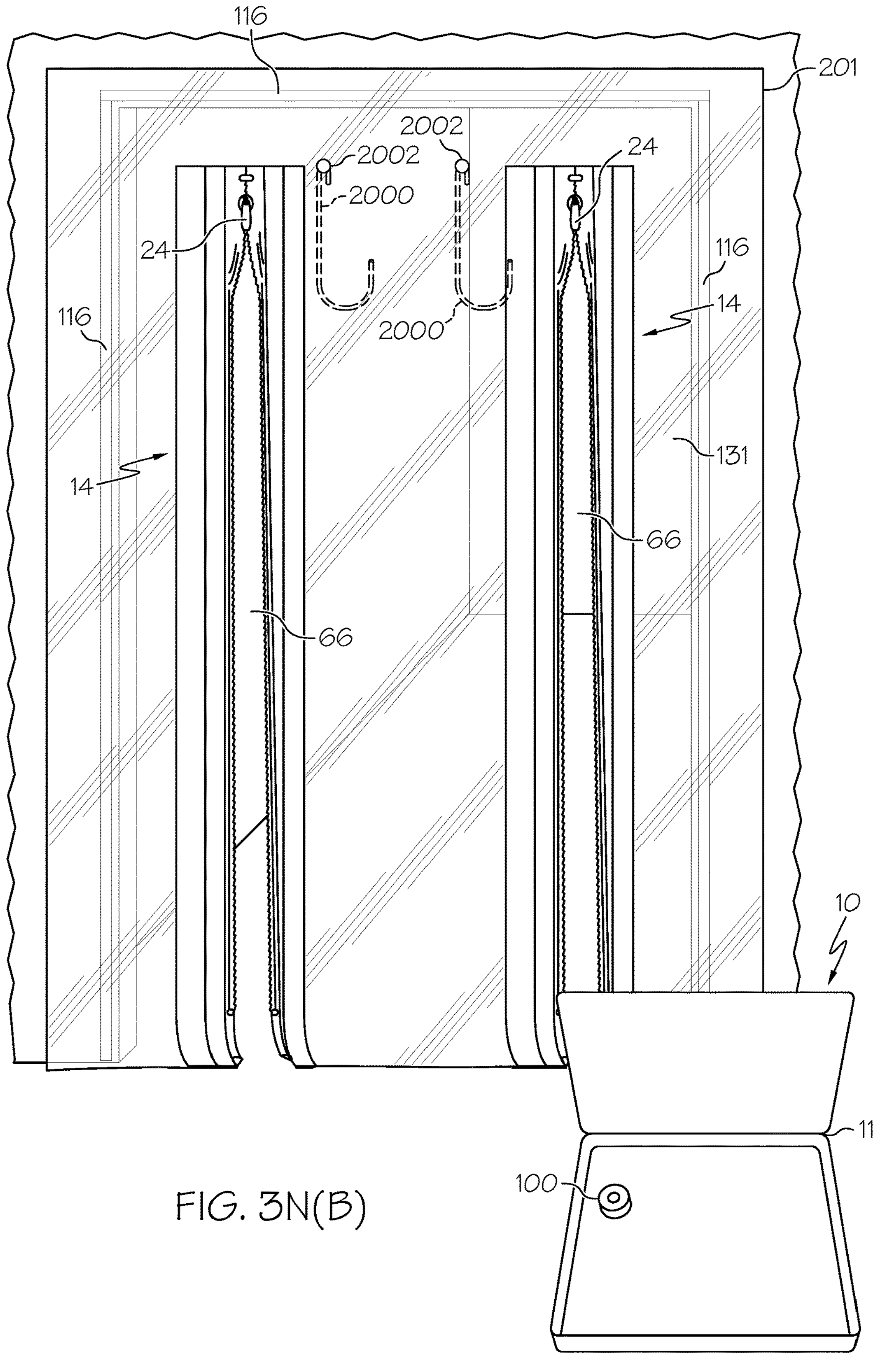
Figure 30:
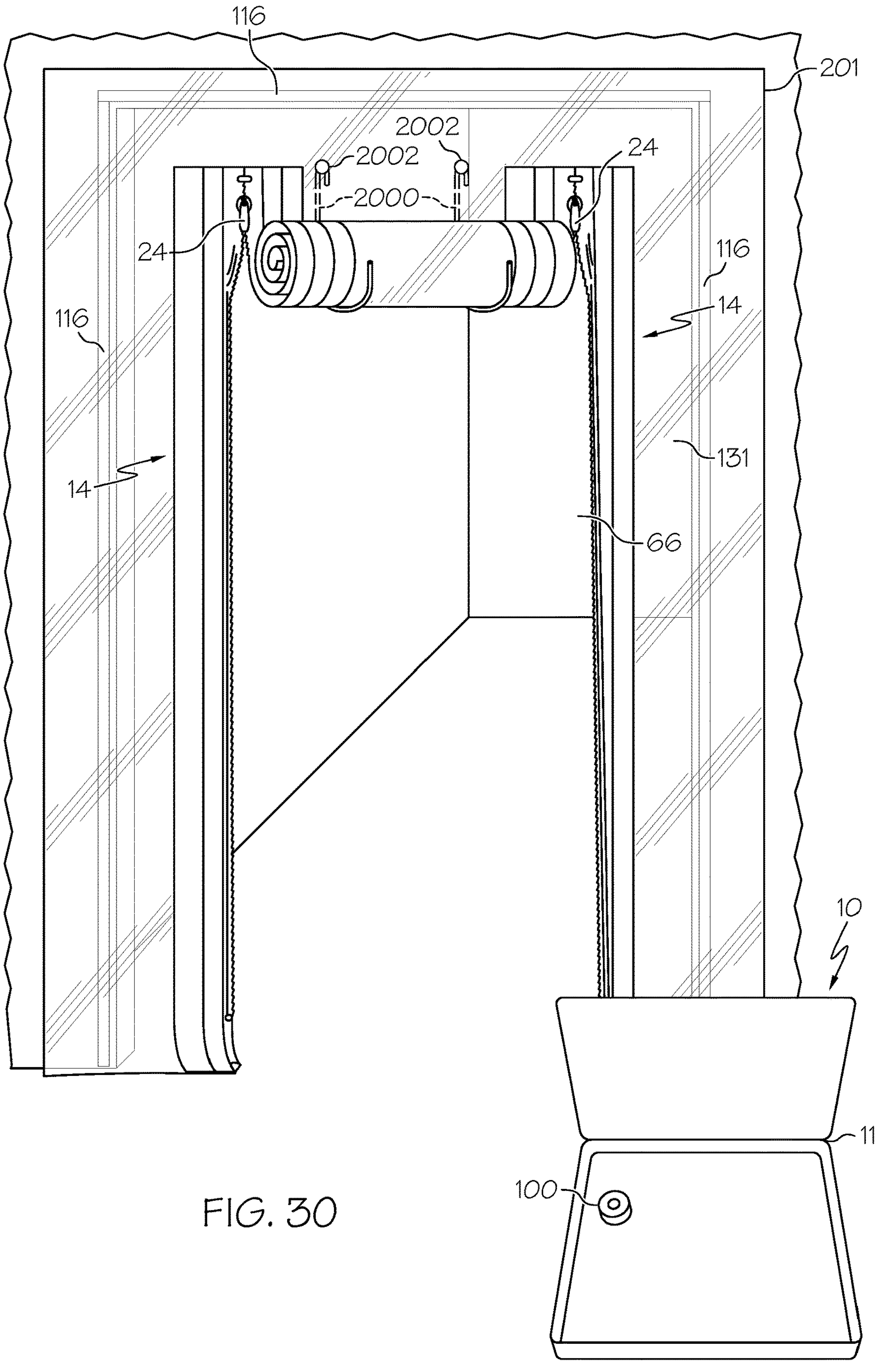

In FIG. 3N(A), a first strap 2000 can be removed from the receptacle 11 by the installer, which can be secured to the sheet of material 201. For example, the installer can position the first strap 2000 about an upper portion of the sheet of material 201, between the first and second zippers 14, and puncture the sheet of material 201 with a first end 2015 (see for example FIG. 10) of the first strap 2000. In this manner, the first end 2015 of the first strap 2000 can form a first opening 2002 in the sheet of material 201 while at the same time securing the first strap 2000 to the sheet of material 201.

In FIG. 3N(B), a second strap 2000 can be removed from the receptacle 11 by the installer, which can be secured to the sheet of material 201. For example, the installer can position the second strap 2000 about an upper portion of the sheet of material 201, between the first and second zippers 14 and adjacent to the first strap 2000, and puncture the sheet of material 201 with a first end 2015 (see for example FIG. 10) of the second strap 2000. In this manner, the first end 2015 of the second strap 2000 can form a second opening 2002 in the sheet of material 201 while at the same time securing the second strap 2000 to the sheet of material.

FIG. 3O illustrates a portion of the sheet of material between the first and second zippers 14 rolled up in order to create a temporary entry way. For example, the installer can roll up and secure the portion of the sheet of material between the first and second zippers 14 using the first and second straps 2000. The rolled up portion of the sheet of material can be placed within second hook portions 2020 (see for example FIG. 10) of the first and second straps 2000. In this manner, the rolled up portion of the sheet of material can rest within the second hook portions 2020 of the first and second straps 2000 so as to allow for rapid ingress and egress from a partitioned area. For example, the rolled up portion of the sheet of material may be supported and/or retained by the second hook portions 2020 of the first and second straps 2000.

FIGS. 4A(A) through 4F(B) are perspective views of partition assembly kits including components and tools for assembling a partition mounting system in accordance with other embodiments of the present inventive concepts. Elements having the same functions as those illustrated in FIGS. 1A(A) through 1D are indicated by like reference identifiers, and thus their detailed description will be omitted.

Referring to FIGS. 4A(A) and 4A(B), a partition assembly kit 1000 can provide an installer with components and tools for assembling a partition mounting system having a pre-attached zippered opening. The partition assembly kit 1000 can be enclosed in receptacle 11, such as the receptacles 11 of FIGS. 1A(A) through 1D.

The components and tools included in the partition assembly kit 1000 can include, in one embodiment, a sheet of material 201 having first and second zippers 114 pre-attached thereto, and a roll of single-sided tape or a roll of double-sided tape 100. In another embodiment, the sheet of material 201 has a single zipper 14 pre-attached thereto. In another embodiment, the sheet of material 201 includes a plurality of zippers 14 pre-attached thereto.

In addition, the partition assembly kit 1000 can include an optional strap 2000 or pair of straps, which is illustrated and described in greater detail with reference to FIGS. 8-12(D).

Figure 4B:
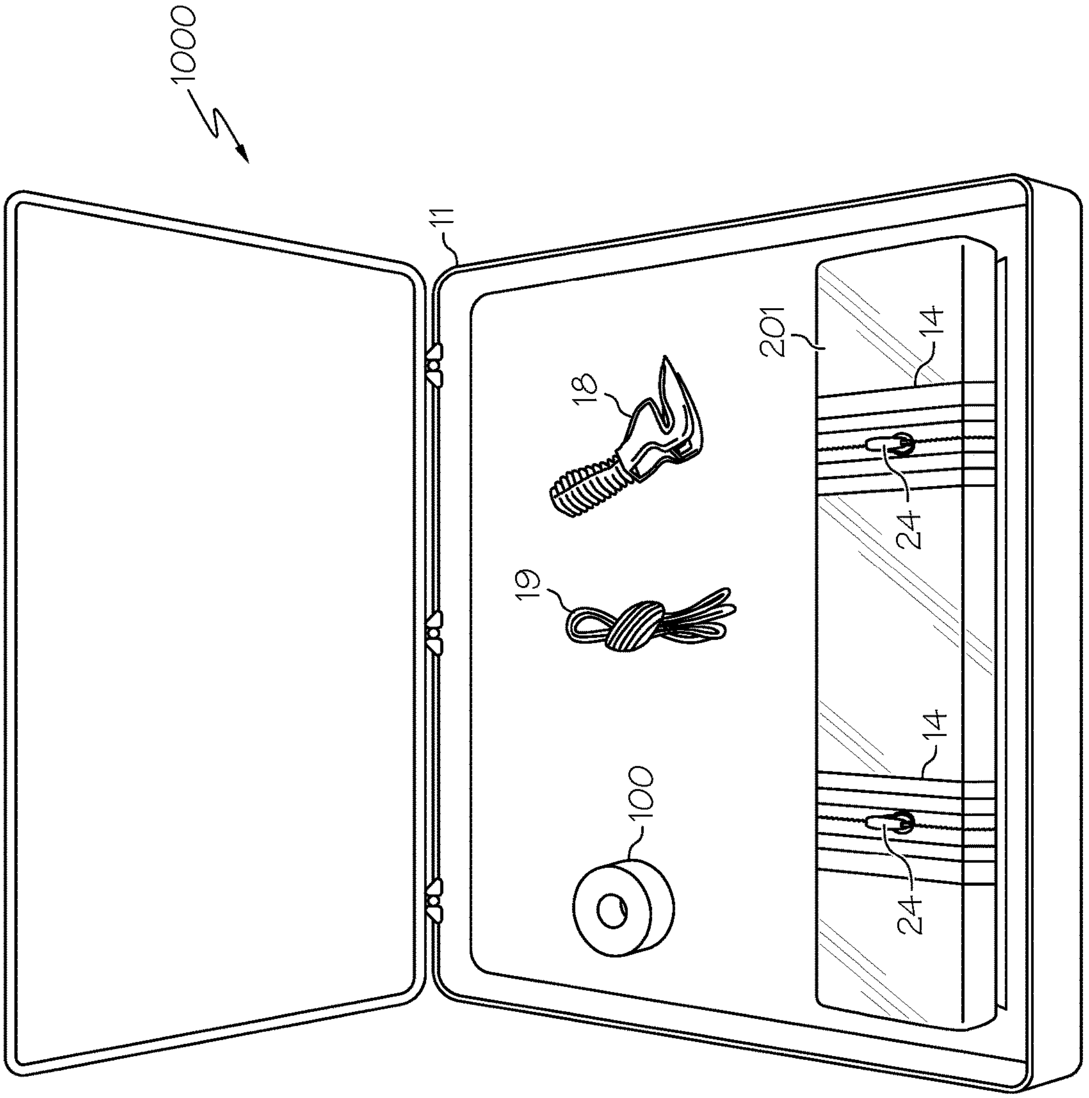
FIGS. 4B(A) and 4B(B) are perspective views of a partition assembly kit including components and tools for assembling a partition mounting system in accordance with another embodiment of the present inventive concepts.
Figure 4B:
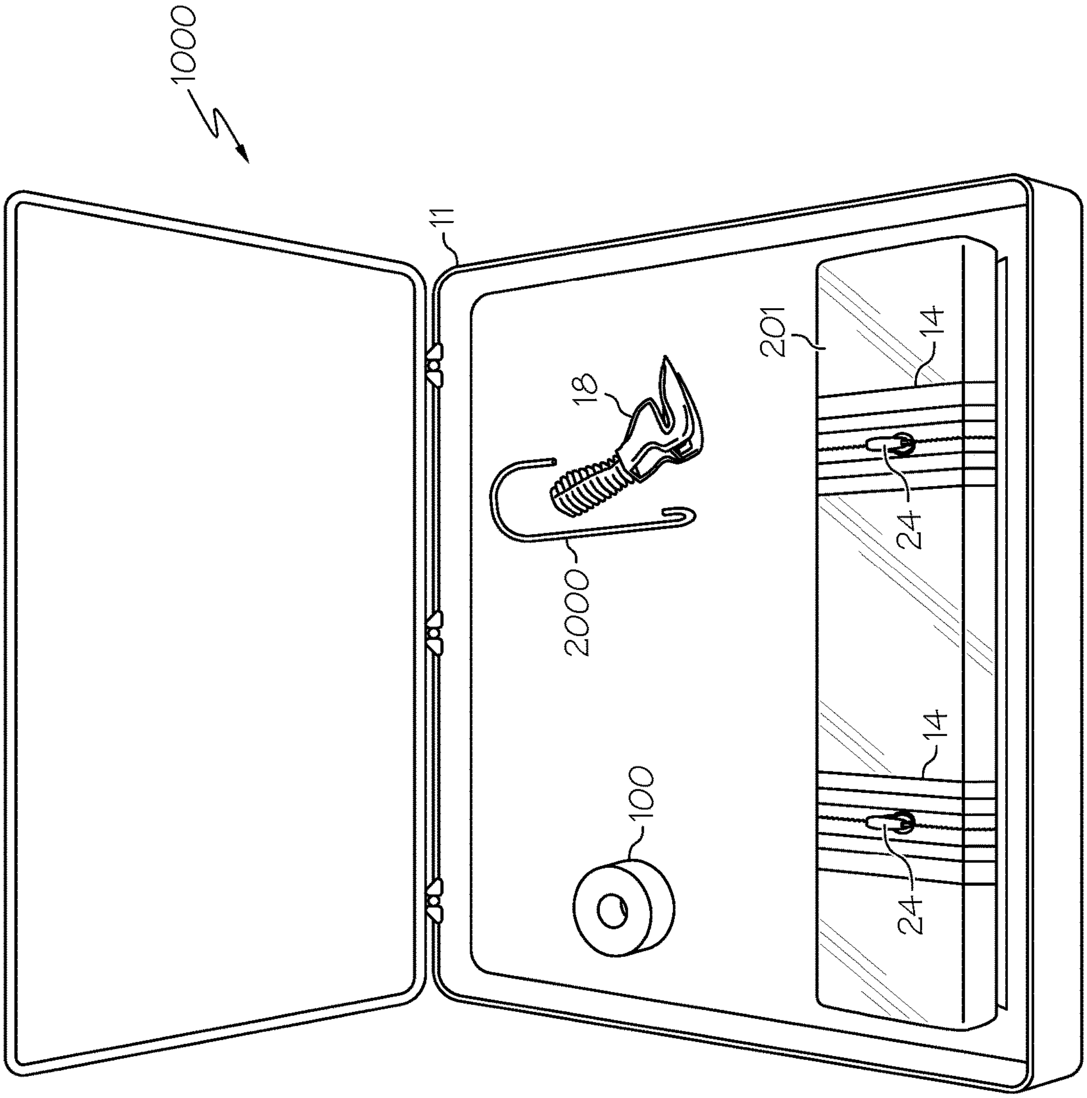

Referring to FIGS. 4B(A) and 4B(B), the components and tools included in the partition assembly kit 1000 can include, in one embodiment, a sheet of material 201 having first and second zippers 114 pre-attached thereto, a roll of double-sided tape 100 and a cutter 18. In this embodiment, the cutter 18 can be used by an installer to remove a swath of material between the openings of the first and second zippers.

The partition assembly kit 1000 of any of the embodiments described herein can optionally include a strap 19, 2000, such as, a string, Velcro strap, sheet hook or other mechanism for securing a temporary opening formed in the sheet of materials 201, for example, in the manner described in further detail below in connection with FIGS. 6E(A) and 6E(B). Although not shown in each partition assembly kit 1000, one or more straps 19, 2000 can be optionally included in any of the partition assembly kit embodiments described herein.

Figure 4C:
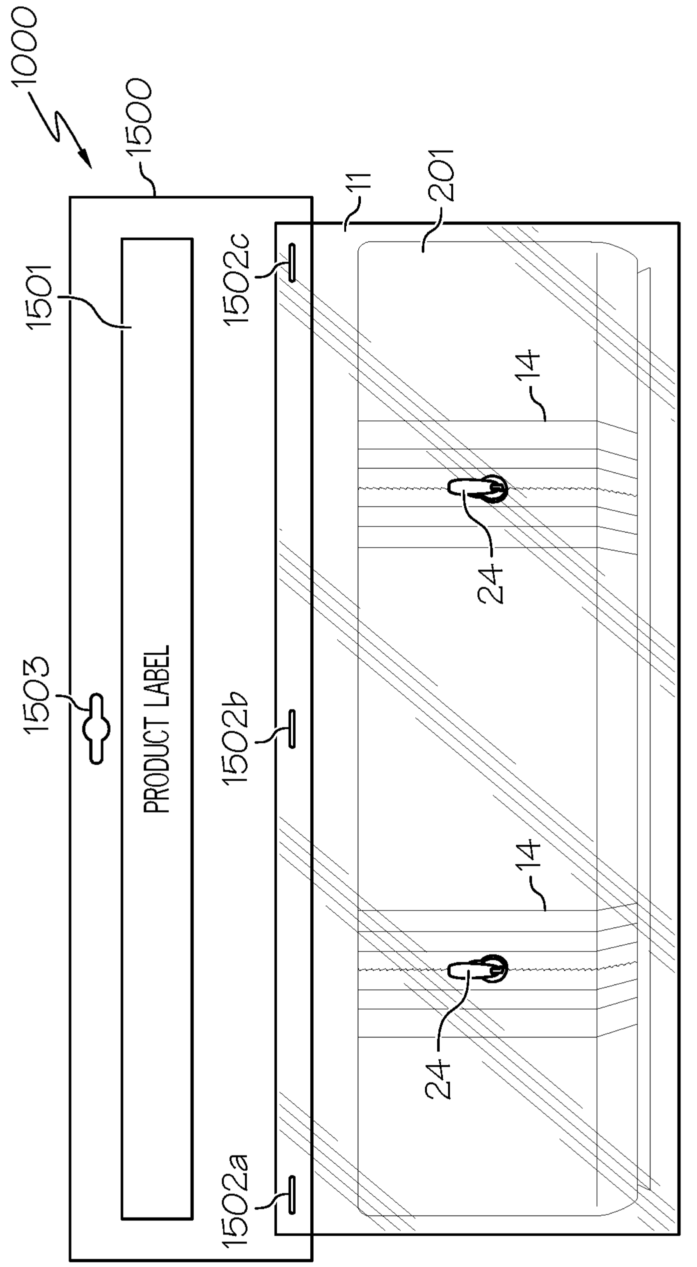
FIGS. 4C(A) and 4C(B) are perspective views of a partition assembly kit including components and tools for assembling a partition mounting system in accordance with another embodiment of the present inventive concepts.
Figure 4C:
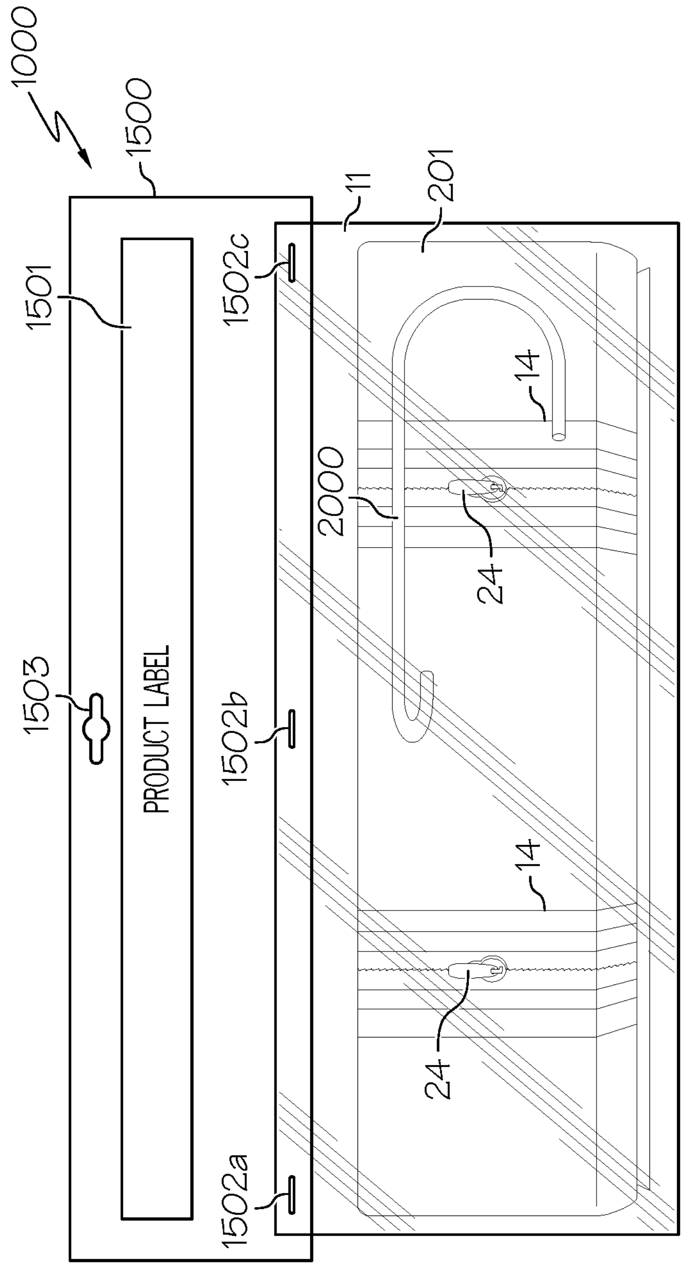

Referring to FIGS. 4C(A) and 4C(B), a partition assembly kit 1000 can be enclosed within receptacle 11, such as a plastic bag, sleeve or other type of receptacle 11 mentioned in connection with FIGS. 1A(A) through 1D. In this embodiment, the partition assembly kit 1000 comprises a sheet of material 201 having first and second zippers 14 pre-attached thereto. However, in other embodiments, the sheet of material 201 may comprise a single, pre-attached zipper 14. In the embodiment shown in FIG. 4C(B), the partition assembly kit 1000 includes a pair of straps 2000. In an alternative embodiment, the partition assembly kit 1000 may include a single strap or more than two straps.

The partition assembly kit 1000 may further comprise a paper or plastic header 1500, which can be stapled, glued or press-sealed to the receptacle 11. In this embodiment, the header 1500 is shown stapled to the receptacle 11 via first, second and third staples 1502*a*, 1502*b* and 1502*c*. The header 1500 may further comprise a product label that is secured to the header 1500; however, the product label can also be printed directly onto the header 1500.

Further, the header 1500 can comprise a shelving hanger opening 1503, which can be used to hang the partition assembly kit 1000 on store shelving systems.

Figure 4D:
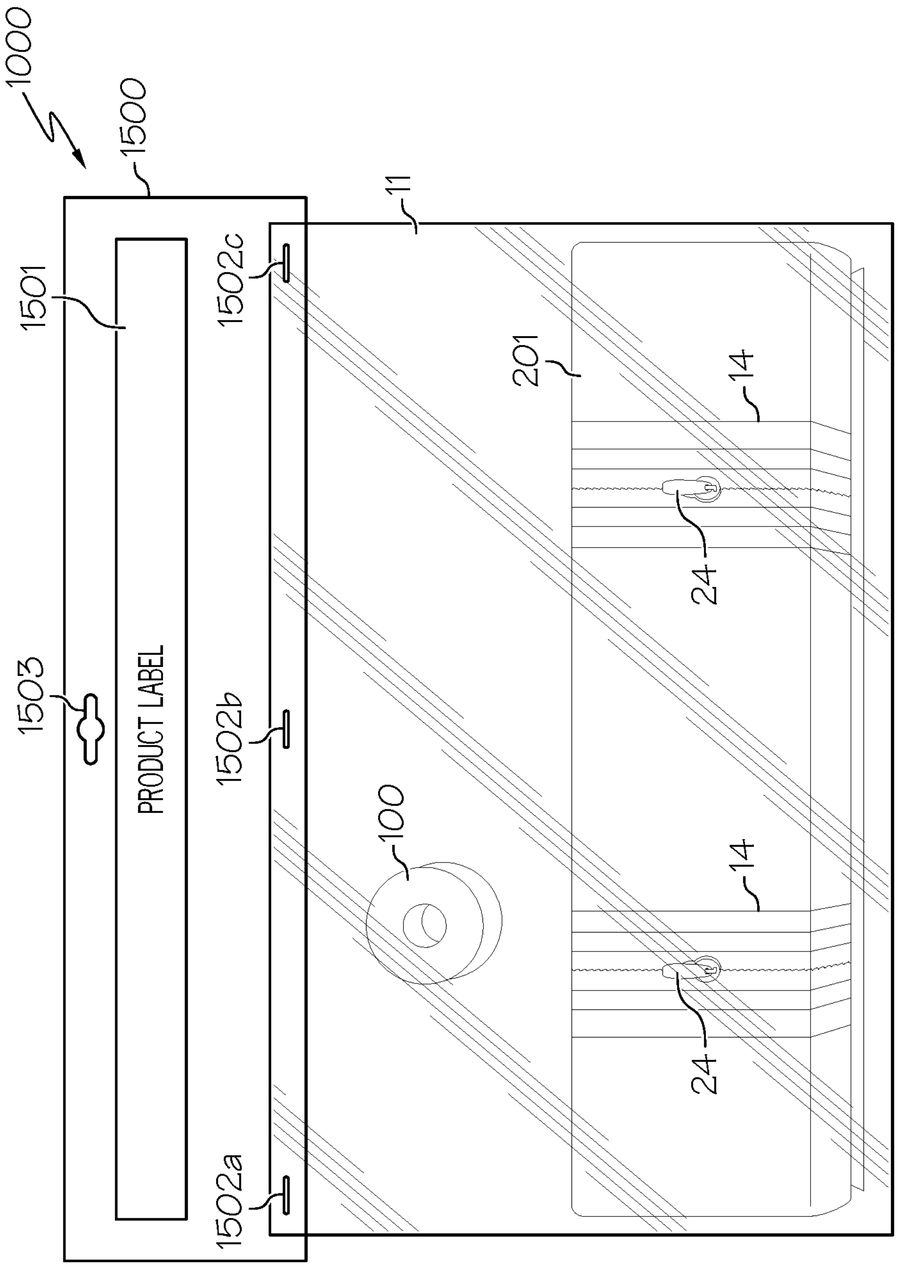
FIGS. 4D(A) and 4D(B) are perspective views of a partition assembly kit including components and tools for assembling a partition mounting system in accordance with another embodiment of the present inventive concepts.
Figure 4D:
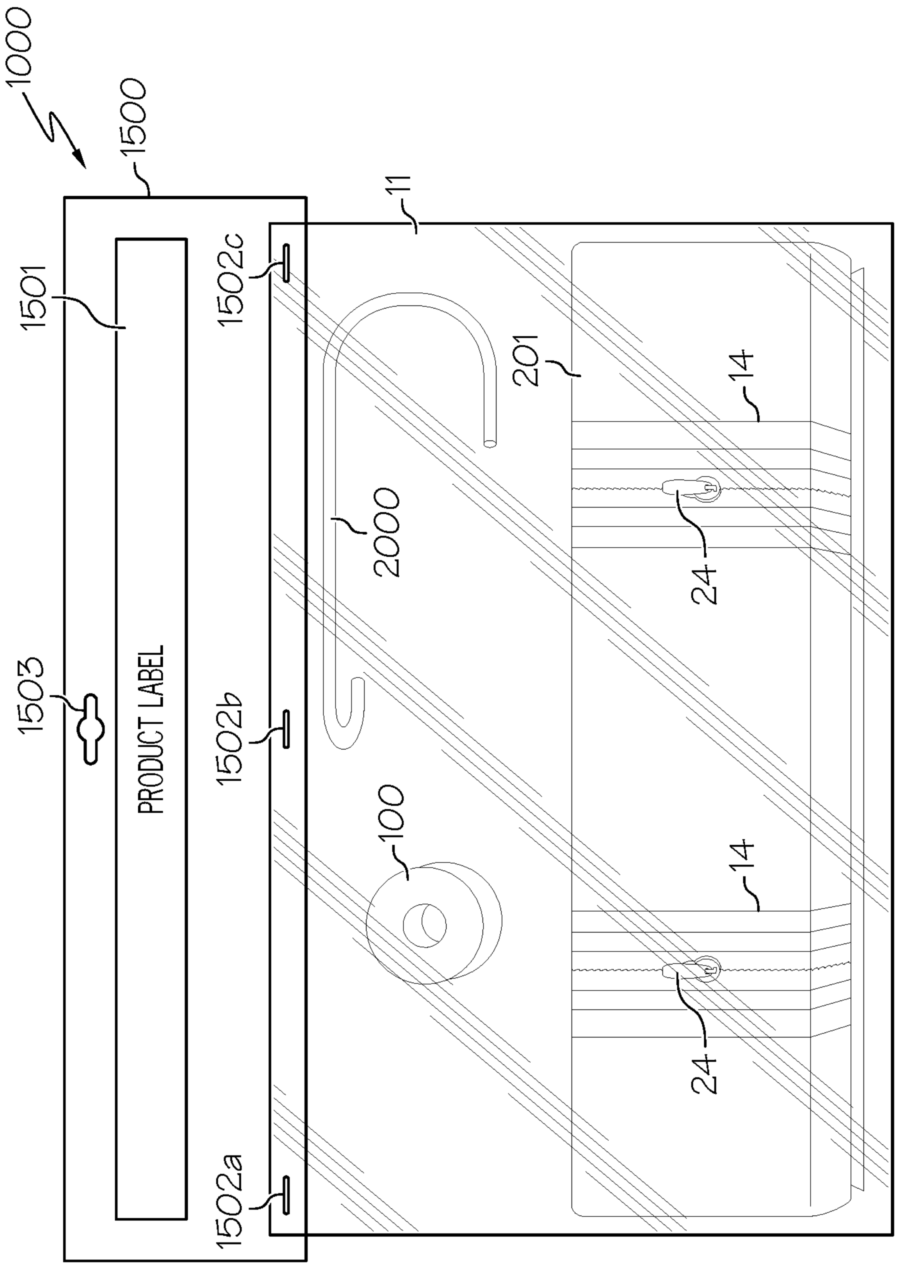

Referring to FIGS. 4D(A) and 4D(B), a partition assembly kit 1000 can be enclosed within receptacle 11, such as a plastic bag or sleeve. In this embodiment, the partition assembly kit 1000 comprises a sheet of material 201 having first and second zippers 14 pre-attached thereto and a roll of double-sided tape 100. However, in other embodiments, the sheet of material 201 may comprise a single pre-attached zipper 14. In the embodiment shown in FIG. 4D(B), the partition assembly kit 1000 includes a pair of straps 2000. In an alternative embodiment, the partition assembly kit 1000 may include a single strap or more than two straps.

Figure 4E:
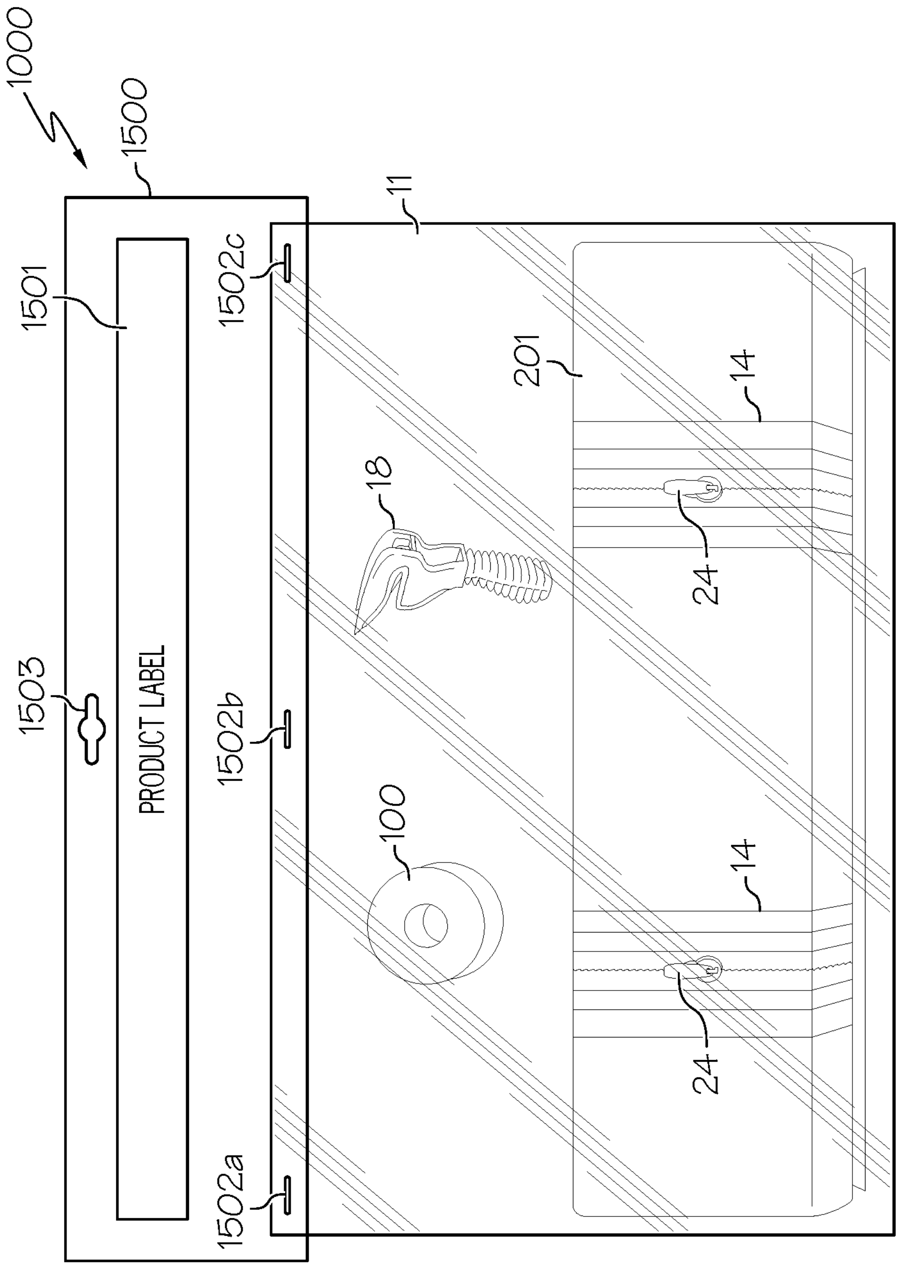
FIGS. 4E(A) and 4E(B) are perspective views of a partition assembly kit including components and tools for assembling a partition mounting system in accordance with another embodiment of the present inventive concepts.
Figure 4E:
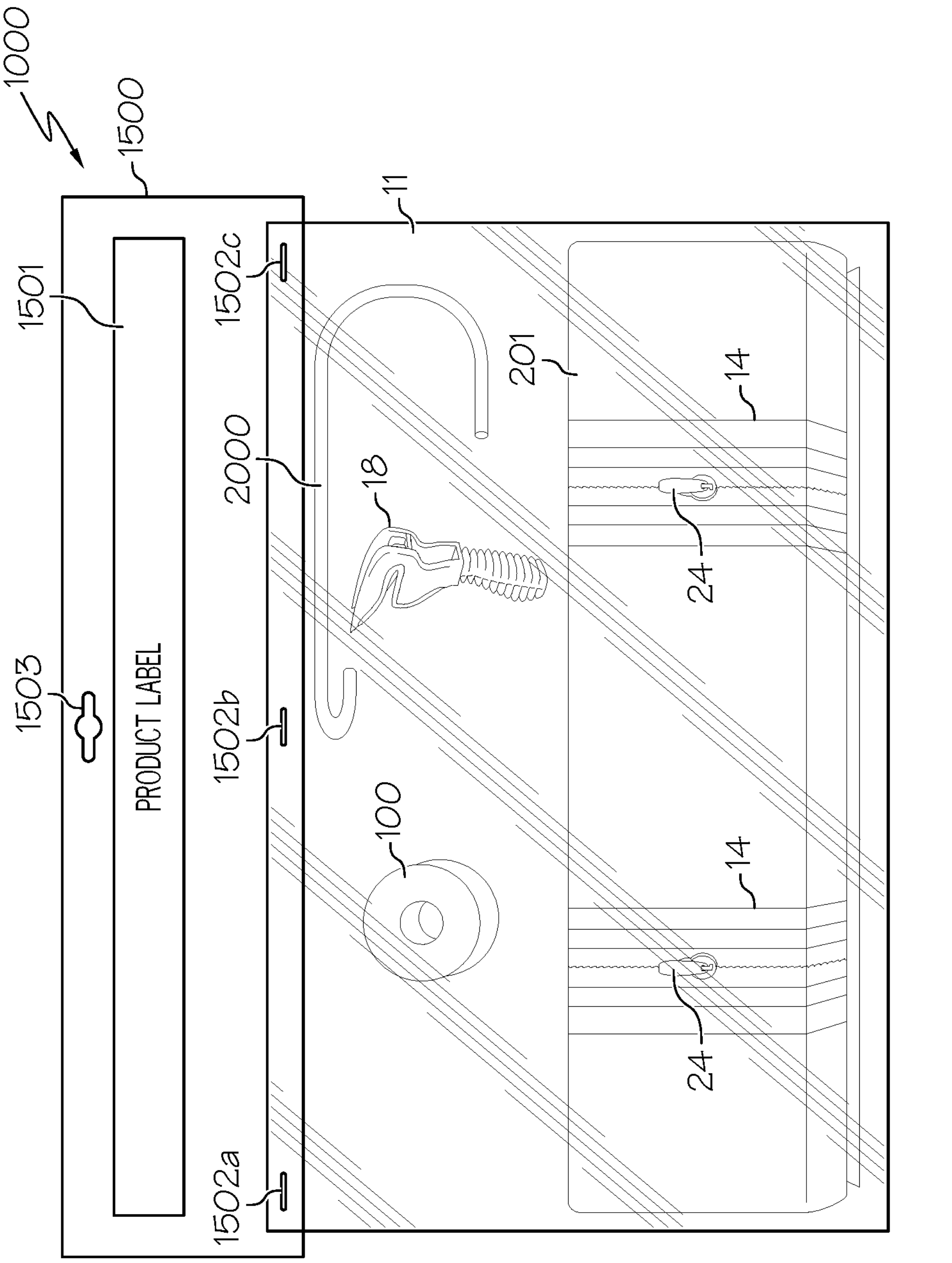

Referring to FIGS. 4E(A) and 4E(B), a partition assembly kit 1000 can be enclosed within receptacle 11, such as a plastic bag or sleeve. In this embodiment, the partition assembly kit 1000 comprises a sheet of material 201 having first and second zippers 14 pre-attached thereto, a roll of double-sided tape 100 and a cutter 18. In the embodiments of FIGS. 4E(A) and 4E(B), the cutter 18 can be included in the event where the portions of the sheet material 201 that lie between the left and right flanges of the pre-attached zipper 14 are not pre-cut by the manufacturer. In other embodiments, the sheet of material 201 may comprise a single pre-attached zipper 14. In the embodiment shown in FIG. 4E(B), the partition assembly kit 1000 includes a pair of straps 2000. In an alternative embodiment, the partition assembly kit 1000 may include a single strap or more than two straps.

Figure 4F:
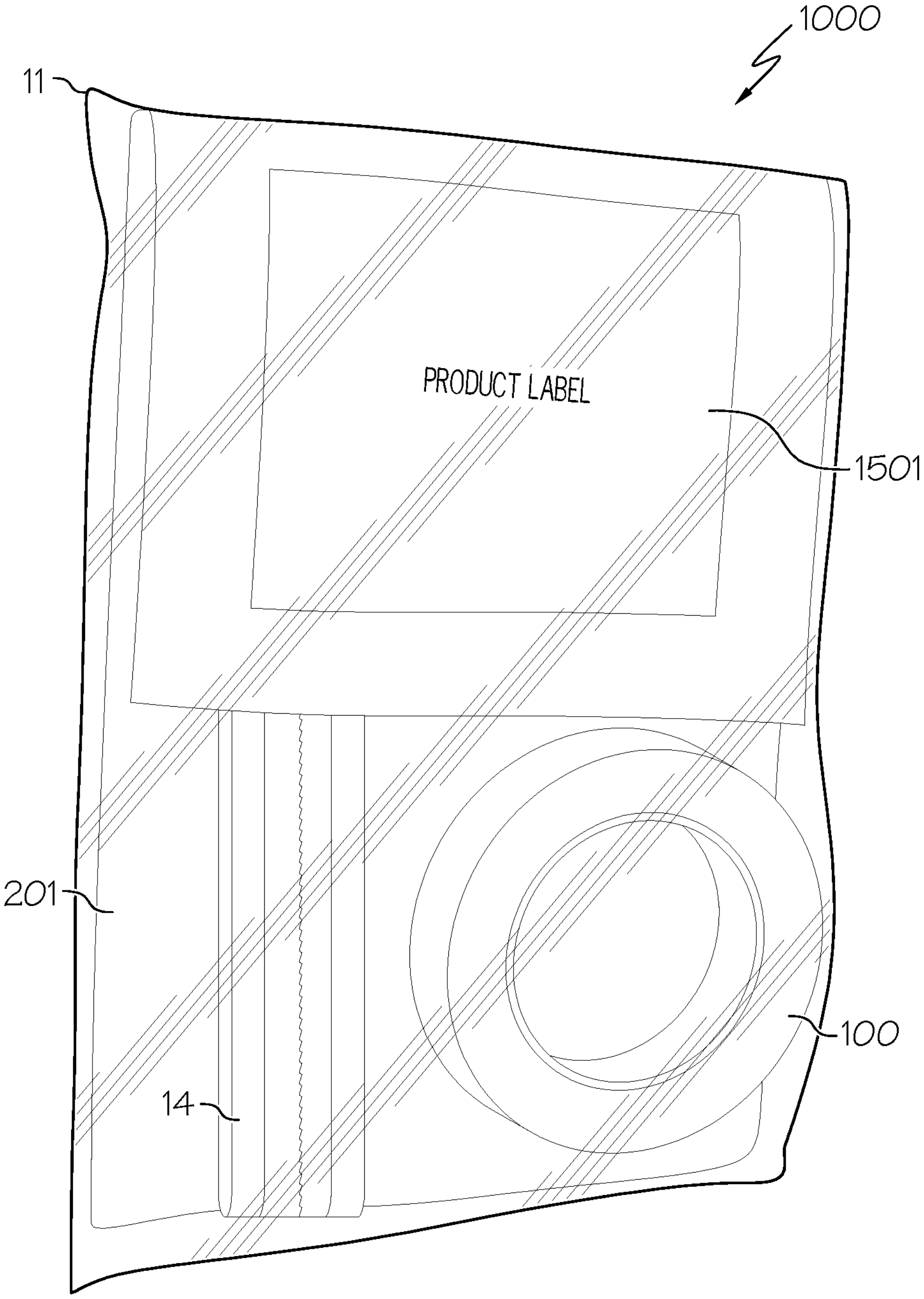
FIGS. 4F(A) and 4F(B) are perspective views of a partition assembly kit including components and tools for assembling a partition mounting system in accordance with another embodiment of the present inventive concepts.
Figure 4F:
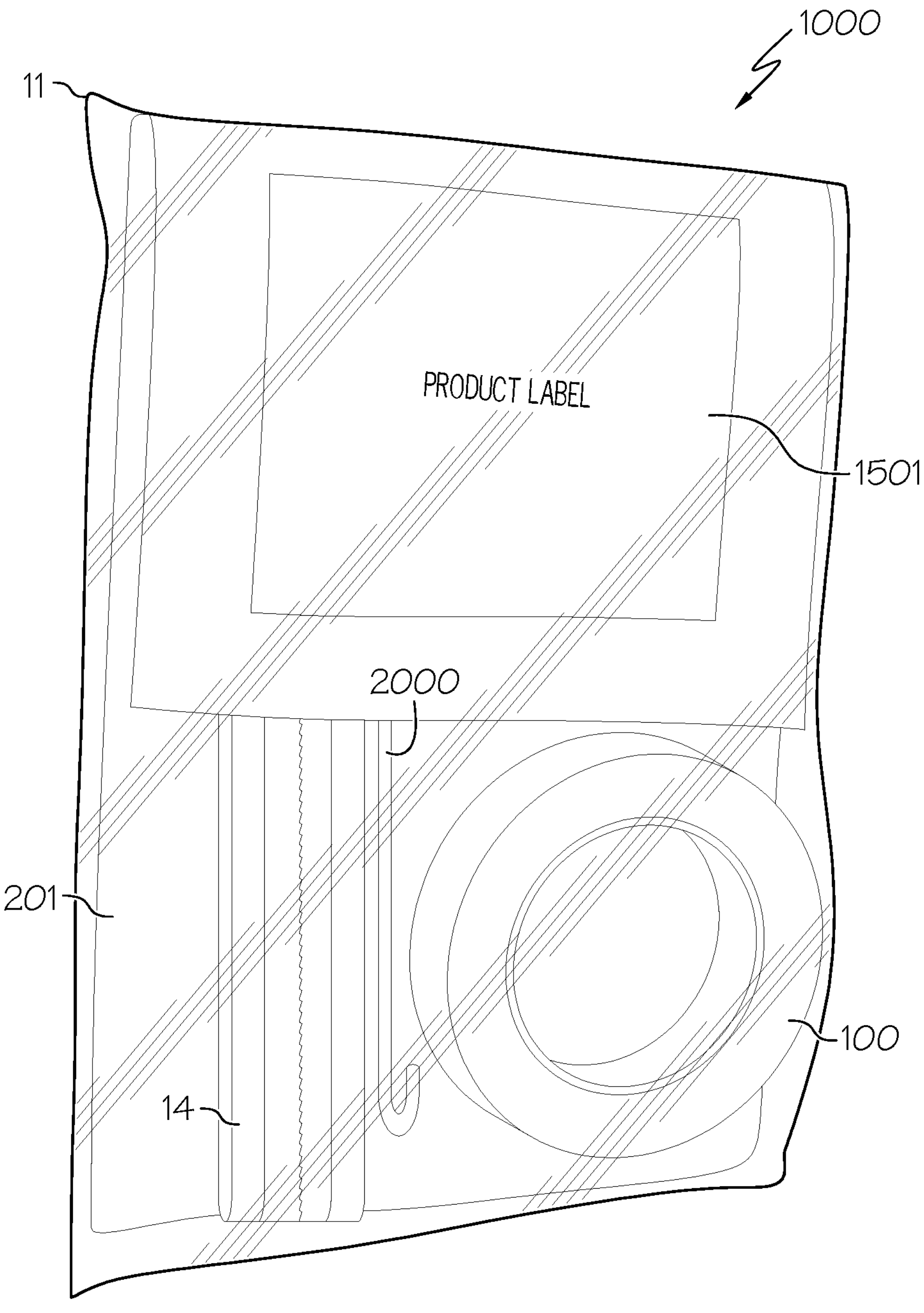

Referring to FIGS. 4F(A) and 4F(B), a partition assembly kit 1000 can be enclosed within receptacle 11, such as a plastic bag or sleeve. The partition assembly kit 1000 is shown enclosed within receptacle 11, such as a sealed plastic bag. In the embodiment shown in FIG. 4F(B), the partition assembly kit 1000 includes a pair of straps 2000. In an alternative embodiment, the partition assembly kit 1000 may include a single strap or more than two straps.

In this embodiment, the partition assembly kit 1000 comprises a sheet of material 201 having a single pre-attached zipper 14 and a roll of double-sided tape 100. However, in other embodiments, the sheet of material 201 can comprise first and second zippers 14 pre-attached thereto.

In some embodiments, the product label 1501 can comprise a paper or plastic label that is positioned within the receptacle 11; however, in other embodiments, the product label can comprise a paper or plastic label secured to an outer surface of the receptacle 11. In other embodiments, the product label 1501 can be printed directly on the receptacle 11.

Figure 5:
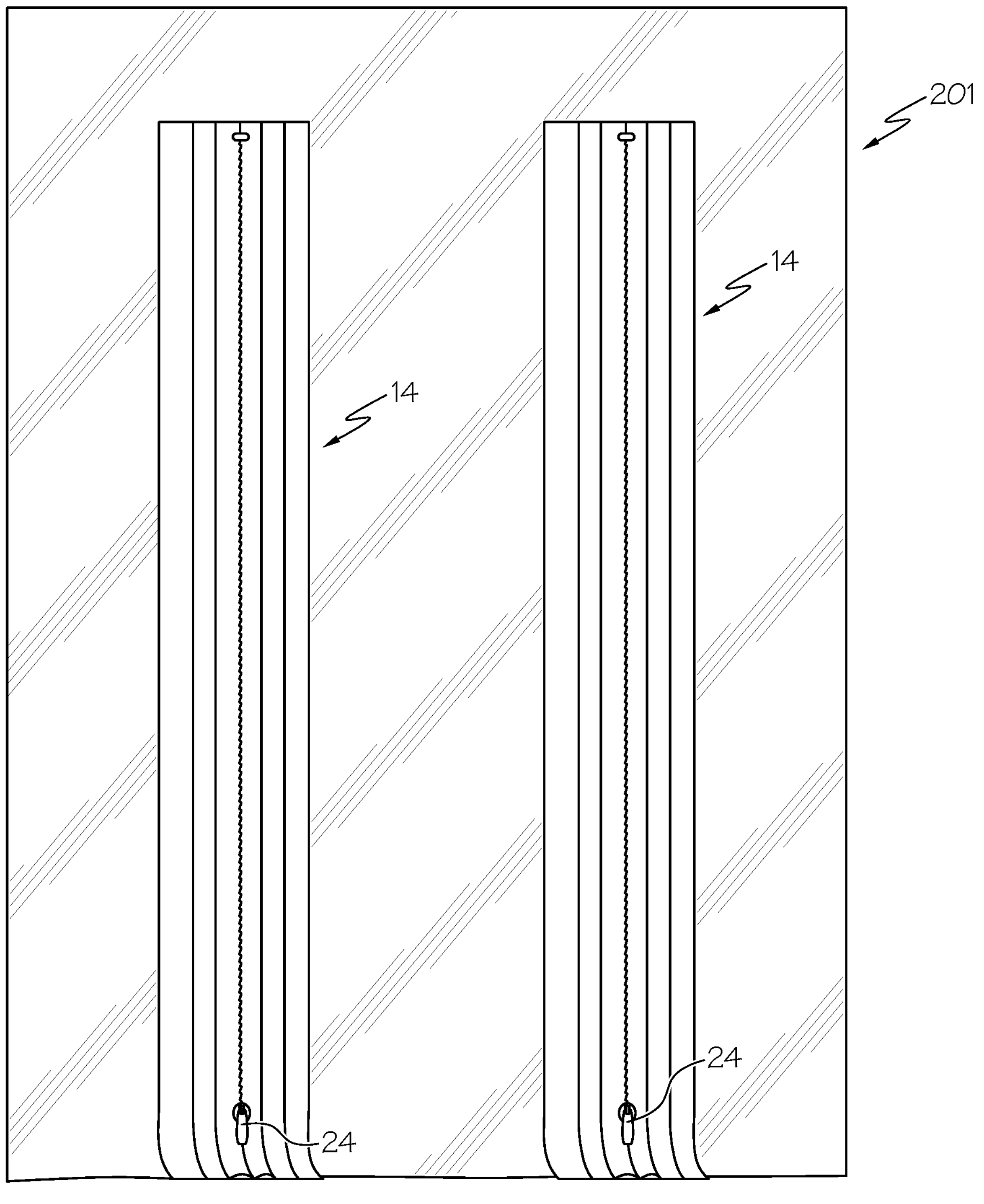
FIG. 5 is a perspective view of a sheet of material having pre-attached zippers thereon of a type that can be included with the partition assembly kits of FIGS. 4A through 4F, in accordance with embodiments of the present inventive concepts.

FIG. 5 is a perspective view of a sheet of material having pre-attached zippers thereon of a type that can be included with the kits of FIGS. 4A(A) through 4F(B), in accordance with embodiments of the present inventive concepts. In this embodiment, the sheet of material comprises first and second pre-attached zippers 14 each having pull tabs 24. However, as described above, in some embodiments the sheet of material can comprise a single pre-attached zipper 14.

The first and second zippers 14 are preferably sewn onto the sheet of material 201; however, in other embodiments, the first and second zippers 14 can be attached to the sheet of material 201 by an adhesive material. In other embodiments, the first and second zippers 14 can be hot-melted to sheet of material 201.

FIGS. 6A through 6E(B) illustrate a method for assembling a partition mounting system using a partition assembly kit of the type described in connection with FIGS. 4A(A) through 4F(B), in accordance with embodiments of the present inventive concepts. In this example, the installer 200 installs a partition mounting system using the partition assembly kit 1000. The partition mounting system of FIGS. 6A-6E(B) is constructed and arranged to seal and/or isolate a door way 131 of a room 130.

Figure 6A:
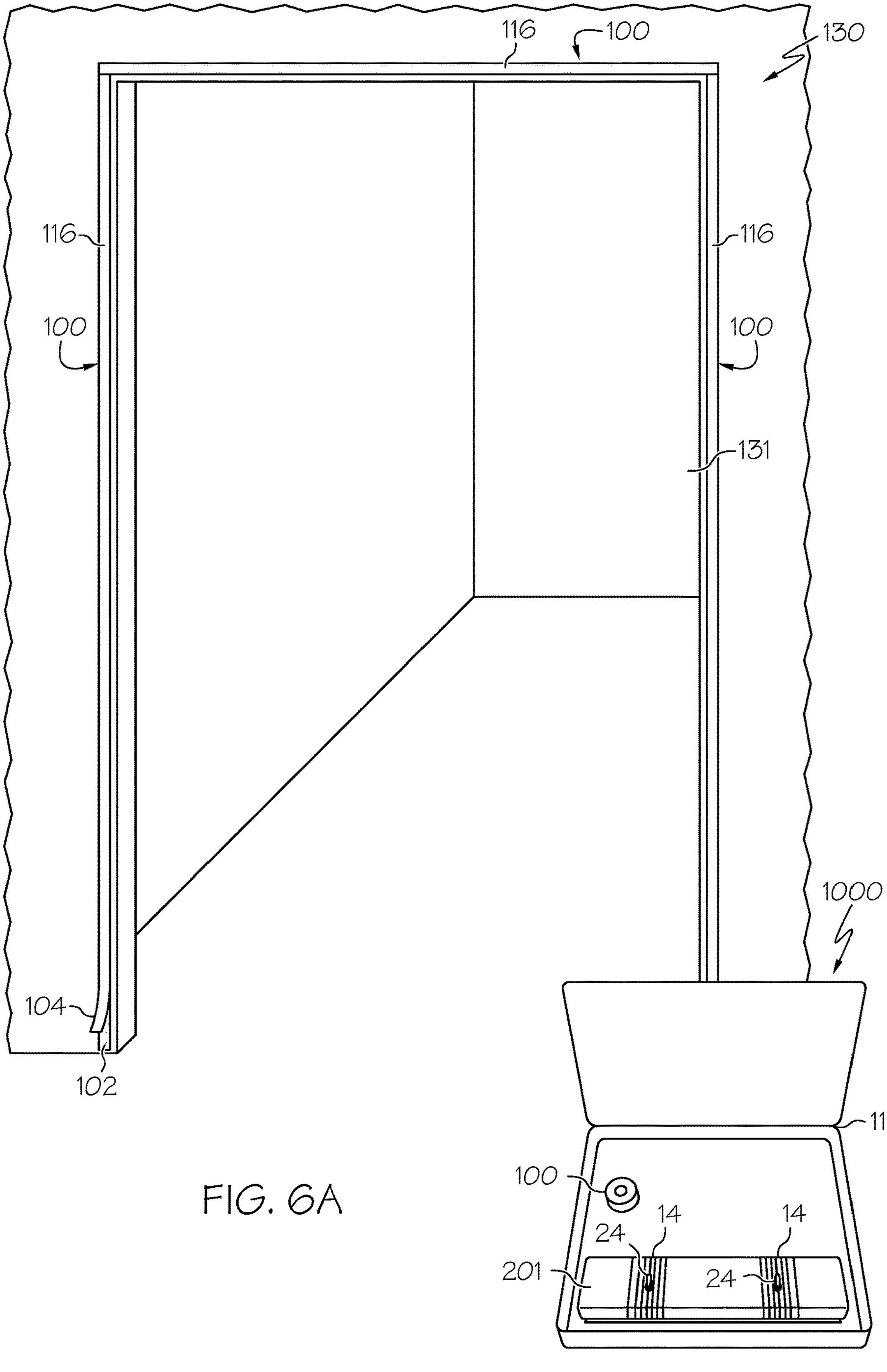
FIGS. 6A-6E(B) illustrate a method for assembling a partition mounting system using a partition assembly kit of the type described in connection with FIGS. 4A(A) through 4F(B), in accordance with embodiments of the present inventive concepts.

In FIG. 6A, an installer 200 removes a roll of double-sided tape 100 from the receptacle 11 of the partition assembly kit 1000. The installer 200 affixes a second side of the double-sided tape 100 having a low-tack adhesive material 103 to the door frame 116 of the door way 131.

In other embodiments, the installer 200 can affix the sheet of material 201 to the window or door frames using strips of single-sided tape 100.

Figure 6B:
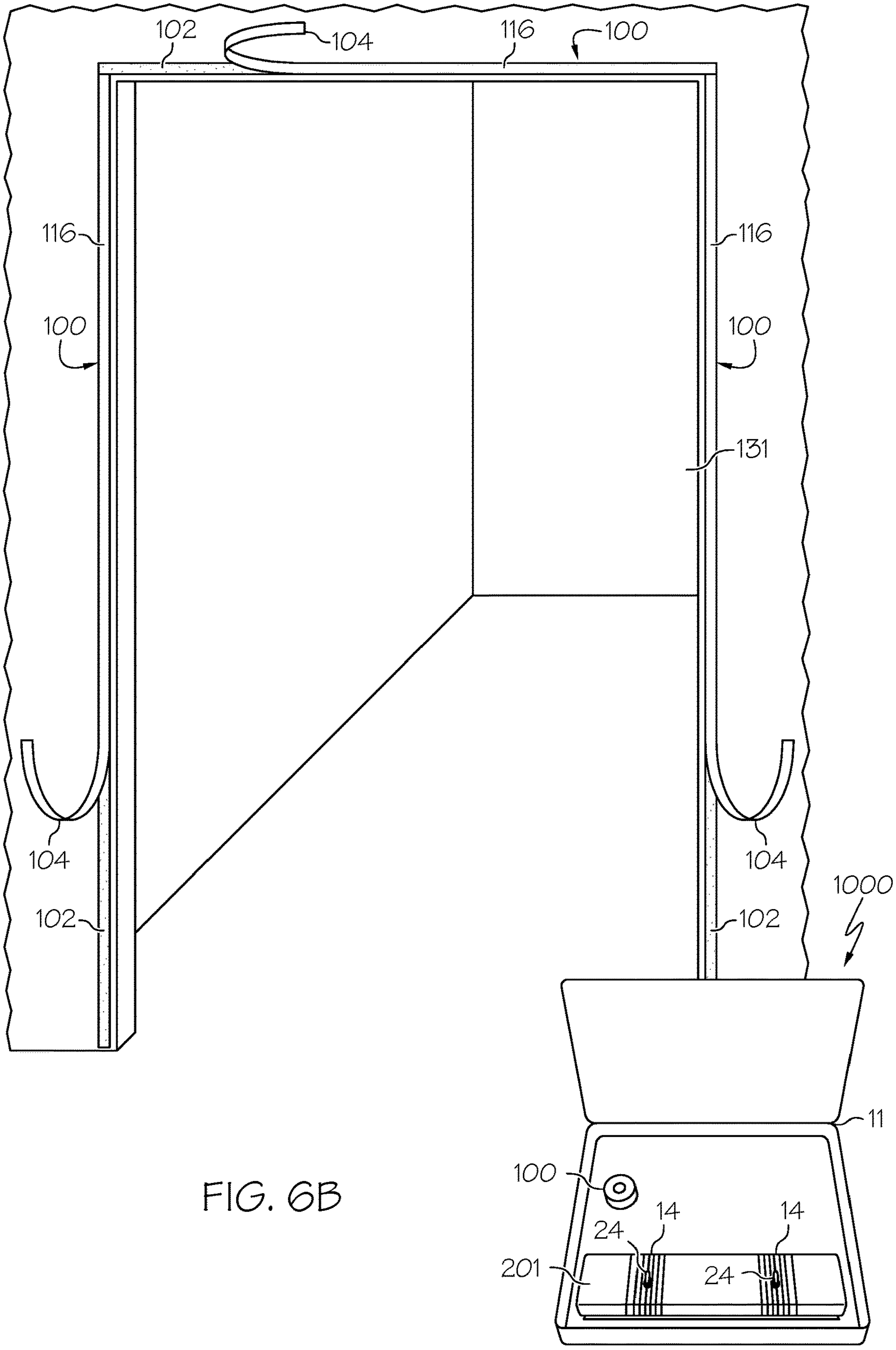

In FIG. 6B, the protective strip or tape liner 104 is removed from the double-sided tape 100 by the installer 200, thus exposing the first side of the double-sided tape 100 having a high-tack adhesive material 102 thereon.

The installer 200 removes the sheet of material 201 having the pre-attached first and second zippers 14 from the kit the receptacle 11 of the partition assembly kit 1000. However, as described above, the sheet of material 201 may comprise a single pre-attached zipper 14.

Figure 6C:
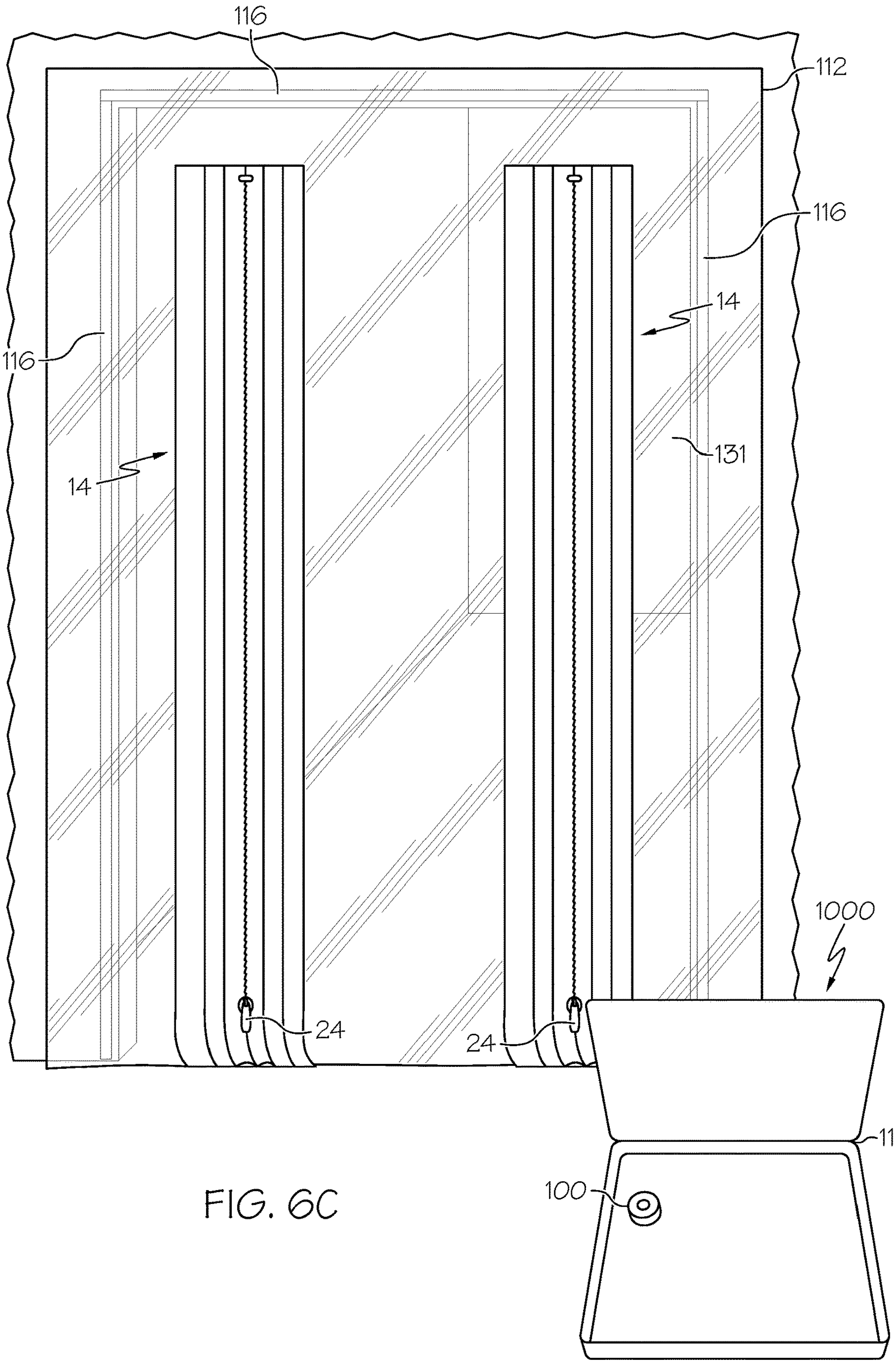

In FIG. 6C, the installer 200 affixes the sheet of material 201 to the door frame 116 having the double-sided tape 100 thereon to create a no-breach seal that can withstand negative pressure. In one embodiment, the sheet of material 201 may need to be cut to size in order to cover the desired opening or area. However, in other embodiments, the partition assembly kit may comprise sheets of material 201 designed for specific opening sizes.

Figure 6D:
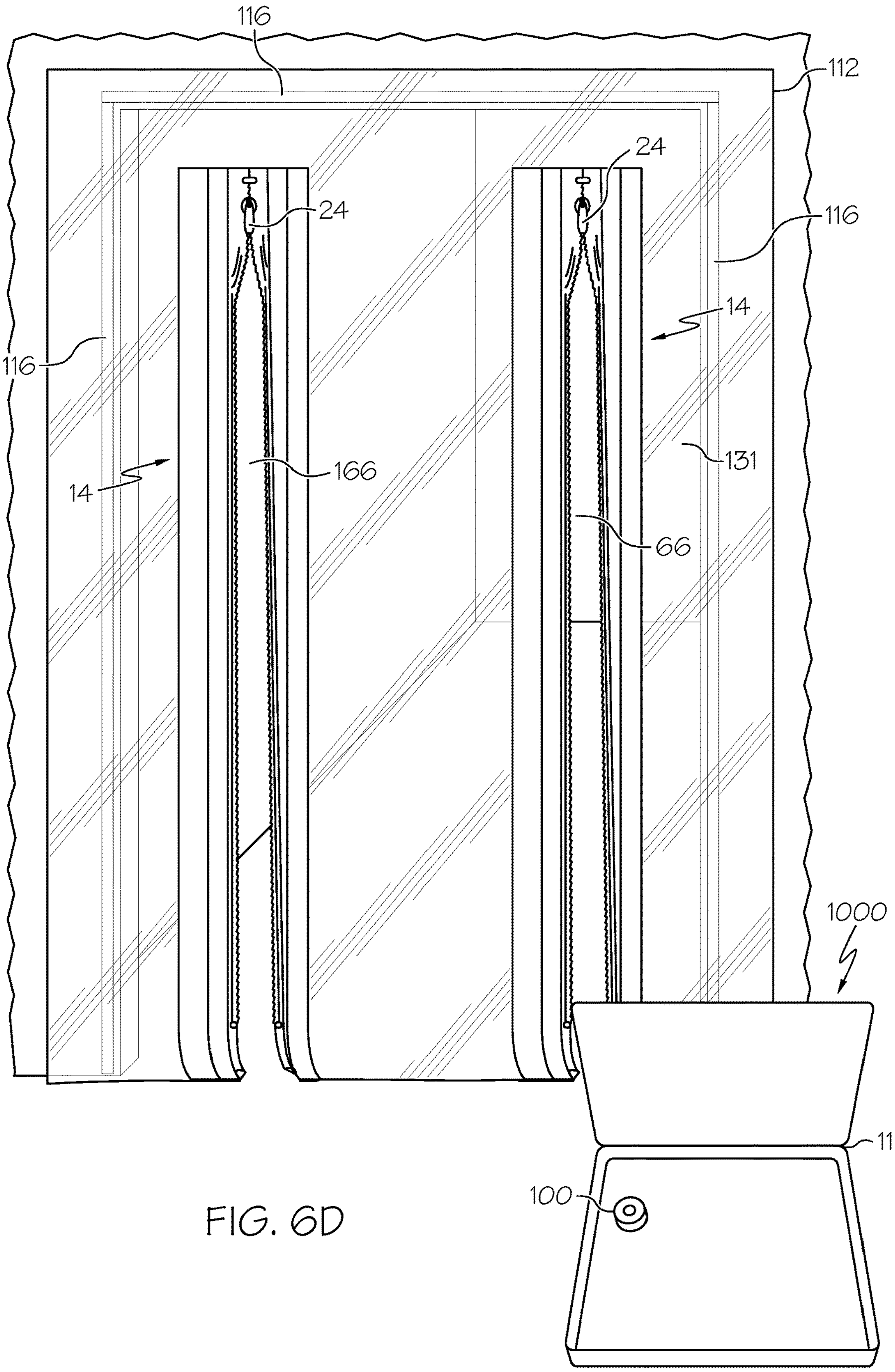

FIG. 6D is a perspective view of the installed partition mounting system having the zippers 14 in an opened configuration. A temporary entryway is provided in the openings 66, 166 of the zippers 14. The temporary entryway can be opened and closed at will by engaging and releasing the zippers 14 with the zipper pull 2014. Although shown with first and second zippers 14, and entryway can be provided in an opening 66 of a sheet of material 201 having a single zipper 14 pre-attached thereto.

Figure 6E:
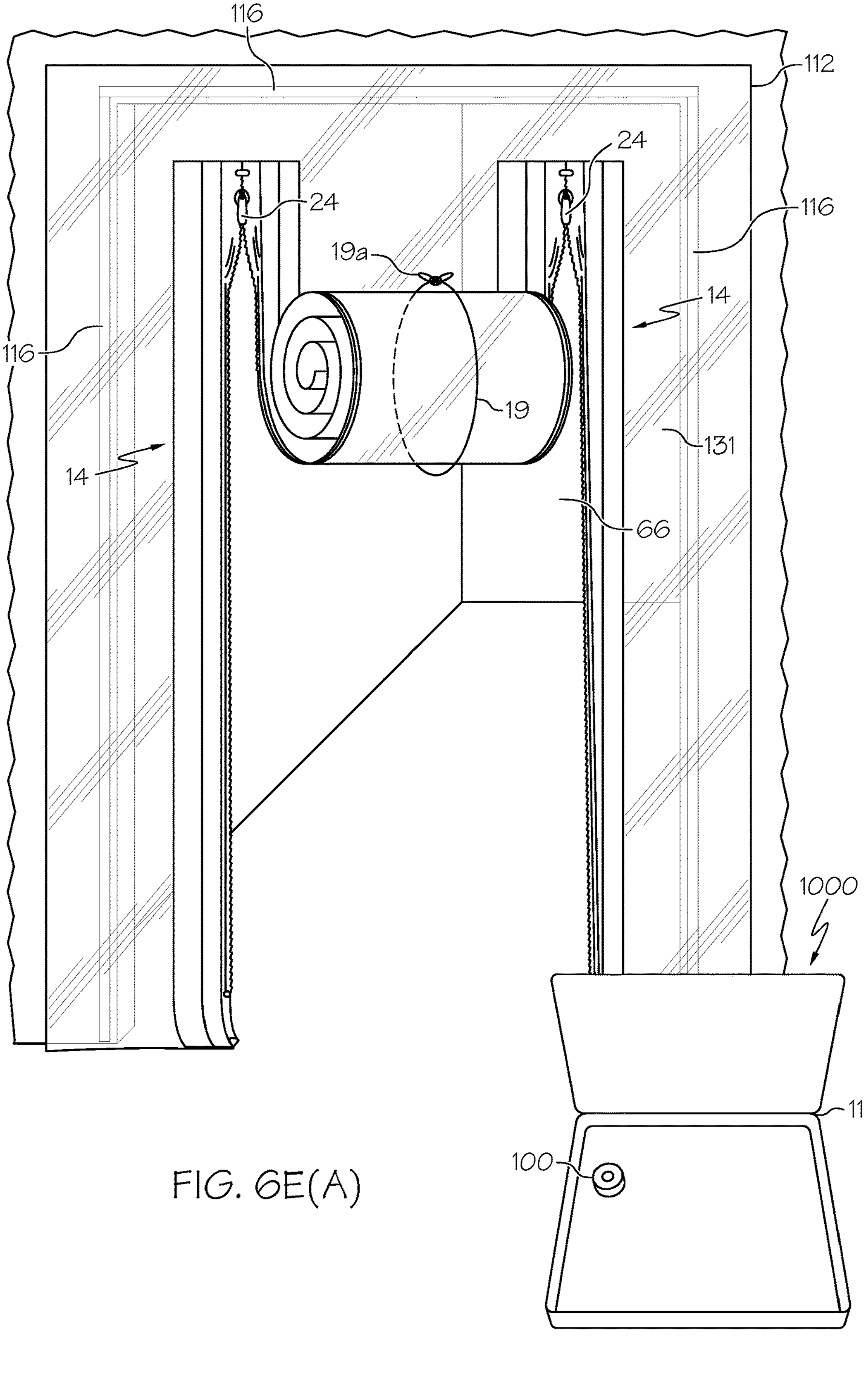
Figure 6E:
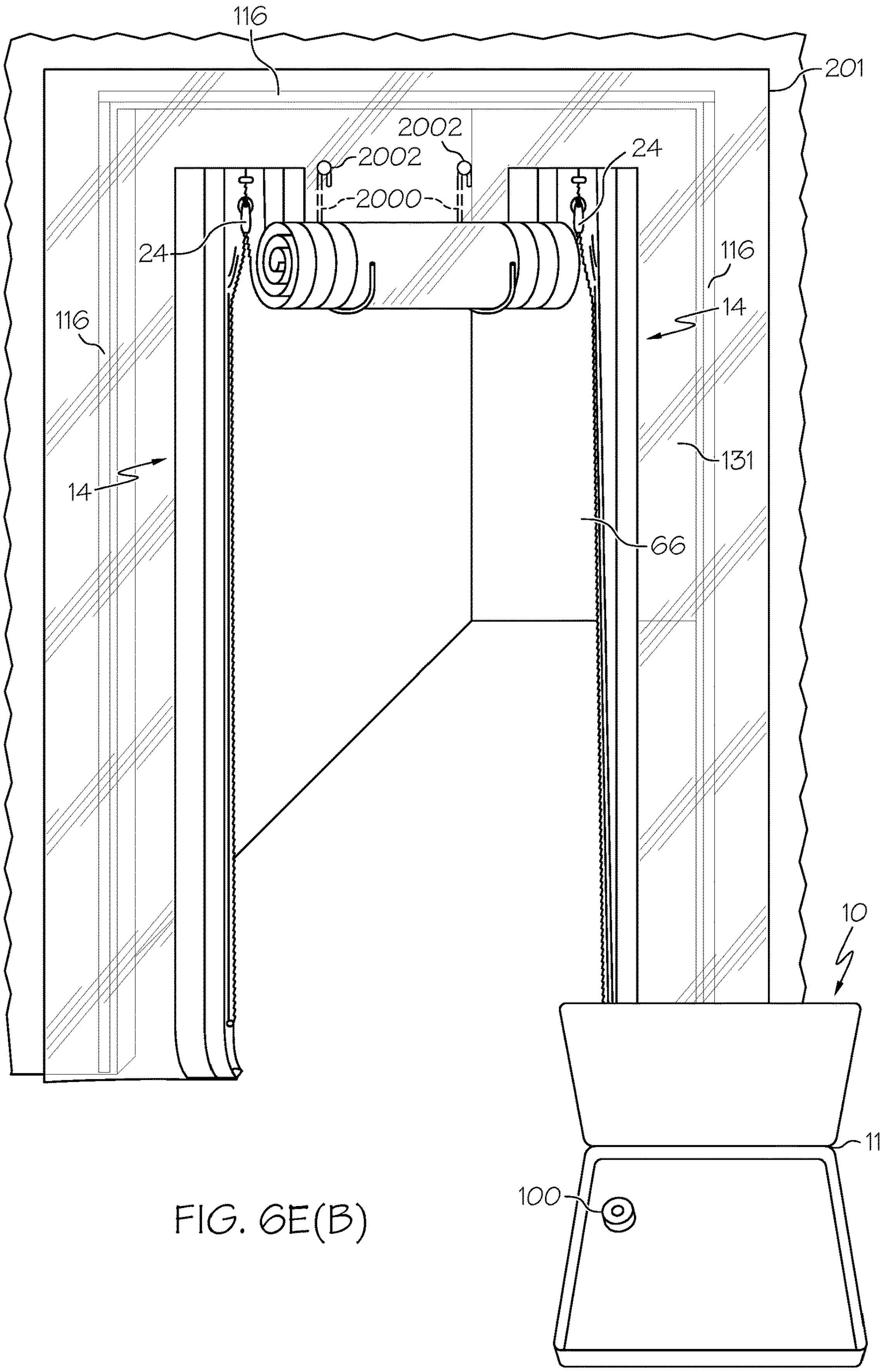

FIG. 6E(A) illustrates a portion of the sheet of material 201*a* between the first and second zippers 14 rolled up in order to create a temporary entryway. In some embodiments, the installer 200 can roll up and secure a portion 201*a* of the sheet of material 201 using a strap 19. For example, the installer 200 can place one end of the strap 19 through a hole 19*a* of the portion 201*a* of the sheet of material 201, wrap a length of the strap 19 around the rolled up portion 201*a*, and tie the ends of the strap 19 together. In other embodiments, the strap my comprise a Velcro like material for securing the rolled up portion 201*a* of the sheet of material 201.

FIG. 6E(B) illustrates a portion of the sheet of material between the first and second zippers 14 rolled up in order to create a temporary entry way. For example, the installer can roll up and secure the portion of the sheet of material between the first and second zippers 14 using the first and second straps 2000. The rolled up portion of the sheet of material can be placed within second hook portions 2020 (see for example FIG. 10) of the first and second straps 2000. In this manner, the rolled up portion of the sheet of material can rest within the second hook portions 2020 of the first and second straps 2000 so as to allow for easy ingress and egress from a partitioned area.

In a similar fashion as described in connection with FIGS. 3N(A) and 3N(B), the first and second straps 2000 can be secured to the sheet of material 201. For example, the first and second straps 2000 can be removed from a receptacle 11 by the installer. The installer can then position the first strap 2000 about an upper portion of the sheet of material 201, between the first and second zippers 14, and puncture the sheet of material 201 with a first end 2015 (see for example FIG. 10) of the first strap 2000. In this manner, the first end 2015 of the first strap 2000 can form a first opening 2002 in the sheet of material 201 while at the same time securing the first strap 2000 to the sheet of material 201. The installer can then position the second strap 2000 about an upper portion of the sheet of material 201, between the first and second zippers 14 and adjacent to the first strap 2000, and puncture the sheet of material 201 with a first end 2015 (see for example FIG. 10) of the second strap 2000. In this manner, the first end 2015 of the second strap 2000 can form a second opening 2002 in the sheet of material 201 while at the same time securing the second strap 2000 to the sheet of material 201.

Alternatively, in some embodiments the sheet of material 201 may include pre-formed openings 2002. In these embodiments, the installer can secure the first and second straps 2000 to the sheet of material 201 by positioning first ends 2015 (see for example FIG. 10) of the first and second straps 2000 through the first and second pre-formed openings 2002, respectively. The first and second pre-formed openings may include first and second grommets, respectively, which may help to prevent tearing of the sheet of material.

FIG. 7 is a table of technical data properties of double-sided tape in accordance with embodiments of the present inventive concepts. In one embodiment the double-side tape 100 has a thickness of 0.23 mm, plus-or-minus 0.1 mm. In this embodiment the high-tack adhesive material 102 has a peel adhesion greater than or equal to 30 N/in and the low-tack adhesive material 103 has a peel adhesion greater than or equal to 6 N/in. Further, the high-tack adhesive material 102 has a peel adhesion greater than that of the low-tack adhesive material 103. Further, in this embodiment the double-sided tape 100 has a ball tack less than or equal to 10, a tensile strength greater than or equal to 65 N/in and an Elongation percentage greater than or equal to 13%.

The test properties shown in FIG. 7 are measured according to various test methods known in the art, including the use of industry recognized standards such as "GB" and "GB/T" national standards issued by the Standardization Administration of the People's Republic of China (SAC).

The double-sided tape thickness measurements provided herein were measured in accordance with SAC standard GB/T 72015-1999, "Test method for thickness of pressure-sensitive and gummed tapes", the contents of which is incorporated herein by reference.

The peel adhesion measurements of the high-tack adhesive material and the low-tack adhesive material provided herein were measured in accordance with SAC standard GB/T 2792-1998, "Test method for peel strength of pressure-sensitive tape at 180° angle", the contents of which is incorporated herein by reference.

The ball tack measurements provided herein were measured in accordance with SAC standard GB/T 4852-2002, "Test method for tack of pressure sensitive adhesive tapes by rolling ball", the contents of which is incorporated herein by reference.

The tensile strength and elongation measurements provided herein were measured in accordance with SAC standard GB 7753-1987, "Test method for tensile properties of pressure sensitive adhesive tapes", the contents of which is incorporated herein by reference.

In this manner, embodiments of the present inventive concepts provide a double-sided tape having a low-tack side that prevents damage to surfaces of a room when removed, and also having a high-tack side capable of securing a curtain or plastic sheet to surfaces of a room, door frame, window frame, and the like. Embodiments of the present inventive concepts further provide a method of installing various partition configurations using the double-sided tape. Embodiments of the present inventive concepts further provide partition assembly kits that comprise components of partition mounting systems and tools for installing and assembling said partition mounting systems.

FIGS. 8-11A are perspective views of a strap of a type that can be included with the partition assembly kits of FIGS. 1A(A) through 1D and FIGS. 4A(A) through 4F(B). For example, the partition assembly kits of FIGS. 1A(A) through 1D and FIGS. 4A(A) through 4F(B) may optionally include one or more straps 2000. That is, the partition assembly kits of FIGS. 1A(A) through 1D and FIGS. 4A(A) through 4F(B) may optionally include a single strap 2000, a pair of straps 2000 or a plurality of straps 2000.

In some embodiments, the strap 2000 may be formed of a solid, continuous wire, such as a metal wire. For example, the strap 2000 may be formed by bending a wire to match the strap configurations shown in FIGS. 8-12(D). The metal wire may include steel, aluminum, iron or an alloy material. Further, the metal wire may be coated so as to color (e.g., white, red, black) the wire to match a design of the partition assembly kit and/or product labels. The metal wire may also be coated to protect the wire from oxidizing (e.g., rusting). The wire may have a length ranging between 12 inches and 30 inches.

In other embodiments, the strap 2000 may be molded into a solid, integral strap. For example, the strap 2000 may be molded of a plastic material, such as thermoplastics. Conventional injection molding techniques may be employed to mold the straps 2000.

Figure 8:
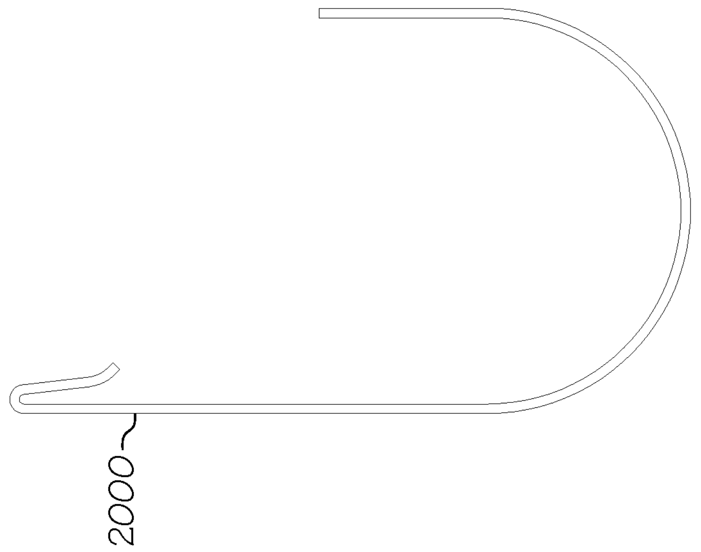
FIGS. 8-11A are perspective views of a strap of a type that can be included with the partition assembly kits of FIGS. 1A(A) through 1D and FIGS. 4A(A) through 4F(B), in accordance with other embodiments of the present inventive concepts.
Figure 9:
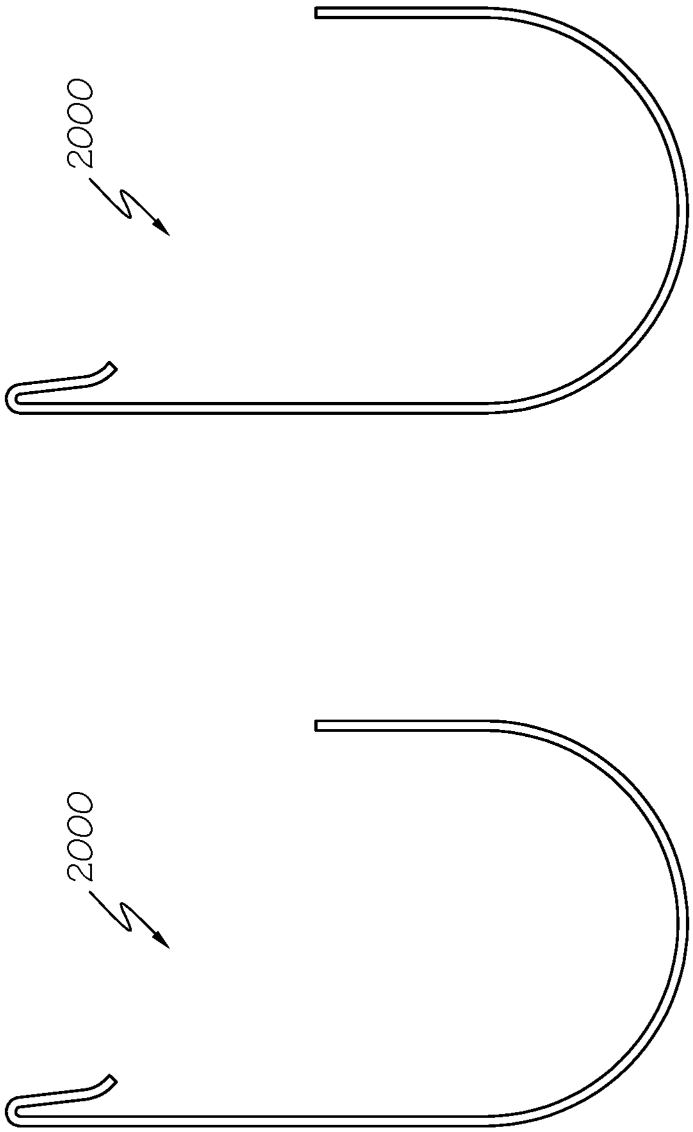

FIG. 8 illustrates a single strap 2000. FIG. 9 illustrates a pair of straps 2000.

Figure 10:
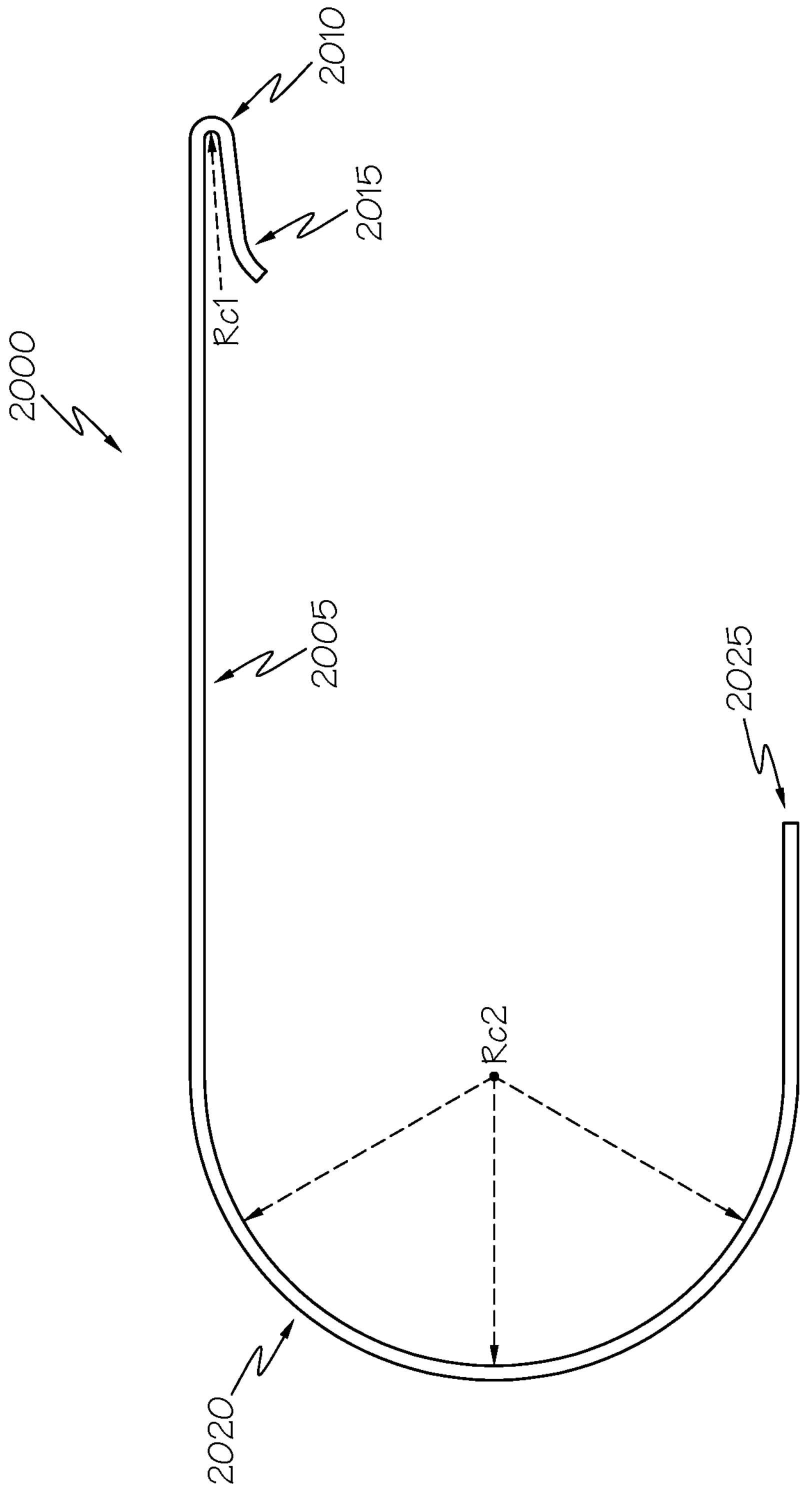
Figure 11:
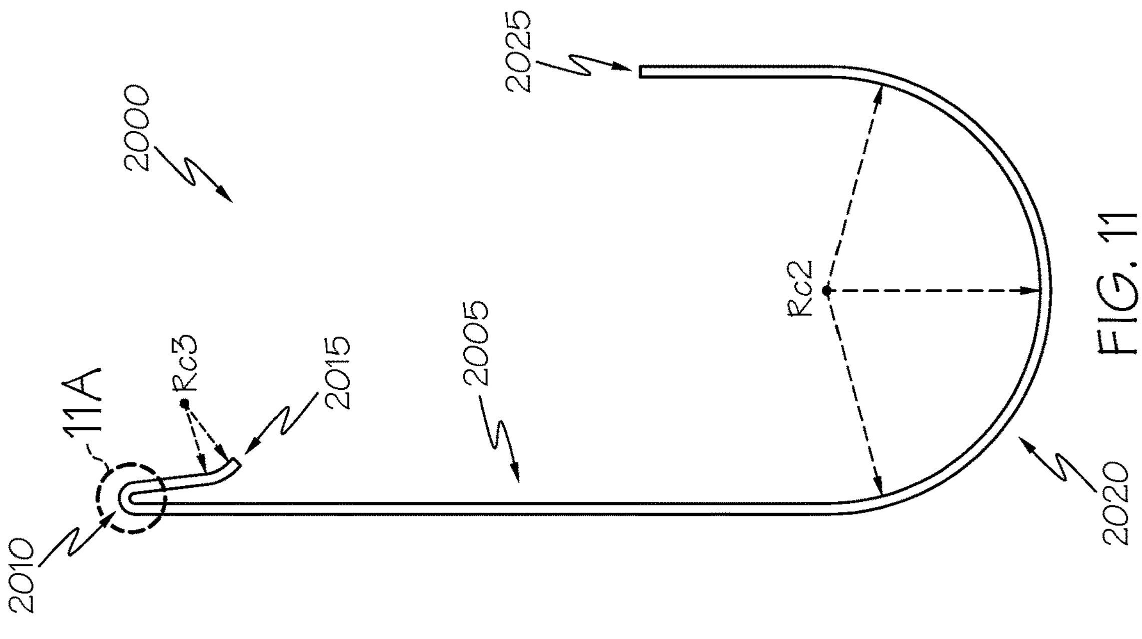
Figure 11A:
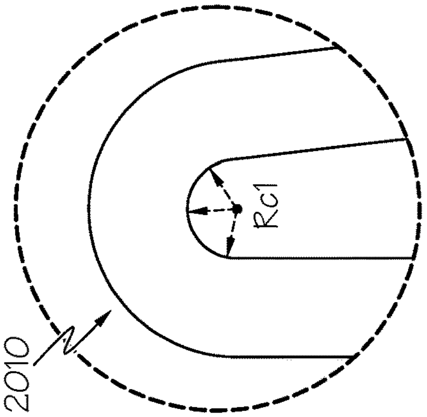

Referring to FIGS. 10 and 11, the strap 2000 may include a first hook portion 2010, which can be constructed to engage a sheet of material, and a second hook portion 2020, which can be constructed to support a rolled up portion of the sheet of material (see for example FIGS. 3O and 6E(B)). The first and second hook portions 2010, 2020 are shown connected via an intermediate portion 2005 of the strap 2000, and may each have concave portions facing one another.

The second hook portion 2020 of the strap 2000 may have a radius of curvature Rc2, which may range between 1½ inches to 3¼ inches. The radius of curvature Rc2 may be greater than a radius of curvature Rc1 of the first hook portion so as to be constructed to support a rolled up portion of a sheet of material (see for example FIGS. 3O and 6E(B)).

The first hook portion 2010 of the strap 2000 may have a radius of curvature Rc1, which may range between 1/16 of an inch to 5/8 of an inch. The radius of curvature Rc1 may be less than the radius of curvature Rc2 of the second hook portion so as to be constructed to engage a single layer of the sheet of material as compared to a rolled up portion of the sheet of material (see for example FIGS. 3O and 6E(B)).

A first end portion 2015 of the strap 2000 may curve outwardly from the first hook portion 2010 of the strap 2000. The first end portion 2015 may have a radius of curvature Rc3 (see for example, FIG. 11), which can range between 3½ inches to 6 inches. The radius of curvature Rc3 may be greater than the radius of curvatures Rc1, Rc2 of the first and second hook portions 2010, 2020 so as to extend the first end portion 2015 of the strap 2000 outward from the first hook portion 2010 of the strap 2000. In this manner, an installer may easily puncture a sheet of material with a first end 2015 of the strap 2000 (see for example FIGS. 3N(A) and 3N(B)).

FIGS. 12(A) through 12(D) are perspective views of alternative second end configurations. A second end 2025 of the strap 2000 may be constructed in various alternative configurations (e.g., 2025*a*, 2025*b*, 2025*c*, 2025*d*). These alternative configurations may be incorporated into the strap 2000 to prevent injury, such as a hooking of an installer or other person accessing the entryway created by partition assembly kit.

Figure 12A:
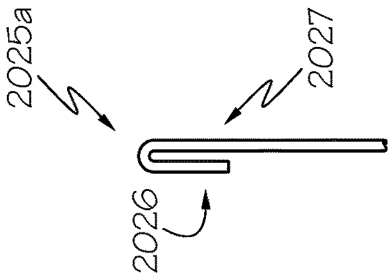
FIGS. 12(A)-12(D) are perspective views of alternative second end configurations, in accordance with embodiments of the present inventive concepts.

Referring to FIG. 12(A), a distal end 2026 of the strap 2000 may be crimped or molded over to abut or neighbor a tip portion 2027 of the second end 2025*a* of the strap 2000. In this manner, the distal end portion 2026 of the strap 2000 can be shield so as to prevent injury.

Figure 12B:
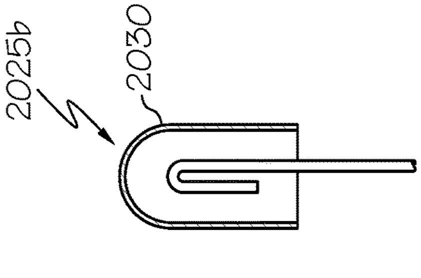

Referring to FIG. 12(B), a cap 2030 may be placed over the second end 2025, 2025*a* of the straps illustrated in FIGS. 11 and 12(A) so as to prevent injury. The cap 2030 may include a rubber or plastic cap.

Figure 12C:
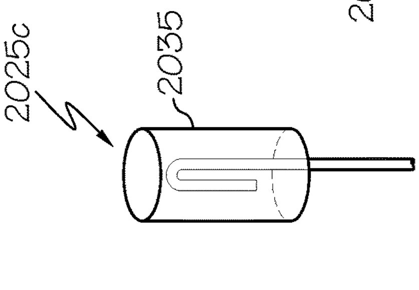

Referring to FIG. 12(C), a sleeve 2035 may be placed over the second end 2025, 2025*a* of the straps illustrated in FIGS. 11 and 12(A) so as to prevent injury. The sleeve 2035 may include a rubber sleeve, a plastic sleeve or a shrink wrap sleeve.

Figure 12D:
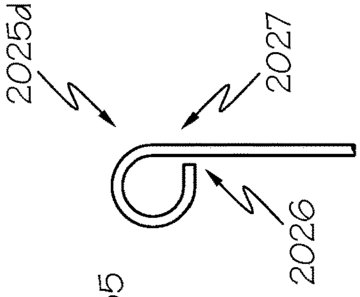

Referring to FIG. 12(D), a distal end 2026 of the strap 2000 may be bent or molded in an elliptical shape to abut or lie near a tip portion 2027 of the second end 2025*d* of the strap 2000. In this manner, the distal end portion 2026 of the strap 2000 can be shield so as to prevent injury.

Figure 13:
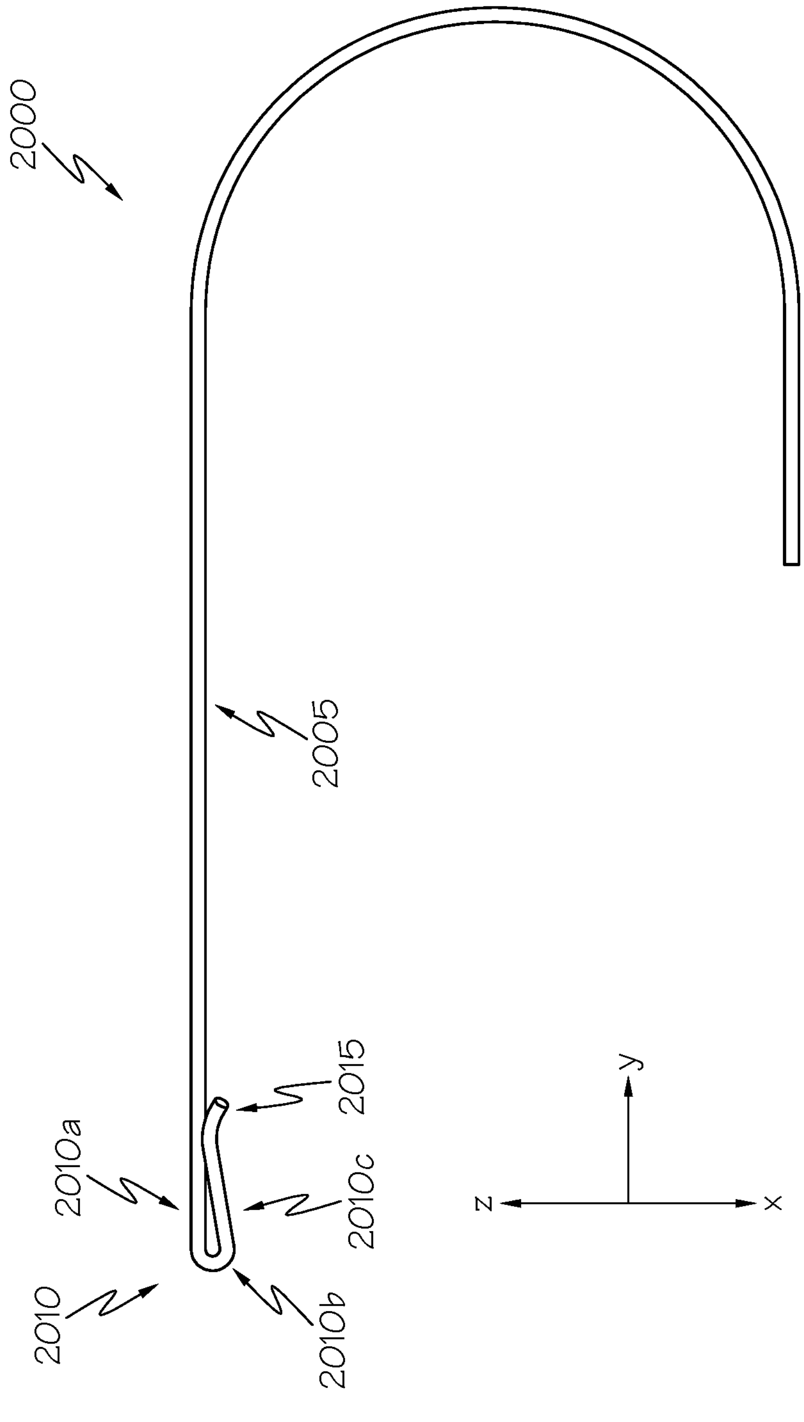
FIG. 13 is a top down perspective view of a strap, in accordance with embodiments of the present inventive concepts.
Figure 14:
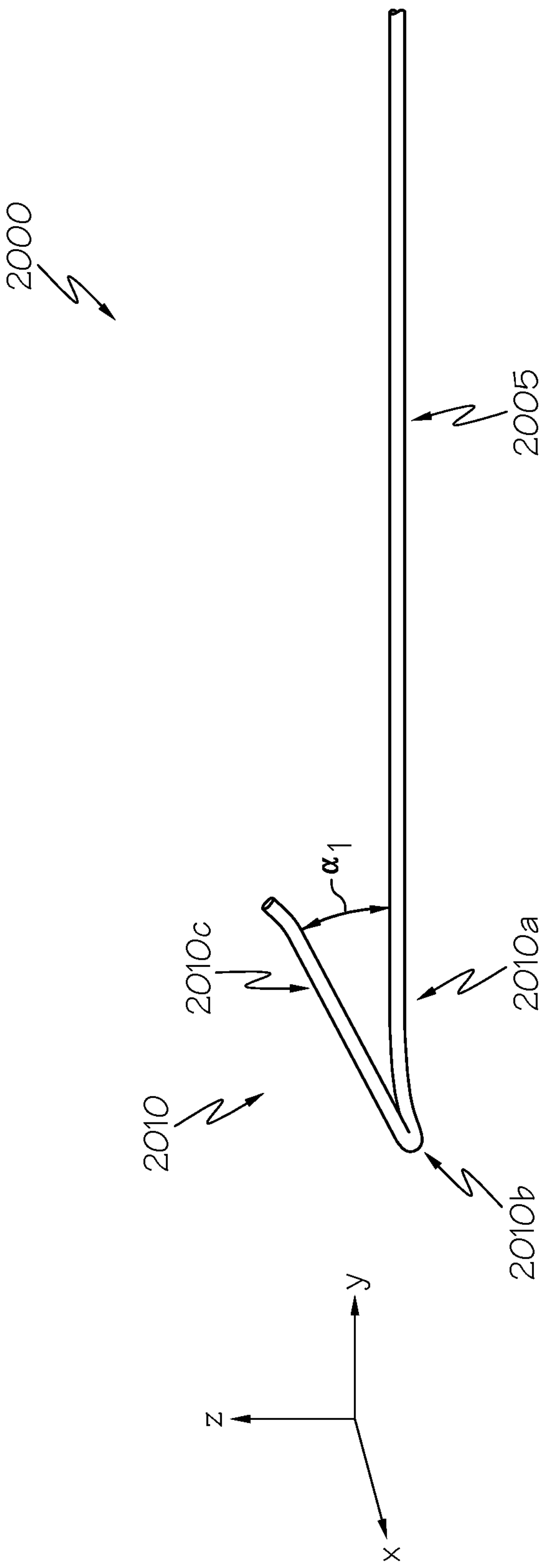
FIG. 14 is a side perspective view of a strap, in accordance with embodiments of the present inventive concepts.

FIGS. 13 and 14 illustrate perspective views of a strap. FIG. 13 is a top down perspective view of a strap 2000, and FIG. 14 is a side perspective view of the strap 2000.

The first hook portion 2010 of the strap 2000 may include first and second portions 2010*a*, 2010*c* bent about a midpoint 2010*b*. As described above, the first hook portion 2010 of the strap 2000 may have a radius of curvature Rc1, which may range between 1/16 of an inch to 5/8 of an inch (see for example, FIG. 11A).

The first hook portion 2010 may further have an offset angle α1, which indicates an angle of offset between the second portion 2010*c* and the first hook portion 2010*a* that is connected to the intermediate portion 2005. The offset angle α1 can range between 10° and 50°. With the aid of the offset angle α1 (see for example, FIG. 11), the first hook portion 2010 can be constructed to easily puncture and/or pierce a layer of the sheet of material during installation without requiring the installer to pinch the sheet of material with a second hand (see for example FIGS. 3O and 6E(B). That is, an installer may be able to secure the first hook portion 2010 to a sheet of material with a single-handed motion.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A method of assembling a partition mounting system, comprising:

providing a receptacle having a sheet of material having a preattached first zipper and a preattached second zipper, a roll of tape and at least one strap stored therein;

removing the sheet of material, the roll of tape and the at least one strap from the receptacle;

affixing the sheet of material to an entryway with one or more strips of the roll of tape;

securing the at least one strap to an upper portion of the sheet of material;

unzipping the first and second zippers; and rolling up a portion of the sheet of material between the first and second zippers and placing the rolled-up portion of the sheet of material within a hook portion of the at least one strap, wherein the at least one strap comprises:

a first hook portion constructed to support the rolled-up portion of the sheet of material;

a second hook portion constructed to puncture the sheet of material;

the second hook portion connected to the first hook portion by a straight intermediate portion of the strap; and the first hook portion, the intermediate portion and the second hook portion having a same material, and wherein securing the at least one strap to an upper portion of the sheet of material includes:

positioning the at least one strap at the upper portion of the sheet of material, between the first and second zippers preattached to the sheet of material; and puncturing the sheet of material with the second hook portion of the at least one strap through the sheet of material while at the same time securing the at least one strap to the sheet of material.

2. The method of claim of claim 1, wherein the second hook portion pierces the sheet of material.

3. The method of claim 1, wherein concave portions of the first and second hook portions face one another.

4. The method of claim 1, wherein the first hook portion has a first radius of curvature and the second hook portion has a second radius of curvature, wherein the first radius of curvature is greater than the second radius of curvature.

5. The method of claim 4, wherein the second radius of curvature ranges between 1/16 of an inch and 5/8 of an inch.

6. The method of claim 4, wherein the first radius of curvature ranges between 1½ inches and 3¼ inches.

7. The method of claim 1, wherein a first end portion of the at least one strap curves outward from the second hook portion.

8. The method of claim 7, wherein the first end portion of the at least one strap has a third radius of curvature greater than a first radius of curvature of the first hook portion and a second radius of curvature of the second hook portion.

9. The method of claim 8, wherein the third radius of curvature ranges between 3½ inches and 6 inches.

10. The method of claim 1, wherein the at least one strap comprises a first strap and a second strap.

11. The method of claim 1, wherein the first and second zippers are spaced apart and substantially parallel along the sheet of material and a bottom portion of each of the first and second zippers is aligned with a bottom portion of the sheet of material.

12. The method of claim 1, wherein the roll of tape comprises double-sided tape and the method further comprising:

affixing the one or more strips of the roll of double-sided tape to an entry way by placing a first side of the one or more strips of the double-sided tape against the entryway; and affixing the sheet of material to a second side of the one or more strips of the double-sided tape.

13. The method of claim 12 further comprising removing a tape liner positioned on the second side of the double-sided tape prior to affixing the sheet of material to the second side of the double-sided tape.

14. The method of claim of claim 1, wherein the first hook portion, the intermediate portion and the second hook portion are unitary.

* * * * *